US012581061B2

(12) United States Patent
Pfaff et al.

(10) Patent No.: US 12,581,061 B2
(45) **Date of Patent: \*Mar. 17, 2026**

(54) MATRIX BASED INTRA PREDICTION WITH MODE-GLOBAL SETTINGS

(71) Applicant: Fraunhofer-Gesellschaft zur Förderung der angewandten Forschung e.V., Munich (DE)

(72) Inventors: Jonathan Pfaff, Berlin (DE); Tobias Hinz, Berlin (DE); Philipp Helle, Berlin (DE); Philipp Merkle, Berlin (DE); Björn Stallenberger, Berlin (DE); Michael Schäfer, Berlin (DE); Benjamin Bross, Berlin (DE); Martin Winken, Berlin (DE); Mischa Siekmann, Berlin (DE); Heiko Schwarz, Berlin (DE); Detlev Marpe, Berlin (DE); Thomas Wiegand, Berlin (DE)

(73) Assignee: Fraunhofer-Gesellschaft Zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/737,706

(22) Filed: Jun. 7, 2024

(65) Prior Publication Data

US 2024/0323360 A1      Sep. 26, 2024

Related U.S. Application Data

(63) Continuation of application No. 17/782,990, filed as application No. PCT/EP2020/084691 on Dec. 4, 2020, now Pat. No. 12,041,222.

(30) Foreign Application Priority Data

Dec. 6, 2019    (EP) .................................... 19214201

(51) Int. Cl.
H04N 19/105       (2014.01)
H04N 19/132       (2014.01)
(Continued)

(52) U.S. Cl.
CPC ......... H04N 19/105 (2014.11); H04N 19/132 (2014.11); H04N 19/159 (2014.11); H04N 19/176 (2014.11)

(58) Field of Classification Search
CPC .. H04N 19/105; H04N 19/132; H04N 19/159; H04N 19/176
See application file for complete search history.

(56) References Cited

U.S. PATENT DOCUMENTS

2021/0235090 A1 *    7/2021    Huo ..................... H04N 19/119

FOREIGN PATENT DOCUMENTS

CN        103098473 A      5/2013
JP        2010505154 A     2/2010

OTHER PUBLICATIONS

Pfaff et al., 8-bit implementation and simplification of MIP[online], JVET-00084-r2.

(Continued)

*Primary Examiner* — Kyle M Lotfi
(74) *Attorney, Agent, or Firm* — Conley Rose, P.C.

(57) ABSTRACT

An apparatus includes at least one processor for decoding a block of a picture using intra-prediction that is configured to: decode, from a data stream, a mode index, the mode index indicating a matrix-based intra-prediction mode out of a plurality of matrix-based intra-prediction modes based on a size of the block, derive an input vector based on down-sampling reference samples neighboring the block, determine a matrix based on the size of the block and the mode index, compute a respective output for each component of a matrix-vector product between the input vector and the (Continued)

determined matrix, the respective output computed by performing, a right shift by a number of bits which is independent of the matrix-based intra-prediction mode indicated by the mode index, and for each component of the matrix-vector product, use the respective output to predict a respective sample of the block.

17 Claims, 14 Drawing Sheets

(51) Int. Cl.
    *H04N 19/159*        (2014.01)
    *H04N 19/176*        (2014.01)

(56)                References Cited

OTHER PUBLICATIONS

Huo et al., Non-CE3:Fixed downshifting for 8-bit MIP[online], JVET-01127-v2.

Pfaff (Fraunhofer) J et al, "CE3 Affine linear weighted intra prediction (CE3-4.1, CE3-4.2)," Joint Video Experts Team (JVET) of ITU-T SG 16 WP 3 and ISO/IEC JTC 1/SC 29/WG 11; Jul. 2019; pp. 1-17.
Pfaff (Fraunhofer) Jet al, "8-bit implementation and simplification of MIP," Joint Video Experts Team (JVET) of ITU-T SG 16 WP 3 and ISO/IEC JTC 1/SC 29/WG 11; Jul. 2019; pp. 1-7.
Ihao (Tencent) Let al, "CE3-related Simplification for MIP matrix multiplication," Joint Video Experts Team (JVET) of ITU-T SG 16 WP 3 and ISO/IEC JTC 1/SC 29/WG 11; Oct. 2019; pp. 1-5.
International Search Report in PCT/EP2020/084691, mailed Mar. 31, 2021.
International Written Opinion in PCT/EP2020/084691, mailed Mar. 31, 2021.
International Preliminary Report on Patentability in PCT/EP2020/084691, mailed May 17, 2022.

* cited by examiner

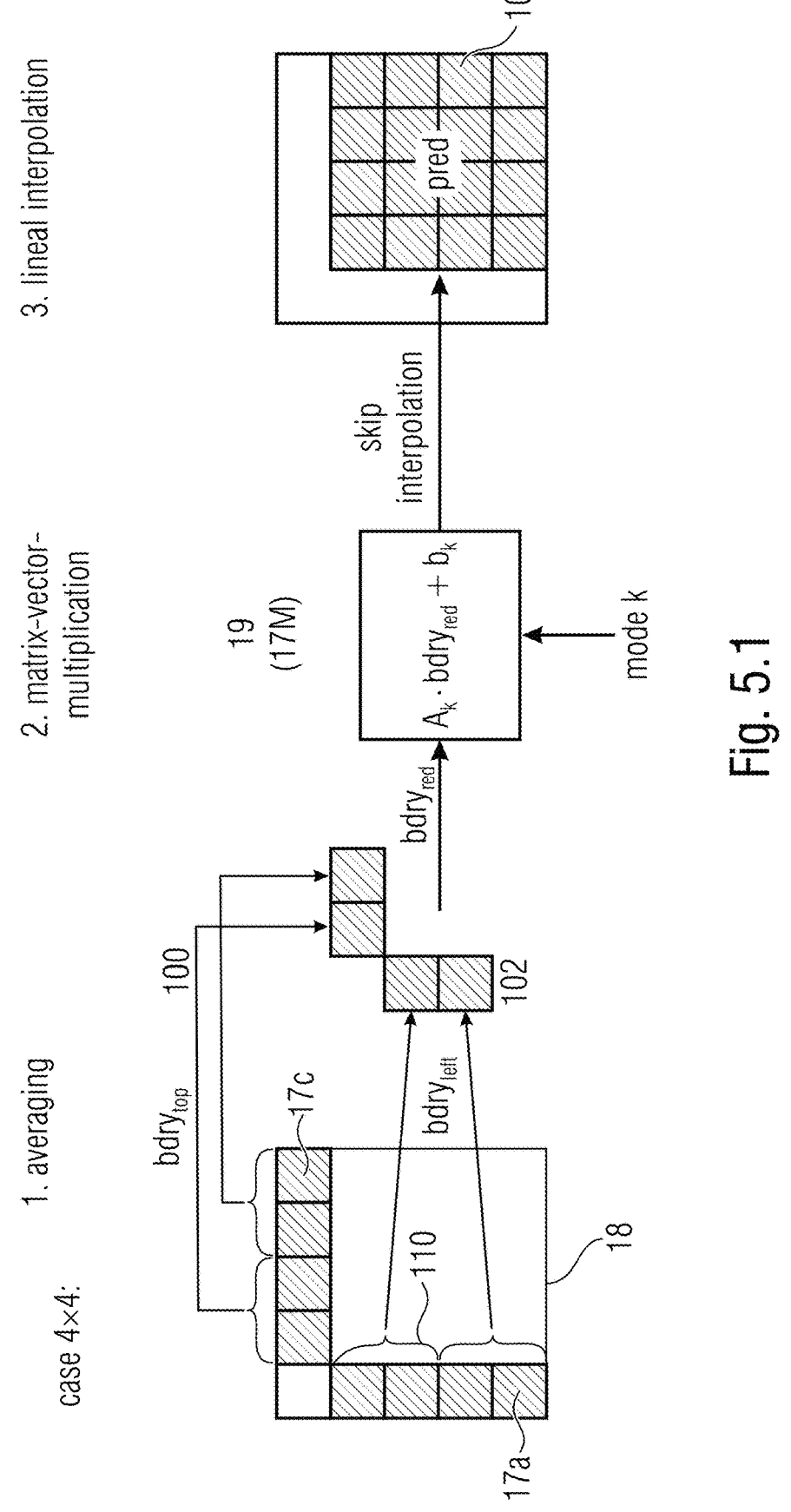
Fig. 5.1

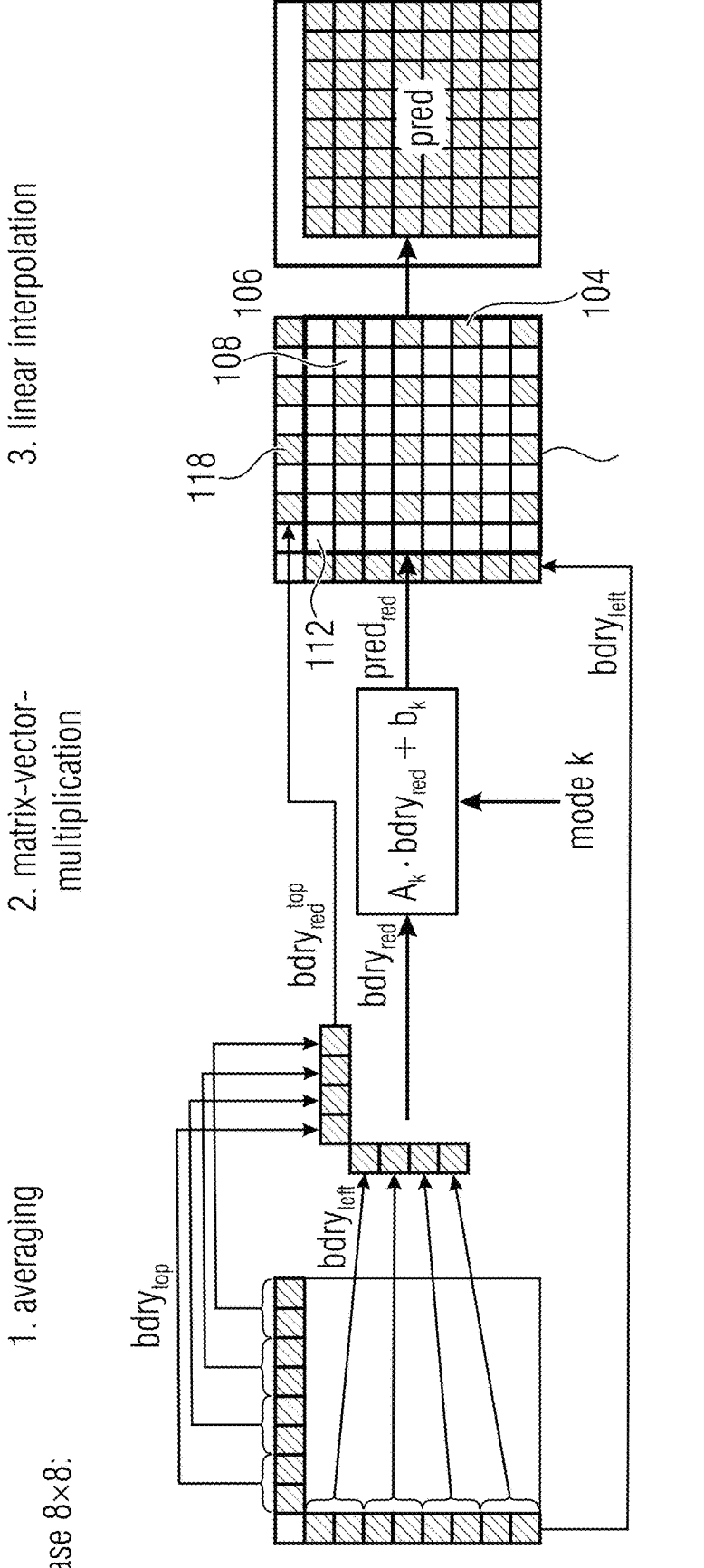
Fig. 5.2

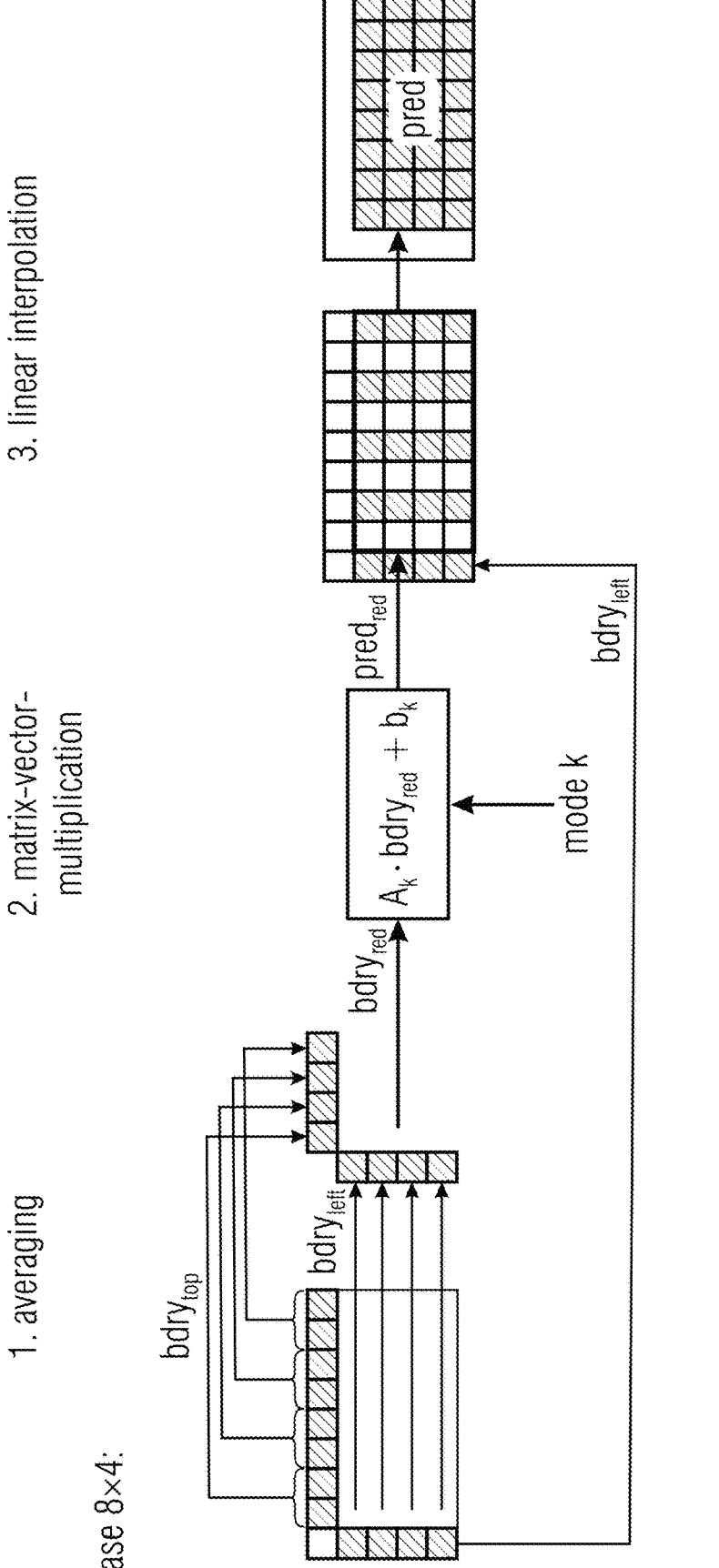
Fig. 5.3

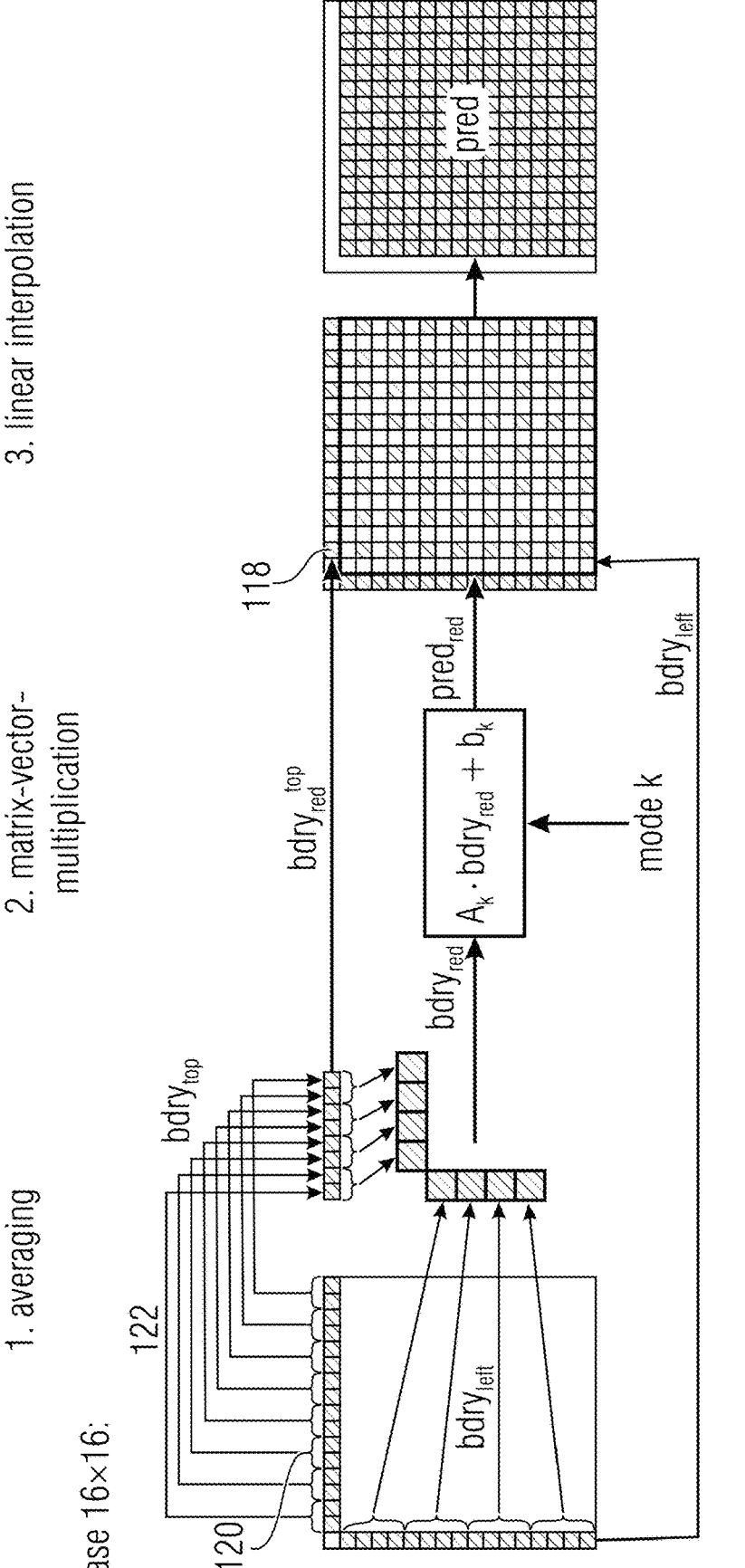
Fig. 5.4

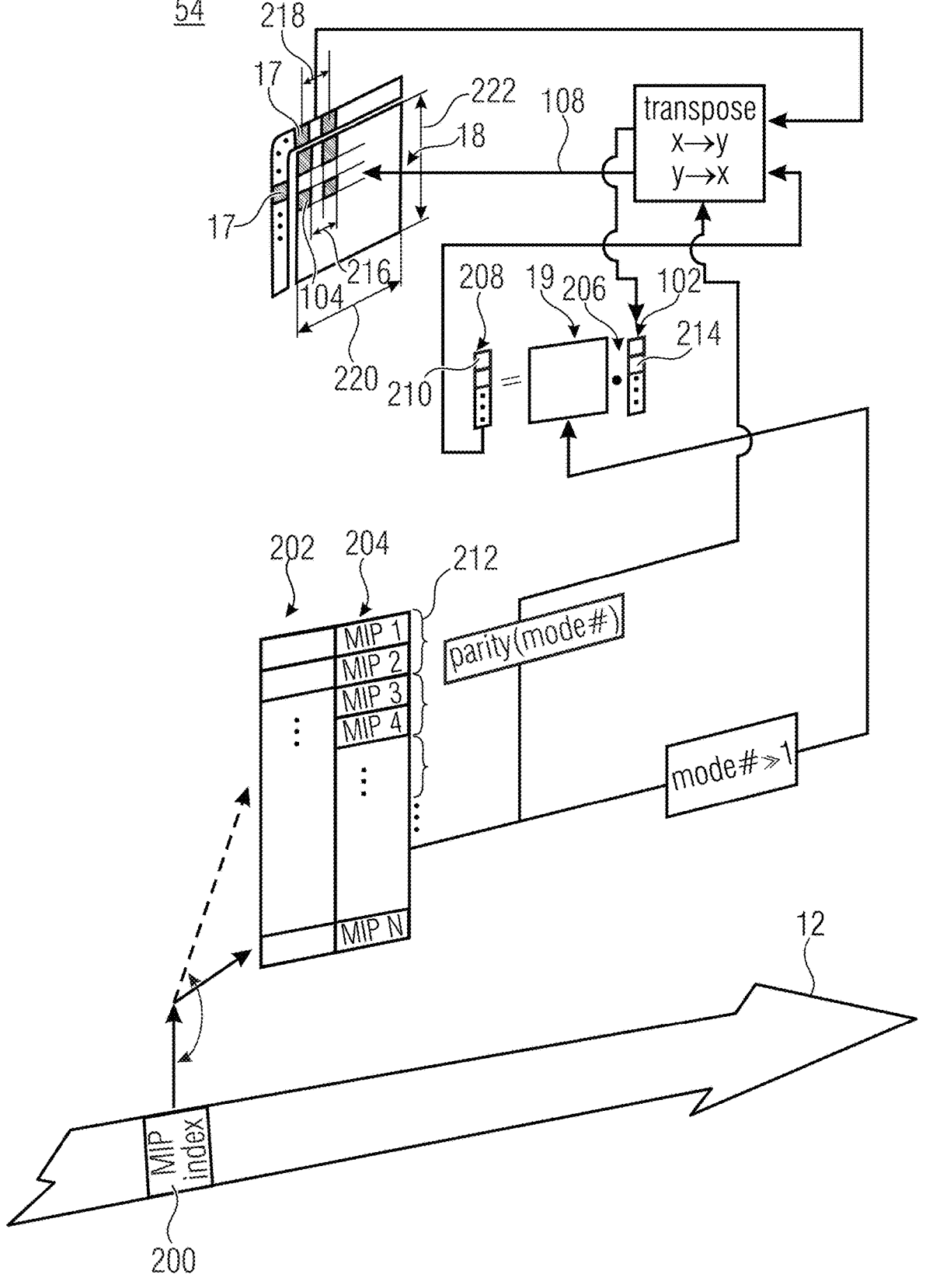
Fig. 6.1

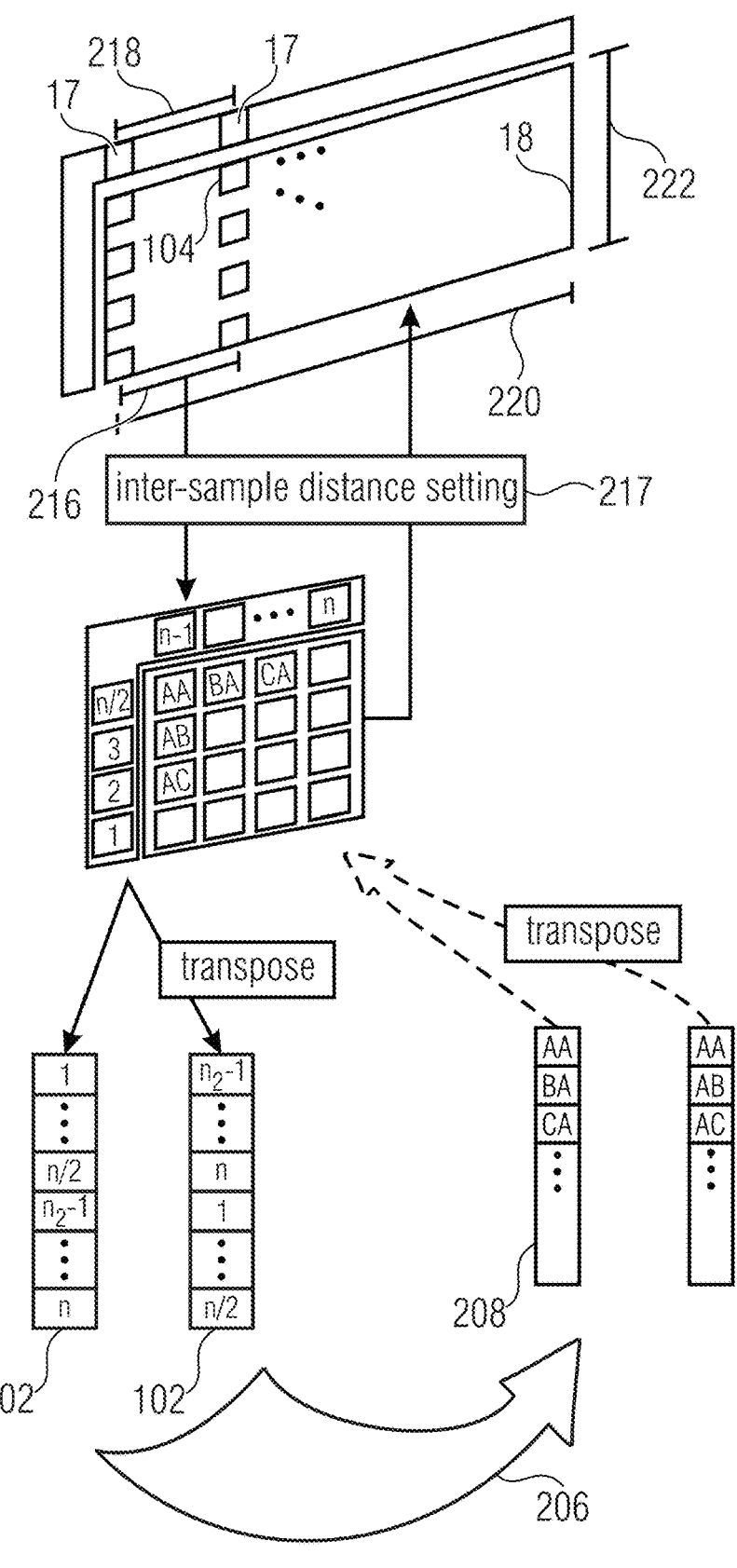
Fig. 6.2

(Part 1)

(Part 2)

MATRIX BASED INTRA PREDICTION WITH MODE-GLOBAL SETTINGS

CROSS-REFERENCE TO RELATED APPLICATION

This application is a continuation of U.S. application Ser. No. 17/782,990, filed on Dec. 4, 2020, which is a national phase application of and claims priority to International Patent Cooperation Treaty Application No. PCT/EP2020/ 084691 filed Dec. 4, 2020, which claims priority to European Application No. 19214201.6 filed Dec. 6, 2019, all of which are incorporated herein by reference in their entirety.

DESCRIPTION

Embodiments according to the invention related to Matrix based intra prediction with mode-global settings for picture and video encoding/decoding.

Typical block-based image- or video codecs usually operate by predictive coding. Thus, when the receiver of a coded image- or video-signal generates that signal on a given block, out of information already available from the coded data he constructs a prediction signal. This prediction signal serves as a first approximation of the signal on that block. In a second step, a prediction residual is decoded from the bit-stream and added to the prediction signal. The better the prediction signal is, the smaller the number of bits needed to transmit the prediction residual becomes. Thus, the quality of the prediction signal greatly affects the efficiency of the overall codec.

Typically, there are two methods of generating the prediction signal. The first method, used only in video-codecs, is inter-prediction. Here, the prediction signal is generated out of reconstructed samples that belong to a frame different from the current one. The second method is intra prediction. Here, the prediction signal is generated out of reconstructed samples that belong to the same frame and are typically spatially adjacent to the given block.

In classical codecs, intra-prediction is performed using either the angular prediction modes or the DC- and the planar modes. The angular prediction modes copy the reconstructed samples left and above the block along a specific direction defined by an angular parameter, where for fractional angle-positions, an interpolation filter is used. The DC-mode generates the prediction signal as the mean sample value of the adjacent samples left and above the block. Finally, the planar mode generates the prediction signal as a linear combination of predictions along the horizontal and the vertical directions. Optionally, a post filtering of the prediction signal or a pre-smoothing of the reference samples can be applied for any of the aforementioned prediction techniques.

Different to the classical intra prediction methods described above, matrix based intra prediction (MIP) was introduced as a new technique to generate intra prediction signals. It is part of the current draft of the evolving Versatile Video Coding (VVC) standard [1]. MIP can be seen as a low-complexity variant of more general data-driven, neural network based intra prediction modes. Each MIP mode generates an intra prediction signal by multiplying a predefined matrix that depends on the prediction mode with a down-sampled version of the top and left boundary samples and then up-sampling the result. For more details, we refer to the section review of matrix based intra prediction.

A key property of MIP is that the matrices used for the various MIP modes are determined via a training algorithm that uses a large set of training data. In this training algorithm, one attempts to find the matrices such that they minimize a predefined loss function on the training data. Here, one uses a stochastic gradient descent approach in which the matrix entries are updated iteratively. Such an approach for the determination of the matrix entries requires calculations in floating point arithmetic and thus, the resulting matrix entries are given as floating point numbers. Thus, after the training, for each MIP-mode i, a matrix $A_i^{float}$ which has floating point entries is obtained such that in floating-point, for MIP-mode i, the reduced prediction signal $\text{pred}_{red}^{float}$ is given as $$\text{pred}_{red}^{float} = A_i^{float} \cdot r_{red}, \tag{1}$$

where $r_{red}$ denotes the down-sampled version of the boundary of the given block and where · denotes matrix-vector multiplication.

On the other hand, for an application in the final standard, each matrix-vector multiplication (1) needs to be approximated by a rule that is specified in integer operations. This means that for each MIP-mode i, a matrix $A_i$ with integral entries and positive integers $c_i$ and $d_i$ have to be specified such that computation of the reduced prediction signal $\text{pred}_{red}$ is specified as $$\text{pred}_{red} = ((A_i - c_i) \cdot r_{red} + (1 \ll (d_i - 1))) \gg d_i. \tag{2}$$

Here, $A_i - c_i$ denotes the matrix that arises when subtracting $c_i$ from every entry of $A_i$. Finally, if v and w are vectors, where w has integral entries, $v + (1 \ll (d_i - 1))$ denotes the vector that arises by adding $1 \ll (d_i - 1)$ to every entry of v and $w \gg d_i$ denotes the vector that arises by shifting each entry of w to the right by $d_i$. By the underlying idea of MIP, (2) has to approximate (1) for all possible input vectors $r_{red}$.

Thus, it is desired to obtain matrices $A_i$ with integral entries, for which equation (2) approximates equation (1) for variable input vectors $r_{red}$ reasonably well. Otherwise the MIP prediction modes which are specified in a codec and which need to execute the matrix-vector product in (2) using the matrices $A_i$ might largely deviate from the behavior of the "true", i.e. the trained MIP-modes which use a matrix-vector product with the matrices $A_i^{float}$, see equation (1). Thus, the whole concept of the data driven approach to intra prediction which stands behind MIP would be violated.

Therefore, it is desired to provide concepts for rendering picture coding and/or video coding more efficient to support matrix-based intra-prediction. Additionally, or alternatively, it is desired to reduce a bit stream and thus a signalization cost.

This is achieved by the subject matter of the independent claims of the present application.

Further embodiments according to the invention are defined by the subject matter of the dependent claims of the present application.

In accordance with a first aspect of the present invention, the inventors of the present application realized that one problem encountered when trying to use matrix-based intra prediction modes (MIP-modes) for predicting samples of a predetermined block of a picture stems from the fact that the matrix-vector product, i.e. the matrix-vector multiplication, performed at a MIP-mode needs to be approximated by an integer operation, whereby large deviations between the approximated and the not approximated matrix-vector product, i.e. the 'true' matrix-vector product, can occur. In the following, the approximated matrix-vector product might be understood as the matrix-vector product of the respective MIP-mode, since, for each MIP-mode, only this approximated matrix-vector product is calculated and not the 'true' matrix-vector product to determine the prediction signal of a predetermined block. According to the first aspect of the present application, this difficulty is overcome by implementing constraints for the computation of the prediction signal by the matrix-vector product. The inventors found that it is advantageous to represent all entries of a prediction matrix associated with a MIP-mode by a fixed point representation of a predetermined bit-depth and to apply for all matrix-based intra-prediction modes, e.g. at least for the ones relating to the same block size, but maybe, optionally, for the prediction matrices of all block sizes, the same predetermined bit-depth. This enables an efficient implementation of the matrix-vector product since if the entries of all prediction matrices have a common fixed predetermined bit-depth, it is possible to use specific multipliers adapted to that predetermined bit-depth and share that specific multipliers across all MIP-modes for the computation of the matrix-vector product. Moreover, an efficient memory-management when dealing with the prediction matrices is enabled if all entries of all prediction matrices can be stored in a fixed point representation, i.e. in a fixed precision. Additionally, the inventors found that it is advantageous to compute, for each MIP-mode, the matrix-vector product between an input vector and the prediction matrix associated with the respective MIP-mode by performing, for each component of the output vector, a right shift at a number of bits which is equal for all MIP-modes, e.g. at least for the ones relating to the same block size, but maybe, optionally, for the prediction matrices of all block sizes. This is based on the idea that a fixed right shift for all MIP-modes enables an efficient implementation of the shifts in the matrix-vector product, since if the shift-value does not depend on the MIP-mode, a table-lookup is saved and a single fixed shifting operation can be implemented for MIP which is beneficial for a compact SIMD-implementation of the matrix-vector product and which reduces a case-dependent implementation of the matrix-vector product in a hardware implementation.

Accordingly, in accordance with a first aspect of the present application, an apparatus for decoding a predetermined block of a picture using intra-prediction, is configured to read, from a data stream, a mode index and an apparatus for encoding a predetermined block of a picture using intra-prediction, is configured to insert, into the data stream, the mode index, e.g. the apparatus for encoding, i.e. an encoder, might have selected this mode by way of a rate distortion optimization out of the list of modes and, optionally, further modes such as inter prediction modes. The mode index points to one out of a list of matrix-based intra-prediction modes. Additionally, the apparatuses, i.e. the apparatus for decoding and/or the apparatus for encoding, are/is configured to predict samples of the predetermined block by computing a matrix-vector product between an input vector derived from reference samples in a neighborhood of the predetermined block and a prediction matrix associated with the matrix-based intra-prediction mode pointed to by the mode index and associating components of an output vector obtained by the matrix-vector product onto sample positions of the predetermined block. For each matrix-based intra-prediction mode, all entries of the prediction matrix associated with the respective matrix-based intra-prediction mode are represented by a fixed point representation of a predetermined bit-depth, the predetermined bit-depth being equal for the matrix-based intra-prediction modes, e.g. at least for the ones relating to the same block size, but maybe, optionally, for the matrices of all block sizes. Additionally, the apparatuses are configured to, for each matrix-based intra-prediction mode, compute the matrix-vector product between the input vector and the prediction matrix associated with the respective matrix-based intra-prediction mode by performing, for each component of the output vector, a right shift at a number of bits which is equal for the matrix-based intra-prediction modes, e.g. at least for the ones relating to the same block size, but maybe, optionally, for the matrices of all block sizes.

According to an embodiment, the number of matrix-based intra-prediction modes in the list of matrix-based intra-prediction modes is 12, 16 or 32.

According to an embodiment, the apparatus for decoding and/or the apparatus for encoding are/is configured so that the matrix-based intra-prediction modes in the list of matrix-based intra-prediction modes have associated therewith 6, 8 or 16 different matrices. For example, there could be different lists for mutually exclusive block size sets, one with 6 different matrices associated with 12 modes for block sizes within a first block size set, one with 8 different matrices associated with 16 modes for smaller block sizes within a second block size set and one with 16 different matrices associated with 32 modes for even smaller block sizes within a third block size set.

According to an embodiment, the apparatus for decoding and/or the apparatus for encoding are/is configured to compute the matrix-vector product between the input vector and the prediction matrix associated with the respective matrix-based intra-prediction mode in fixed point arithmetic with applying the right shift onto an intermediate result obtained by the matrix-vector product for each component of an output vector. The intermediate result, for example, is obtained by the matrix-vector product between the input vector and the prediction matrix or by the matrix-vector product between the input vector and the prediction matrix, which is offset by a positive integer, e.g. the positive integer is subtracted/added from/to every entry of the prediction matrix resulting in an intermediate matrix and the intermediate result is obtained by the matrix-vector product between the input vector and the intermediate matrix.

According to an embodiment, the apparatus for decoding and/or the apparatus for encoding are/is configured to, prior to computing the matrix-vector product, offset, e.g. by addition or by subtraction, for each matrix-based intra-prediction mode, all entries of the prediction matrix associated with the respective matrix-based intra-prediction mode by an offset value which is equal for the matrix-based intra-prediction modes, e.g. at least for the ones relating to the same block size, but maybe, optionally, for the matrices of all block sizes. This is based on the idea that a fixed offset value for all MIP-modes enables an efficient implementation of the matrix-vector product by saving a table-lookup.

According to an embodiment, the apparatus for decoding and/or the apparatus for encoding are/is configured to store, for each matrix-based intra-prediction mode, for each entry of the prediction matrix associated with the respective matrix-based intra-prediction mode, the fixed point representation in the predetermined bit-depth.

According to an embodiment, the apparatus for decoding/apparatus for encoding is configured to decode/encode the picture in 10-bit resolution, store, for each matrix-based intra-prediction mode, a magnitude of the entries of the prediction matrix associated with the respective matrix-based intra-prediction mode in a 7-bit precision, and use 6 bits as the number of bits for the right shift.

According to an embodiment, the apparatus for decoding and/or the apparatus for encoding are/is configured to store, for each matrix-based intra-prediction mode, the entries of the prediction matrix associated with the respective matrix-based intra-prediction mode in 8-bit sign-magnitude representation. Alternatively, in case of the entries of the prediction matrix associated with the respective matrix-based intra-prediction mode being of the same sign, the apparatus for decoding and/or the apparatus for encoding are/is configured to, prior to computing the matrix-vector product, offset, e.g. by addition or by subtraction, for each matrix-based intra-prediction mode, all entries of the prediction matrix associated with the respective matrix-based intra-prediction mode by an offset value which is equal for the matrix-based intra-prediction modes, wherein, for each matrix-based intra-prediction mode, all entries of the prediction matrix associated with the respective matrix-based intra-prediction mode are representable by a signed 8-bit representation. Accordingly, according to this alternative, merely a 7-bit magnitude might be stored for each matrix entry, since it is not necessary to indicate the sign.

According to an embodiment, the apparatus for decoding and/or the apparatus for encoding are/is configured to compute the matrix-vector product between the input vector and the prediction matrix associated with the respective matrix-based intra-prediction mode in fixed point arithmetic with applying the right shift onto an intermediate result obtained by the matrix-vector product for each component of an output vector, and being represented at bit precision which is twice as high as a bit precision at which the entries of the prediction matrix associated with the matrix-based intra-prediction modes are stored. For example, the so computed matrix-vector product, e.g. the prediction signal obtained by offsetting the prediction matrix by a positive integer resulting in an intermediate matrix, computing a matrix-vector product between the input vector and the intermediate matrix resulting in the intermediate result, and performing the right shift on the intermediate result, is represented at bit precision which is twice as high as a bit precision at which the entries of the prediction matrix associated with the matrix-based intra-prediction modes are stored.

According to an embodiment, the list of matrix-based intra-prediction modes comprises one or more pairs of matrix-based intra-prediction modes. Note that the list of matrix-based intra-prediction modes may not be exclusively composed of such pairs of modes, rather there may also be other modes which are either applied using a transpose-option or a non-transpose option exclusively. For each pair of matrix-based intra-prediction modes, the prediction matrix associated with a first matrix-based intra-prediction mode of the respective pair of matrix-based intra-prediction modes is equal to the prediction matrix associated with a second matrix-based intra-prediction mode of the respective pair of matrix-based intra-prediction modes. The apparatuses, i.e. the apparatus for decoding and/or the apparatus for encoding, are/is configured so that, if the matrix-based intra-prediction mode pointed to by the mode index is the first matrix-based intra-prediction mode of the respective pair of matrix-based intra-prediction modes, e.g. a mode with odd mode index, an association of the reference samples in the neighborhood of the predetermined block with components of the input vector and of the sample positions of the predetermined block with the components of the output vector is transposed relative to the association in case of the matrix-based intra-prediction mode pointed to by the mode index being the second matrix-based intra-prediction mode of the respective pair of matrix-based intra-prediction modes, e.g. a mode with even mode index. That is, if a certain component of the input vector is associated with position (x,y) with (0,0) denoting the upper left corner sample of the predetermined block in the former case, then it is associated with (y,x) in the latter case. The same applies to the components of the output vector.

According to an embodiment, the apparatus for decoding and/or the apparatus for encoding are/is configured to use the list of matrix-based intra-prediction modes for a plurality of block dimensions.

According to an embodiment, the apparatus for decoding and/or the apparatus for encoding are/is configured to predict samples of the predetermined block which are offset from the sample positions with which the components of the output vector are associated, by up-sampling and/or interpolation on the basis of the output vector or on the basis of the output vector and the reference samples in the neighborhood of the predetermined block.

According to an embodiment, the apparatus for decoding and/or the apparatus for encoding are/is configured to derive the input vector from the reference samples in the neighborhood of the predetermined block by down-sampling and/or pooling.

According to an embodiment, the reference samples in the neighborhood of the predetermined block comprise first reference samples above the predetermined block and second reference samples to the left of the predetermined block. The apparatuses, i.e. the apparatus for decoding and/or the apparatus for encoding, are configured to derive the input vector from the reference samples in the neighborhood of the predetermined block by deriving first intermediate components from the first reference samples by down-sampling and/or pooling, deriving second intermediate components from the second reference samples by down-sampling and/or pooling, concatenating the first intermediate components and the second intermediate components to derive a preliminary input vector, and forming the input vector out of the preliminary input vector.

According to an embodiment, the apparatus for decoding/apparatus for encoding is configured to decode/encode the picture in B-bit resolution. The apparatuses are configured to form the input vector out of the preliminary input vector by subtraction of $2^{B-1}$ from a first component of the preliminary input vector so as to obtain a first component of the input vector and subtracting the first component of the preliminary input vector from further components of the preliminary input vector so as to obtain further component of the input vector, or subtracting a first component of the preliminary input vector from further components of the preliminary input vector so that the input vector is formed out of the further components. Additionally, the apparatuses are configured to correct the output vector by component-wise addition of the first component of the preliminary input vector.

According to an embodiment, the entries of the prediction matrices of the matrix-based intra-prediction modes in the list of matrix-based intra-prediction modes corresponds to the entries in table 2, shown below, but please note that maybe another shift value is chosen for listing the values in the table and maybe the values in the table might be represented at another scale.

According to an embodiment, the apparatus for decoding and/or the apparatus for encoding are/is configured to use a trained prediction matrix selected for a predetermined block for predicting samples of the predetermined block by computing a matrix-vector product between the input vector derived from reference samples in the neighborhood of the predetermined block and the trained prediction matrix which is associated with the matrix-based intra-prediction mode selected for the predetermined block and associating components of an output vector obtained by the matrix-vector product onto sample positions of the predetermined block. The trained prediction matrix is, for example, trained by an apparatus for training prediction matrices, e.g., trained by an apparatus according to the second aspect.

In accordance with a second aspect of the present invention, the inventors of the present application realized that one problem encountered when trying to use matrix-based intra prediction modes (MIP-modes) for predicting samples of a predetermined block of a picture stems from the fact that the matrix-vector product, i.e. the matrix-vector multiplication, performed at a MIP-mode needs to be approximated by an integer operation and that a trained prediction matrix for such a matrix-vector multiplication is obtained in floating point precision. According to the second aspect of the present application, this difficulty is overcome by implementing constraints for a computation of the prediction signal by the matrix-vector product already at the training of the prediction matrices for such a matrix-vector product. The inventors found that it is advantageous to optimize entries of a prediction matrix associated with a MIP-mode by using a cost function which depends on a prediction distortion measure associated with setting the entries of the prediction matrices to intermediate values onto which the representative values are mapped using a differentiable function. By this approach it is possible to restrict the range of all prediction matrix entries and avoid that some entries might not be updated during the training. During the training the entries are represented in a floating point representation and the intermediate values are then quantized onto a fixed point representation with a predetermined bit depth being equal for all MIP-modes. This enables an efficient implementation of the matrix-vector product since if the entries of all prediction matrices have a common fixed predetermined bit-depth. Such prediction matrices enable a video or picture encoder/decoder to use specific multipliers adapted to that predetermined bit-depth and share that specific multipliers across all MIP-modes for the computation of the matrix-vector product. Moreover, an efficient memory-management when dealing with the prediction matrices is enabled if all entries of all prediction matrices can be stored in a fixed point representation, i.e. in a fixed precision.

Accordingly, in accordance with a second aspect of the present application, an apparatus for training prediction matrices of a list of matrix-based intra-prediction modes among which one is ought to be selected for a predetermined block for predicting samples of the predetermined block by computing a matrix-vector product between an input vector derived from reference samples in a neighborhood of the predetermined block and one of the prediction matrices which is associated with the matrix-based intra-prediction mode selected for the predetermined block and associating components of an output vector obtained by the matrix-vector product onto sample positions of the predetermined block, is provided. The apparatus is configured to train, e.g., by use of a training set of predetermined blocks of known (e.g. original) samples and their corresponding neighborhood, the prediction matrices of the list of matrix-based intra-prediction modes by, using a gradient descent approach, optimizing representative values for entries of the prediction matrices of the list of matrix-based intra-prediction modes, which are represented in floating point representation, using a cost function which depends on a prediction distortion measure associated with setting the entries of the prediction matrices to intermediate values onto which the representative values are mapped using a differentiable function. The prediction distortion measure, e.g., defines cost increases with decreasing quality of the prediction as resulting from applying the differentiable function onto the prediction matrix under training meaning that the differentiable function is applied onto every entry of the prediction matrix under training. A domain and a codomain of the differentiable function is defined by the floating point representation, an image of the differentiable function has a predetermined dynamic range, and the differentiable function is equal for the matrix-based intra-prediction modes. Additionally, the apparatus is configured to quantize, e.g. after training, the intermediate values onto a fixed point representation so that, for each matrix-based intra-prediction mode, the prediction matrix associated with the respective matrix-based intra-prediction mode has all entries represented by a fixed point representation of a predetermined bit-depth so that the predetermined bit-depth is equal for the matrix-based intra-prediction modes, and so that, for each matrix-based intra-prediction mode, the matrix-vector product between the input vector and the prediction matrix associated with the respective matrix-based intra-prediction mode is computable by performing, for each component of the output vector, a right shift at a number of bits which is equal for the matrix-based intra-prediction modes.

According to an embodiment, the differentiable function, i.e. a clipping function, has slope 1 at an origin of the image, is strictly monotonically increasing and has horizontal asymptotes at an upper and a lower bound of the image. The horizontal asymptotes at the upper and lower bound of the image of the differentiable function might define the predetermined dynamic range.

According to an embodiment, the differentiable function is represented/defined by $$f(x) = \alpha \cdot \frac{\beta(x - \gamma)}{\left(1 + (\beta(x - \gamma))^{2\lambda}\right)^{\frac{1}{2\lambda}}} + \delta,$$

wherein $\alpha$, $\beta$, $\gamma$ and $\delta$ are real numbers that depend on the predetermined dynamic range, i.e. a clipping range, and $\lambda$ is a non-negative integer.

According to an embodiment, the differentiable function, i.e. the clipping function, is parametrizable by a shift parameter, e.g. $\delta$, in terms of a shift of the image within the codomain. The apparatus is configured to subject the shift parameter to the optimization using the gradient descent approach (could be, but does not have to be), and to derive an offset value which is equal for the matrix-based intra-prediction modes from the shift parameter so as to be used, prior to the computation of the matrix-vector product, to offset, e.g. by addition or by subtraction, for each matrix-based intra-prediction mode, all entries of the prediction matrix associated with the respective matrix-based intra-prediction mode.

An embodiment is related to a method for decoding a predetermined block of a picture using intra-prediction, comprising reading, from the data stream, a mode index, the mode index pointing to one out of a list of matrix-based intra-prediction modes, and predicting samples of the predetermined block by computing a matrix-vector product between an input vector derived from reference samples in a neighborhood of the predetermined block and a prediction matrix associated with the matrix-based intra-prediction mode pointed to by the mode index and associating components of an output vector obtained by the matrix-vector product onto sample positions of the predetermined block. For each matrix-based intra-prediction mode, all entries of the prediction matrix associated with the respective matrix-based intra-prediction mode are represented by a fixed point representation of a predetermined bit-depth, the predetermined bit-depth being equal for the matrix-based intra-prediction modes, e.g. at least for the ones relating to the same block size, but maybe, optionally, for the matrices of all block sizes. Additionally, the method comprises, for each matrix-based intra-prediction mode, computing the matrix-vector product between the input vector and the prediction matrix associated with the respective matrix-based intra-prediction mode by performing, for each component of the output vector, a right shift at a number of bits which is equal for the matrix-based intra-prediction modes, e.g. at least for the ones relating to the same block size, but maybe, optionally, for the matrices of all block sizes.

An embodiment is related to a method for encoding a predetermined block of a picture using intra-prediction, comprising inserting, into the data stream, a mode index, the mode index pointing to one out of a list of matrix-based intra-prediction modes, e.g. this mode might have been selected by way of a rate distortion optimization out of the list of matrix-based intra-prediction modes and, optionally, also out of further modes such as inter prediction modes. The method comprises further predicting samples of the predetermined block by computing a matrix-vector product between an input vector derived from reference samples in a neighborhood of the predetermined block and a prediction matrix associated with the matrix-based intra-prediction mode pointed to by the mode index and associating components of an output vector obtained by the matrix-vector product onto sample positions of the predetermined block. For each matrix-based intra-prediction mode, all entries of the prediction matrix associated with the respective matrix-based intra-prediction mode are represented by a fixed point representation of a predetermined bit-depth, the predetermined bit-depth being equal for the matrix-based intra-prediction modes, e.g. at least for the ones relating to the same block size, but maybe, optionally, for the matrices of all block sizes. Additionally, the method comprises, for each matrix-based intra-prediction mode, computing the matrix-vector product between the input vector and the prediction matrix associated with the respective matrix-based intra-prediction mode by performing, for each component of the output vector, a right shift at a number of bits which is equal for the matrix-based intra-prediction modes, e.g. at least for the ones relating to the same block size, but maybe, optionally, for the matrices of all block sizes.

The methods as described above are based on the same considerations as the above-described encoder/decoder. The methods can, by the way, be completed with all features and functionalities, which are also described with regard to the encoder/decoder.

An embodiment is related to a method for training prediction matrices of a list of matrix-based intra-prediction modes among which one is ought to be selected for a predetermined block for predicting samples of the predetermined block by computing a matrix-vector product between an input vector derived from reference samples in a neighborhood of the predetermined block and one of the prediction matrices which is associated with the matrix-based intra-prediction mode selected for the predetermined block and associating components of an output vector obtained by the matrix-vector product onto sample positions of the predetermined block. The method comprises training, e.g. by use of a training set of predetermined blocks of known (original) samples and their corresponding neighborhood, the prediction matrices of the list of matrix-based intra-prediction modes by, using a gradient descent approach, optimizing representative values for entries of the prediction matrices of the list of matrix-based intra-prediction modes, which are represented in floating point representation, using a cost function which depends on a prediction distortion measure associated with setting the entries of the prediction matrices to intermediate values onto which the representative values are mapped using a differentiable function a domain and a codomain of which is defined by the floating point representation, an image of which has a predetermined dynamic range, and which is equal for the matrix-based intra-prediction modes. Additionally, the method comprises quantizing, e.g. after training, the intermediate values onto a fixed point representation so that, for each matrix-based intra-prediction mode, the prediction matrix associated with the respective matrix-based intra-prediction mode has all entries represented by a fixed point representation of a predetermined bit-depth so that the predetermined bit-depth is equal for the matrix-based intra-prediction modes, and so that, for each matrix-based intra-prediction mode, the matrix-vector product between the input vector and the prediction matrix associated with the respective matrix-based intra-prediction mode is computable by performing, for each component of the output vector, a right shift at a number of bits which is equal for the matrix-based intra-prediction modes.

The method as described above is based on the same considerations as the above-described apparatus for training prediction matrices. The method can, by the way, be completed with all features and functionalities, which are also described with regard to the apparatus for training prediction matrices.

An embodiment is related to a data stream having a picture or a video encoded thereinto using a herein described method for encoding.

An embodiment is related to a computer program having a program code for performing, when running on a computer, a herein described method.

BRIEF DESCRIPTION OF THE DRAWINGS

The drawings are not necessarily to scale; emphasis instead generally being placed upon illustrating the principles of the invention. In the following description, various embodiments of the invention are described with reference to the following drawings, in which:

FIG. 5.1 shows a prediction of a block with a reduced sample value vector according to an embodiment;

FIG. 5.2 shows a prediction of a block using an interpolation of samples according to an embodiment;

FIG. 5.3 shows a prediction of a block with a reduced sample value vector, wherein only some boundary samples are averaged, according to an embodiment;

FIG. 5.4 shows a prediction of a block with a reduced sample value vector, wherein groups of four boundary samples are averaged, according to an embodiment;

FIG. 6.1 shows a matrix-based intra prediction of a predetermined block of a picture based on a mode index;

FIG. 6.2 shows a relationship between a pair of matrix-based intra prediction modes and an application of an inter-sample distance setting;

DETAILED DESCRIPTION OF THE EMBODIMENTS

Figure 1:
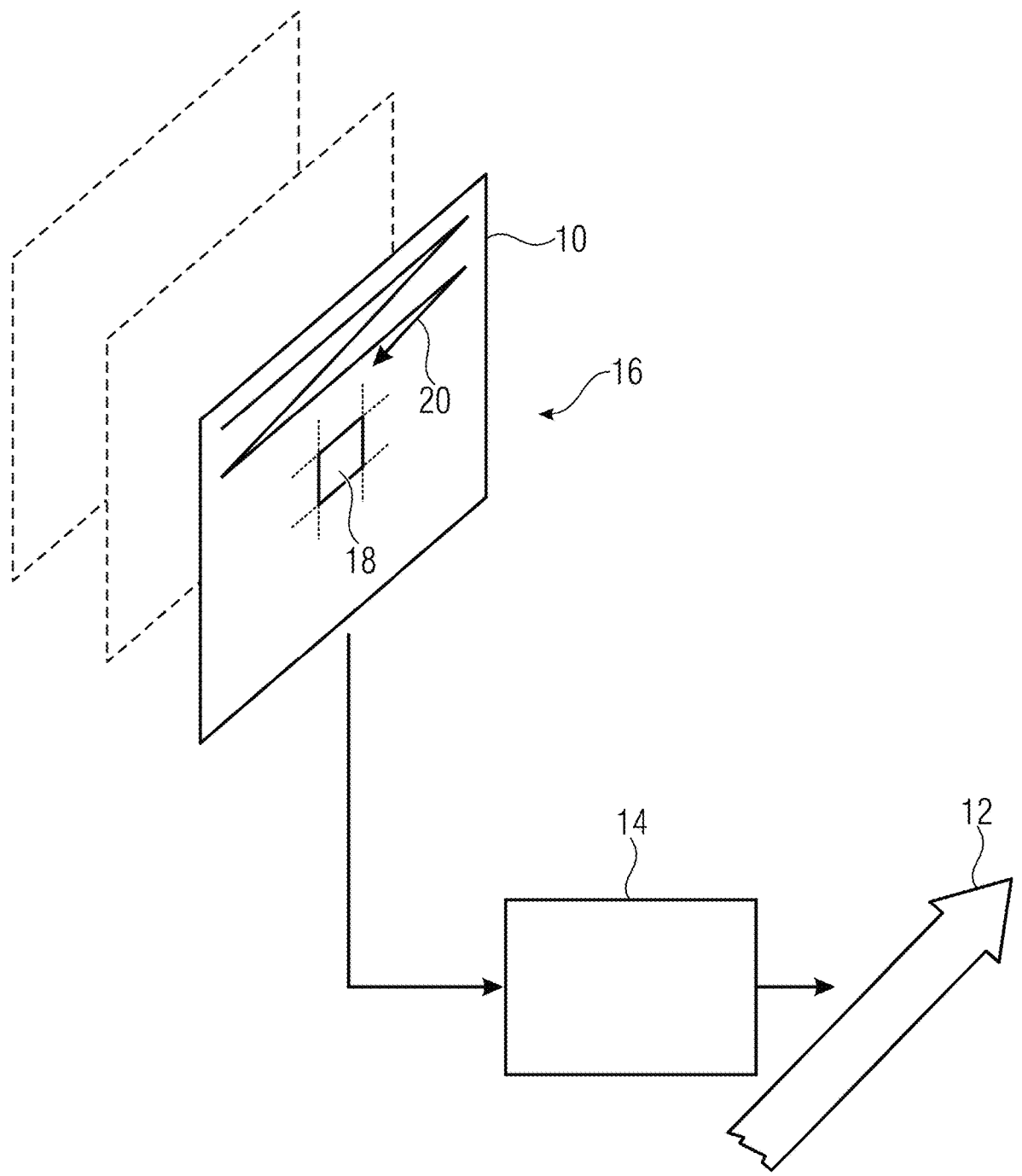
FIG. 1 shows an embodiment of an encoding into a data stream.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

In the following, various examples are described which may assist in achieving a more effective compression when using matrix-based intra prediction. The matrix-based intra prediction may be added to other intra-prediction modes heuristically designed, for instance, or may be provided exclusively.

In order to ease the understanding of the following examples, the description starts with a presentation of possible encoders and decoders fitting thereto into which the above outlined examples of the present application could be built. FIG. 1 shows an apparatus for block-wise encoding a picture 10 into a data stream 12. The apparatus is indicated using reference sign 14 and may be a still picture encoder or a video encoder. In other words, picture 10 may be a current picture out of a video 16 when the encoder 14 is configured to encode video 16 including picture 10 into data stream 12, or encoder 14 may encode picture 10 into data stream 12 exclusively.

As mentioned, encoder 14 performs the encoding in a block-wise manner or block-based. To this end, encoder 14 subdivides picture 10 into blocks, units of which encoder 14 encodes picture 10 into data stream 12. Examples of possible subdivisions of picture 10 into blocks 18 are set out in more detail below. Generally, the subdivision may end-up into blocks 18 of constant size such as an array of blocks arranged in rows and columns or into blocks 18 of different block sizes such as by use of a hierarchical multi-tree subdivisioning with starting the multi-tree subdivisioning from the whole picture area of picture 10 or from a pre-partitioning of picture 10 into an array of tree blocks wherein these examples shall not be treated as excluding other possible ways of subdivisioning picture 10 into blocks 18.

Further, encoder 14 is a predictive encoder configured to predictively encode picture 10 into data stream 12. For a certain block 18 this means that encoder 14 determines a prediction signal for block 18 and encodes the prediction residual, i.e. the prediction error at which the prediction signal deviates from the actual picture content within block 18, into data stream 12.

Encoder 14 may support different prediction modes so as to derive the prediction signal for a certain block 18. The prediction modes, which are of importance in the following examples, are intra-prediction modes according to which the inner of block 18 is predicted spatially from neighboring, already encoded samples of picture 10. The encoding of picture 10 into data stream 12 and, accordingly, the corresponding decoding procedure, may be based on a certain coding order 20 defined among blocks 18. For instance, the coding order 20 may traverse blocks 18 in a raster scan order such as row-wise from top to bottom with traversing each row from left to right, for instance. In case of hierarchical multi-tree based subdivisioning, raster scan ordering may be applied within each hierarchy level, wherein a depth-first traversal order may be applied, i.e. leaf notes within a block of a certain hierarchy level may precede blocks of the same hierarchy level having the same parent block according to coding order 20. Depending on the coding order 20, neighboring, already encoded samples of a block 18 may be located usually at one or more sides of block 18. In case of the examples presented herein, for instance, neighboring, already encoded samples of a block 18 are located to the top of, and to the left of block 18.

Intra-prediction modes may not be the only ones supported by encoder 14. In case of encoder 14 being a video encoder, for instance, encoder 14 may also support intra-prediction modes according to which a block 18 is temporarily predicted from a previously encoded picture of video 16. Such an intra-prediction mode may be a motion-compensated prediction mode according to which a motion vector is signaled for such a block 18 indicating a relative spatial offset of the portion from which the prediction signal of block 18 is to be derived as a copy. Additionally, or alternatively, other non-intra-prediction modes may be available as well such as inter-view prediction modes in case of encoder 14 being a multi-view encoder, or non-predictive modes according to which the inner of block 18 is coded as is, i.e. without any prediction.

Figure 2:
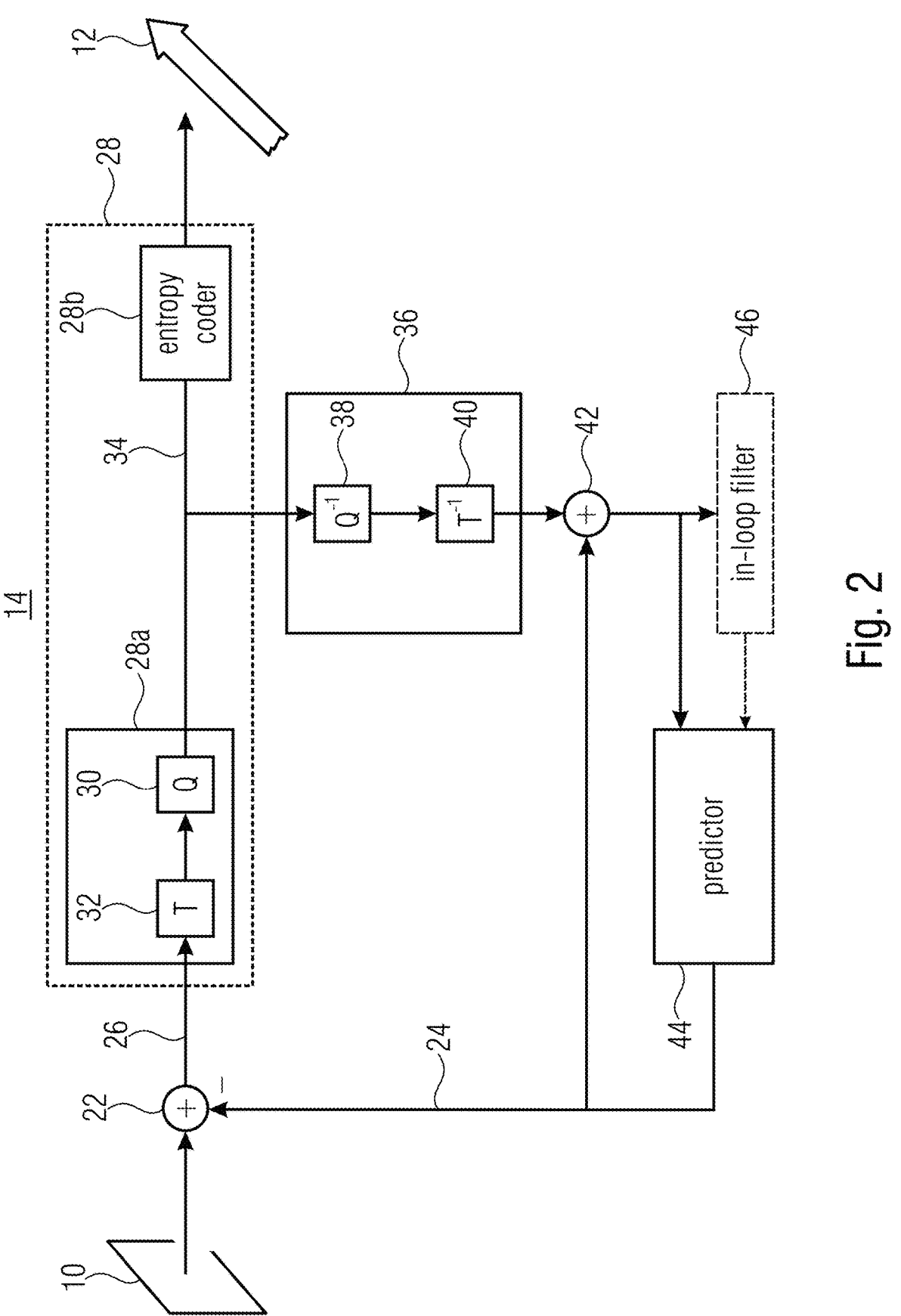
FIG. 2 shows an embodiment of an encoder.

Before starting with focusing the description of the present application onto intra-prediction modes, a more specific example for a possible block-based encoder, i.e. for a possible implementation of encoder 14, as described with respect to FIG. 2 with then presenting two corresponding examples for a decoder fitting to FIGS. 1 and 2, respectively.

FIG. 2 shows a possible implementation of encoder 14 of FIG. 1, namely one where the encoder is configured to use transform coding for encoding the prediction residual although this is nearly an example and the present application is not restricted to that sort of prediction residual coding. According to FIG. 2, encoder 14 comprises a subtractor 22 configured to subtract from the inbound signal, i.e. picture 10 or, on a block basis, current block 18, the corresponding prediction signal 24 so as to obtain the prediction residual signal 26 which is then encoded by a prediction residual encoder 28 into a data stream 12. The prediction residual encoder 28 is composed of a lossy encoding stage 28a and a lossless encoding stage 28b. The lossy stage 28a receives the prediction residual signal 26 and comprises a quantizer 30 which quantizes the samples of the prediction residual signal 26. As already mentioned above, the present example uses transform coding of the prediction residual signal 26 and accordingly, the lossy encoding stage 28a comprises a transform stage 32 connected between subtractor 22 and quantizer 30 so as to transform such a spectrally decomposed prediction residual 26 with a quantization of quantizer 30 taking place on the transformed coefficients where presenting the residual signal 26. The transform may be a DCT, DST, FFT, Hadamard transform or the like. The transformed and quantized prediction residual signal 34 is then subject to lossless coding by the lossless encoding stage 28*b* which is an entropy coder entropy coding quantized prediction residual signal 34 into data stream 12. Encoder 14 further comprises the prediction residual signal reconstruction stage 36 connected to the output of quantizer 30 so as to reconstruct from the transformed and quantized prediction residual signal 34 the prediction residual signal in a manner also available at the decoder, i.e. taking the coding loss is quantizer 30 into account. To this end, the prediction residual reconstruction stage 36 comprises a dequantizer 38 which perform the inverse of the quantization of quantizer 30, followed by an inverse transformer 40 which performs the inverse transformation relative to the transformation performed by transformer 32 such as the inverse of the spectral decomposition such as the inverse to any of the above-mentioned specific transformation examples. Encoder 14 comprises an adder 42 which adds the reconstructed prediction residual signal as output by inverse transformer 40 and the prediction signal 24 so as to output a reconstructed signal, i.e. reconstructed samples. This output is fed into a predictor 44 of encoder 14 which then determines the prediction signal 24 based thereon. It is predictor 44 which supports all the prediction modes already discussed above with respect to FIG. 1. FIG. 2 also illustrates that in case of encoder 14 being a video encoder, encoder 14 may also comprise an in-loop filter 46 with filters completely reconstructed pictures which, after having been filtered, form reference pictures for predictor 44 with respect to inter-predicted block.

As already mentioned above, encoder 14 operates block-based. For the subsequent description, the block-based operation of interest is the one subdividing picture 10 into blocks for which the intra-prediction mode is selected out of a set or plurality of intra-prediction modes supported by predictor 44 or encoder 14, respectively, and the selected intra-prediction mode performed individually. Other sorts of blocks into which picture 10 is subdivided may, however, exist as well. For instance, the above-mentioned decision whether picture 10 is inter-coded or intra-coded may be done at a granularity or in units of blocks deviating from blocks 18. For instance, the inter/intra mode decision may be performed at a level of coding blocks into which picture 10 is subdivided, and each coding block is subdivided into prediction blocks. Prediction blocks with encoding blocks for which it has been decided that intra-prediction is used, are each subdivided to an intra-prediction mode decision. To this, for each of these prediction blocks, it is decided as to which supported intra-prediction mode should be used for the respective prediction block. These prediction blocks will form blocks 18 which are of interest here. Prediction blocks within coding blocks associated with inter-prediction would be treated differently by predictor 44. They would be inter-predicted from reference pictures by determining a motion vector and copying the prediction signal for this block from a location in the reference picture pointed to by the motion vector. Another block subdivisioning pertains to the subdivisioning into transform blocks at units of which the transformations by transformer 32 and inverse transformer 40 are performed. Transformed blocks may, for instance, be the result of further subdivisioning coding blocks. Naturally, the examples set out herein should not be treated as being limiting and other examples exist as well. For the sake of completeness only, it is noted that the subdivisioning into coding blocks may, for instance, use multi-tree subdivisioning, and prediction blocks and/or transform blocks may be obtained by further subdividing coding blocks using multi-tree subdivisioning, as well.

Figure 3:
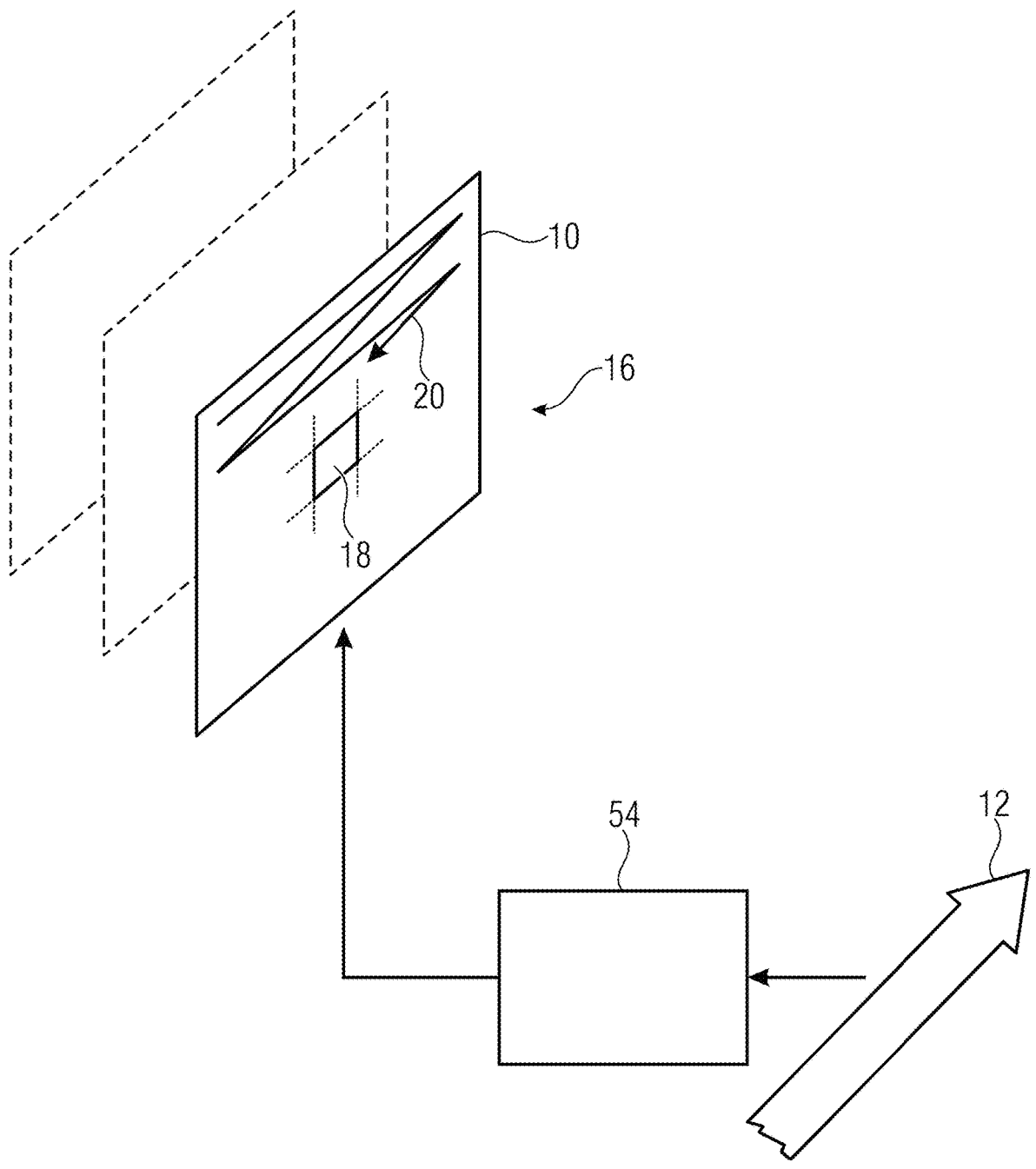
FIG. 3 shows an embodiment of a reconstruction of a picture.

A decoder 54 or apparatus for block-wise decoding fitting to the encoder 14 of FIG. 1 is depicted in FIG. 3. This decoder 54 does the opposite of encoder 14, i.e. it decodes from data stream 12 picture 10 in a block-wise manner and supports, to this end, a plurality of intra-prediction modes. The decoder 54 may comprise a residual provider 156, for example. All the other possibilities discussed above with respect to FIG. 1 are valid for the decoder 54, too. To this, decoder 54 may be a still picture decoder or a video decoder and all the prediction modes and prediction possibilities are supported by decoder 54 as well. The difference between encoder 14 and decoder 54 lies, primarily, in the fact that encoder 14 chooses or selects coding decisions according to some optimization such as, for instance, in order to minimize some cost function which may depend on coding rate and/or coding distortion. One of these coding options or coding parameters may involve a selection of the intra-prediction mode to be used for a current block 18 among available or supported intra-prediction modes. The selected intra-prediction mode may then be signaled by encoder 14 for current block 18 within data stream 12 with decoder 54 redoing the selection using this signalization in data stream 12 for block 18. Likewise, the subdivisioning of picture 10 into blocks 18 may be subject to optimization within encoder 14 and corresponding subdivision information may be conveyed within data stream 12 with decoder 54 recovering the subdivision of picture 10 into blocks 18 on the basis of the subdivision information. Summarizing the above, decoder 54 may be a predictive decoder operating on a block-bases and besides intra-prediction modes, decoder 54 may support other prediction modes such as inter-prediction modes in case of, for instance, decoder 54 being a video decoder. In decoding, decoder 54 may also use the coding order 20 discussed with respect to FIG. 1 and as this coding order 20 is obeyed both at encoder 14 and decoder 54, the same neighboring samples are available for a current block 18 both at encoder 14 and decoder 54. Accordingly, in order to avoid unnecessary repetition, the description of the mode of operation of encoder 14 shall also apply to decoder 54 as far the subdivision of picture 10 into blocks is concerned, for instance, as far as prediction is concerned and as far as the coding of the prediction residual is concerned. Differences lie in the fact that encoder 14 chooses, by optimization, some coding options or coding parameters and signals within, or inserts into, data stream 12 the coding parameters which are then derived from the data stream 12 by decoder 54 so as to redo the prediction, subdivision and so forth.

Figure 4:
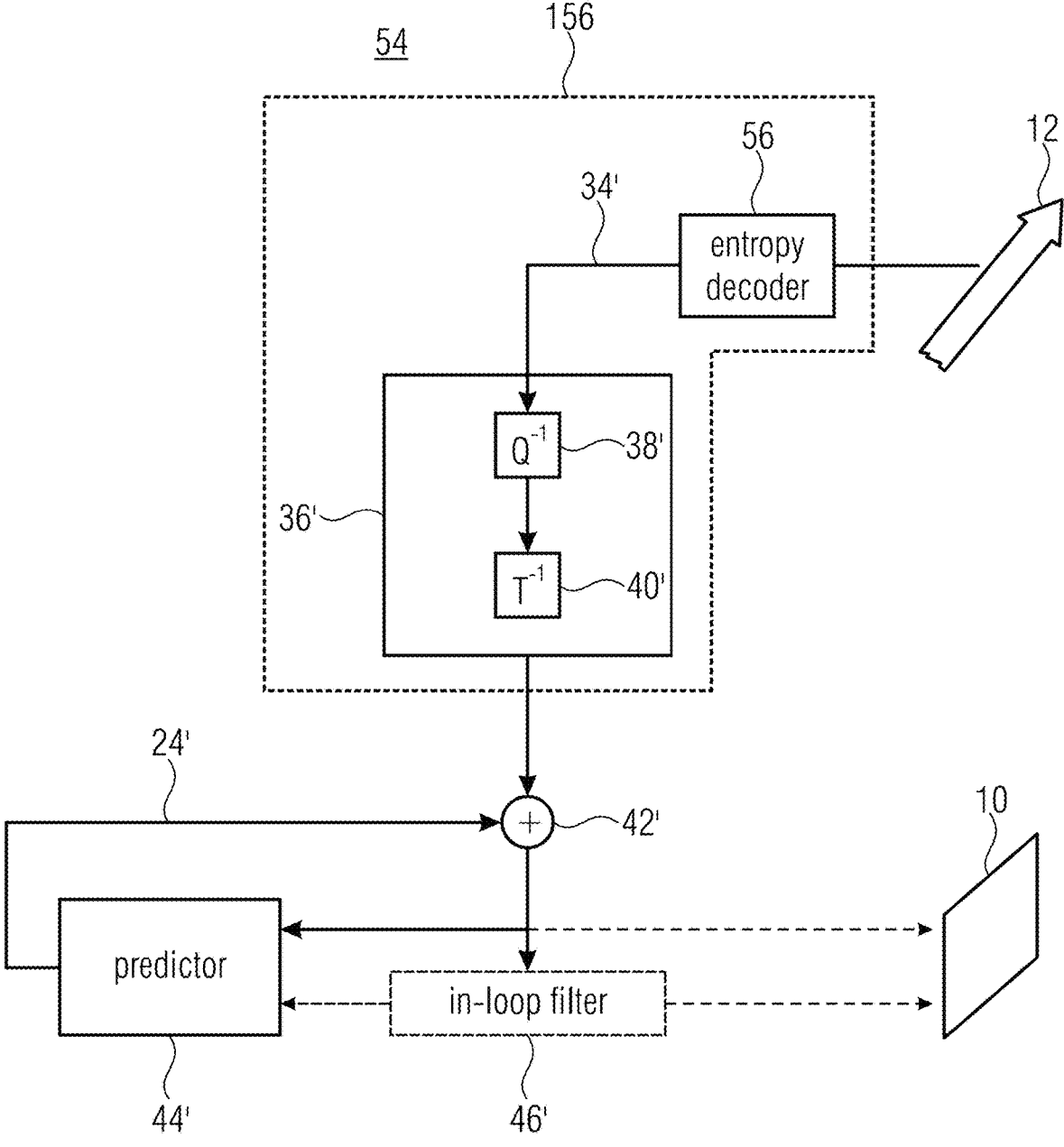
FIG. 4 shows an embodiment of a decoder.

FIG. 4 shows a possible implementation of the decoder 54 of FIG. 3, namely one fitting to the implementation of encoder 14 of FIG. 1 as shown in FIG. 2. As many elements of the encoder 54 of FIG. 4 are the same as those occurring in the corresponding encoder of FIG. 2, the same reference signs, provided with an apostrophe, are used in FIG. 4 in order to indicate these elements. In particular, adder 42', optional in-loop filter 46' and predictor 44' are connected into a prediction loop in the same manner that they are in encoder of FIG. 2. The reconstructed, i.e. dequantized and retransformed prediction residual signal applied to added 42' is derived by a sequence of entropy decoder 56 which inverses the entropy encoding of entropy encoder 28*b*, followed by the residual signal reconstruction stage 36' which is composed of dequantizer 38' and inverse transformer 40' just as it is the case on encoding side. The decoder's output is the reconstruction of picture 10. The reconstruction of picture 10 may be available directly at the output of adder 42' or, alternatively, at the output of in-loop filter 46'. Some post-filter may be arranged at the decoder's output in order to subject the reconstruction of picture 10 to some post-filtering in order to improve the picture quality, but this option is not depicted in FIG. 4.

Again, with respect to FIG. 4 the description brought forward above with respect to FIG. 2 shall be valid for FIG. 4 as well with the exception that merely the encoder performs the optimization tasks and the associated decisions with respect to coding options. However, all the description with respect to block-subdivisioning, prediction, dequantization and retransforming is also valid for the decoder 54 of FIG. 4.

The embodiments described herein make use of a so-called matrix-based intra-prediction. The general concept is outlined below.

Review of Matrix Based Intra Prediction

In order to keep the present application self-contained, in this section, the main steps of the current matrix based intra prediction (MIP) method included in the Working Draft 7 of the Versatile Video Coding [1] are described. For more details, it is referred to [1].

Matrix based intra prediction (MIP) is a method for generating an intra prediction signal on a rectangular block of width W and height H. Input for the MIP-prediction process are the reconstructed samples r consisting of the reconstructed samples $r_{top}$ of one row above the block and of the reconstructed samples $r_{left}$ of one column left of the block, a MIP-mode-index i and the information whether the MIP-mode is to be transposed or not. Then, the MIP-prediction signal is generated using the following three steps:

1. For specified natural numbers $w_{in,red}$ and $h_{in,red}$ that depend on W and H and satisfy $w_{in,red} \leq W$ and $h_{in,red} \leq H$, out of $r_{top}$ one generates the reduced top input $r_{top,red}$ of size $w_{in,red}$ by down-sampling/averaging and out of $r_{left}$ one generates the reduced left input $r_{left,red}$ of size $h_{in,red}$ by down-sampling/averaging. Then, one concatenates $r_{top,red}$ and $r_{left,red}$ to the reduced input $r_{red,full}$ which is defined as $$r_{red,full} = [r_{top,red}, r_{left,red}],$$

if the MIP-mode is not to be transposed and as $$r_{red,full} = [r_{left,red}, r_{top,red}],$$

if the MIP-mode is to be transposed. Next, out of $r_{red,full}$ one defines the reduced input $r_{red}$. Here, $r_{red}$ is either of the same size $w_{in,red} + h_{in,red}$ as $r_{red,full}$ or of size $w_{in,red} + h_{in,red} - 1$. In the first case, $r_{red}$ is defined as $$r_{red}[0] = r_{red,full}[0] - 2^{B-1},$$

where B is the bit-depth and as $$r_{red}[i] = r_{red,full}[i] - r_{red,full}[0],$$

$$i > 0.$$

In the second case, $r_{red}$ is defined as $$r_{red}[i] = r_{red,full}[i+1] - r_{red,full}[0].$$

2. For specified natural numbers $w_{out,red}$ and $h_{out,red}$ that depend on W and H and satisfy $w_{out,red} \leq W$ and $h_{out,red} \leq H$, one generates the reduced prediction signal $pred_{red}$ on a block of width $w_{out,red}$ and height $h_{out,red}$ as $$pred_{red} = ((A_i - c_i) \cdot r_{red} + (1 \ll (d_i - 1))) \gg d_i.$$

Here $A_i$ is a matrix that depends on W and H and on the MIP-mode-index i and, $c_i$ and $d_i$ are non-negative integers that depend on the MIP-mode-index i, where this dependency is to be removed by the present invention. Moreover, $pred_{red}$ is a $w_{out,red} \cdot h_{out,red}$—dimensional vector that is identified with a signal on a block of width $w_{out,red}$ and height $h_{out,red}$ in a row-major order, if the MIP-mode does not need to be transposed, and in a column-major order, if the MIP-mode needs to be transposed.

Afterwards, one adds $r_{red,full}[0]$ to $pred_{red}$.

Finally, the result is clipped to the given bit-range $[0, 2^B)$.

3. If $w_{out,red} < W$ or $h_{out,red} < H$, one applies up-sampling/ linear interpolation to generate the full MIP-prediction signal out of the reduced prediction signal obtained at the end of the previous step. Here, the reconstructed samples are included in the linear interpolation.

Presentation of Implementation Examples

The general concept has been outlined above. The concept is sometimes called ALWIP (Affine-linear weighted intra prediction) in the following, as an alternative synonym for MIP (Matrix-based Intra Prediction), in order to explain the usage of these modes again in more detail.

The entire process of populating the input vector on the basis of the neighborhood, computing the matrix-vector-multiplication and linear interpolation is illustrated for different blocks shapes in the subsequent FIGS. 5.1-5.4. Note, that the remaining shapes are treated as in one of the depicted cases.

1. Given a 4×4 block, ALWIP (or MIP) may take two averages along each axis of the boundary, see FIG. 5.1. As an alternative of averaging, every second sample of the neighborhood is taken, or to be more general and precise, every component of the input vector for the matrix-vector-multiplication 19 is taken from exactly one sample in the neighborhood. The resulting four input samples enter the matrix-vector-multiplication. The matrices are taken from the set $S_0$, which is a set of matrices for the block size at hand. After adding an offset, this may yield the 16 final prediction samples. Linear interpolation is not necessary for generating the prediction signal. Thus, a total of $(4*16)/(4*4)=4$ multiplications per sample are performed. See, for example, FIG. 5.1 illustrating ALWIP for 4×4 blocks. The exact computation has been explained above.

2. Given a 8×8 block, ALWIP may take four averages along each axis of the boundary, see FIG. 5.2. The resulting eight input samples enter the matrix-vector-multiplication 19. The matrices are taken from the set $S_1$. This yields 16 samples on the odd positions of the prediction block. Thus, a total of (8*16)/(8*8)=2 multiplications per sample are performed. After adding an offset, these samples are interpolated vertically by using the reduced top boundary. Horizontal interpolation follows by using the original left boundary. See, for example, FIG. 5.2 illustrating ALWIP for 8×8 blocks.

3. Given a 8×4 block, ALWIP may take four averages along the horizontal axis of the boundary and the four original boundary values on the left boundary, see FIG. 5.3. The resulting eight input samples enter the matrix-vector-multiplication. The matrices are taken from the set $S_1$. This yields 16 samples on the odd horizontal and each vertical positions of the prediction block. Thus, a total of (8*16)/(8*4)=4 multiplications per sample are performed. After adding an offset, these samples are interpolated horizontally by using the original left boundary. See, for example, FIG. 5.3 illustrating ALWIP for 8×4 blocks.

The transposed case is treated accordingly.

4. Given a 16×16 block, ALWIP may take four averages along each axis of the boundary. The resulting eight input samples enter the matrix-vector-multiplication. The matrices are taken from the set $S_2$. This yields 64 samples on the odd positions of the prediction block. Thus, a total of (8*64)/(16*16)=2 multiplications per sample are performed. After adding an offset, these samples are interpolated vertically by using eight averages of the top boundary. Horizontal interpolation follows by using the original left boundary. See, for example, FIG. 5.4 illustrating ALWIP for 16×16 blocks.

For larger shapes, the procedure may be essentially the same and it is easy to check that the number of multiplications per sample is less than two.

For W×8 blocks, only horizontal interpolation is necessary as the samples are given at the odd horizontal and each vertical positions. Thus, at most (8*64)/(16*8)=4 multiplications per sample are performed in these cases.

Finally for W×4 blocks with W>8, let $A_k$ be the matrix that arises by leaving out every row that correspond to an odd entry along the horizontal axis of the down-sampled block. Thus, the output size may be 32 and again, only horizontal interpolation remains to be performed. At most (8*32)/(16*4)=4 multiplications per sample may be performed.

The transposed cases may be treated accordingly. This is illustrated in the subsequent figures.

FIG. 6.1 shows an apparatus 54 for decoding a predetermined block 18 of a picture using intra-prediction.

The apparatus 54 is configured to read, from a data stream 12, a mode index 200 using a binarization code 202, the mode index pointing to one out of a list 204 of matrix-based intra-prediction modes. The list 204 of matrix-based intra-prediction modes consists of an even number of matrix-based intra-prediction modes, wherein the matrix-based intra-prediction modes of the list 204 are grouped into pairs 212 of matrix-based intra-prediction modes. Each pair 212 consists of a first matrix-based intra-prediction mode and a second matrix-based intra-prediction mode. The apparatus 54 is configured to read, from the data stream 12, the mode index 200 using the binarization code 202 in a manner so that for each pair 212 of matrix-based intra-prediction modes the first matrix-based intra-prediction mode is assigned a first codeword and the second matrix-based intra-prediction mode is assigned a second codeword and both codewords are equal in length.

Optionally, the binarization code 202 is a variable length code, the variable length code comprises codewords of different lengths. Alternatively, the binarization code may be a truncated binary code and the number of matrix-based intra-prediction modes is not a power of two, so that the truncated binary code has codewords of different lengths. A matrix-based intra-prediction mode associated with a first pair 212 of matrix-based intra-prediction modes may be assigned a codeword different in length as a codeword assigned to matrix-based intra-prediction mode associated with a second pair 212 of matrix-based intra-prediction modes.

However, both codewords of a pair 212 of matrix-based intra-prediction modes are equal in length.

According to an embodiment, the apparatus 54 may be configured to read the mode index 200 from the data stream 12 using an equi-probability bypass mode of a context adaptive binary arithmetic decoder.

Similarly, to the apparatus 54 (i.e. a decoder) for decoding the predetermined block 18 of the picture using intra-prediction, an apparatus (i.e. an encoder) for encoding the predetermined block 18 of the picture using intra-prediction can be configured to encode the mode index 200 into the data stream 12 using the binarization code 202 and optionally using the equi-probability bypass mode of a context adaptive binary arithmetic encoder.

The decoder and the encoder are configured to predict samples 108 of the predetermined block 18 by computing a matrix-vector product 206 between an input vector 102 derived from reference samples 17 in a neighborhood of the predetermined block 18 and a prediction matrix 19 associated with the matrix-based intra-prediction mode k pointed to by the mode index 200. The computation of the matrix-vector product 206 results in an output vector 208. Furthermore, the samples 108 of the predetermined block 18 are predicted by associating components 210 of the output vector 208 obtained by the matrix-vector product 206 onto sample positions 104 of the predetermined block 18. This prediction of the samples 108 of the predetermined block 18 may be performed as described with regard to FIGS. 5.1 to 5.4.

For each pair 212 of matrix-based intra-prediction modes, the prediction matrix 19 associated with a first matrix-based intra-prediction mode of the respective pair 212 of matrix-based intra-prediction modes is equal to the prediction matrix 19 associated with a second matrix-based intra-prediction mode of the respective pair 212 of matrix-based intra-prediction modes. Thus, for matrix-based intra-prediction modes 2k and 2k+1, the same prediction matrix 19 is used. For each pair 212 of matrix-based intra-prediction modes, the encoder and the decoder are configured so that, if the matrix-based intra-prediction mode pointed to by the mode index 200 is the first matrix-based intra-prediction mode of the respective pair 212 of matrix-based intra-prediction modes, e.g. a mode with odd mode index 2k+1, an association of the reference samples 17 in the neighborhood of the predetermined block 18 with components 214 of the input vector 112 and of the sample positions 104 of the predetermined block 18 with the components 210 of the output vector 208 is transposed relative to the association in case of the matrix-based intra-prediction mode pointed to by the mode index 200 being the second matrix-based intra-prediction mode of the respective pair 212 of matrix-based intra-prediction modes, e.g. a mode with even mode index 2k.

The decoder/encoder might be configured to determine whether the matrix-based intra-prediction mode pointed to by the mode index 200 is the first matrix-based intra-prediction mode of the respective pair of matrix-based intra-prediction modes or the second matrix-based intra-prediction mode of the respective pair 212 of matrix-based intra-prediction modes, based on the parity of the mode index 200. The parity of the mode index 200 might indicate whether the input vector 102 and the output vector 208 are used in a transposed way or not for the prediction of the samples 108 of the predetermined block 18. That is, as shown in FIG. 6.2, if a certain component of the components 1 to n of the input vector 102 is associated with position (x,y) with (0,0) denoting the upper left corner sample AA of the predetermined block 18 in the former case, then it is associated with (y,x) in the latter case. The same applies to the components (AA, AB, AC, BA, CA, . . . ) of the output vector 208.

Each pair 212 consists of a first matrix-based intra-prediction mode and a second matrix-based intra-prediction mode, which modes are related to each other by the same prediction matrix 19 and only differ among each other in terms of the input vector 102 and the output vector 208 being transposed or not. This is advantageous, since only the mode index 200 is needed in the data stream 12, to indicate the matrix-based intra-prediction mode and whether the matrix-based intra-prediction mode is used in a transposed way or not. No additional index or flag is needed to indicate for the matrix-vector product 206, that the input vector 102 and the output vector 208 are to be used in a transposed way.

According to an embodiment, the decoder/encoder is configured to index the prediction matrix 19 out of a plurality of prediction matrices using the integer part of the mode index 200 divided by 2. This is based on the idea, that both matrix-based intra-prediction modes of a pair 212 use the same prediction matrix 19 for the prediction of the samples 108 of the predetermined block 18, for which reason the prediction matrix 19 is already sufficiently indicated by pointing with the mode index 200 to the relevant pair 212 in the list 204.

As shown in FIGS. 6.1 and 6.2, the decoder/encoder might be configured to set 217 an inter-sample distance 216 of the sample positions 104 of the predetermined block 18 and an inter-sample distance 218 of the reference samples 17 in the neighborhood of the predetermined block 18 horizontally according to a first ratio of a horizontal dimension 220 of the predetermined block 18 relative to a horizontal default dimension and/or vertically according to a second ratio of a vertical dimension 222 of the predetermined block 18 relative to a vertical default dimension. This enables the usage of the list 204 of matrix-based intra-prediction modes for a plurality of block dimensions. The apparatus might fill spaces between the predicted samples by interpolation. The inter-sample distance setting 217 of the inter-sample distance 216 of the sample positions 104 of the predetermined block 18 and of the inter-sample distance 218 of the reference samples 17 in the neighborhood of the predetermined block 18 enables an improved distribution of the predicted samples 108 in the predetermined block 18 and of the reference samples 17 in the neighborhood of the predetermined block 18. Thus, the predicted samples might be equally distributed enabling an improved interpolation of samples of the predetermined block 18.

According to an embodiment, the decoder/encoder is configured to order the matrix-based intra-prediction modes in the list 204 of matrix-based intra-prediction modes equally for the plurality of block dimensions. Alternatively, the order might be adapted to, for instance, the block being wider than high or vice versa, i.e. higher than wide, or quadratic. This ordering may increase the coding efficiency and reduce the bitstream, since matrix-based intra-prediction modes for common block dimensions may be associated with short codewords and matrix-based intra-prediction modes for rare block dimensions may be associated with longer codewords.

Optionally, the plurality of block dimensions includes at least one block dimension corresponding to an aspect-ratio of larger than 4. The matrix-based intra-prediction might be optimized such that the predetermined block 18 with an aspect-ratio of the horizontal dimension 220 to the vertical dimension 222 is larger than 4. That is, the plurality of block dimensions includes a predetermined block with an at least four times larger horizontal dimension 220 than the vertical dimension 222 and/or a predetermined block with an at least four times larger vertical dimension 222 than the horizontal dimension 220. FIG. 6.2 might show a predetermined block 18 with a block dimension corresponding to an aspect-ratio of larger than 4.

According to the embodiments proposed below, the MIP modes are applied in a manner which renders the usage of MIP even more efficient than compared to the usage so far anticipated in the current VVC version.

The embodiments in the following will mostly illustrate the features and functionalities in view of a decoder. However, it is clear that the same or similar features and functionalities can be comprised by an encoder, e.g., a decoding performed by a decoder can correspond to an encoding by the encoder. Furthermore, the encoder might comprise the same features as described with regard to the decoder in a feedback loop, e.g., in the prediction stage 36.

Figure 7:
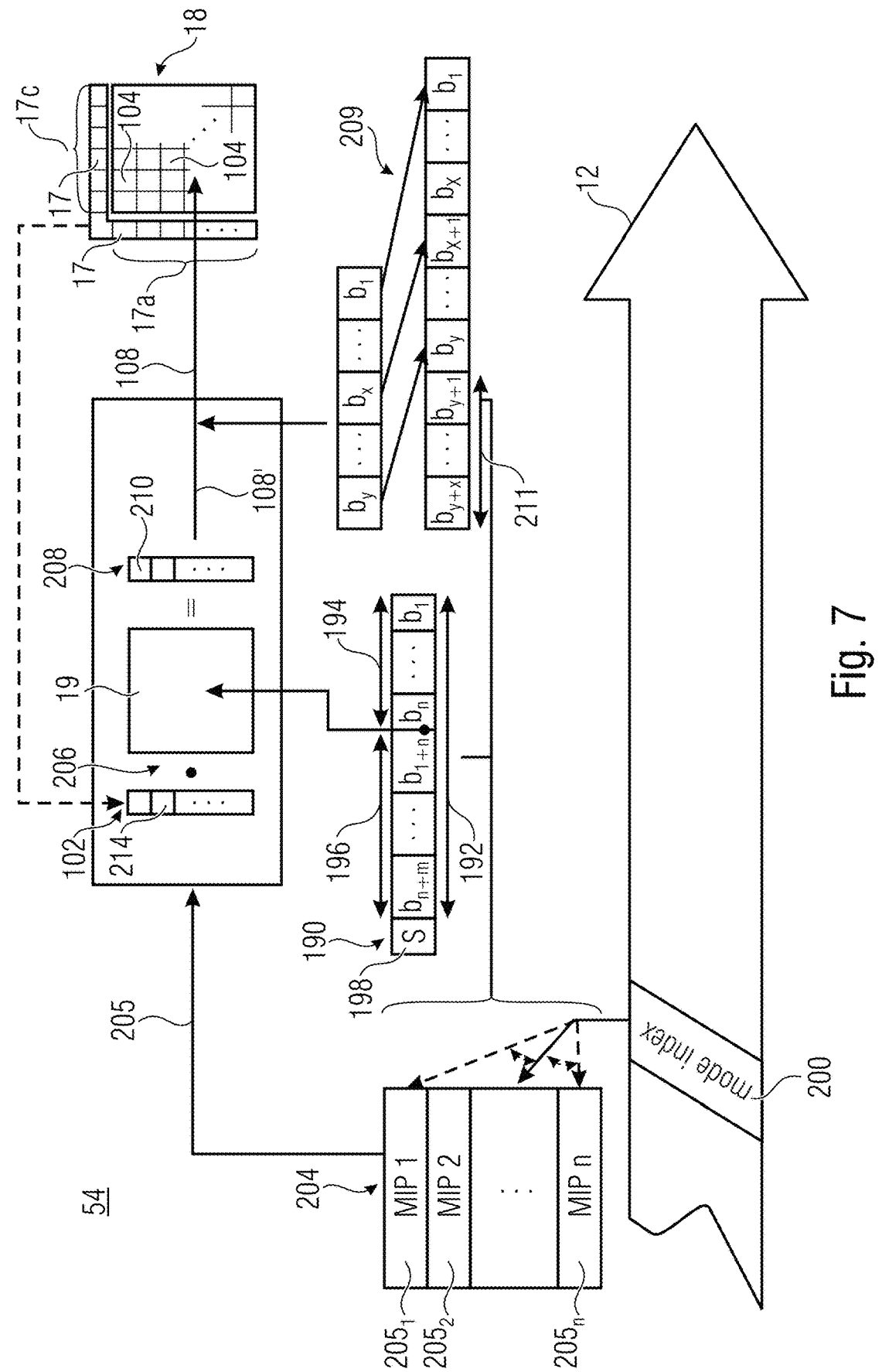
FIG. 7 shows an apparatus for decoding using a MIP-mode for prediction, according to an embodiment.

FIG. 7 shows an apparatus 54 for decoding a predetermined block 18 of a picture using intra-prediction.

The apparatus 54 is configured to read, from a data stream 12, a mode index 200. The mode index 200 points to one out of a list 204 of matrix-based intra-prediction modes $205_1$-$205_n$, i.e. a MIP-mode. The number n of matrix-based intra-prediction modes $205_1$-$205_n$ in the list 204 of matrix-based intra-prediction modes, e.g., is 12, 16 or 32. Also the embodiment is focused on intra-prediction using a MIP-mode $205_1$-$205_n$, it is clear that the mode index 200 might also be usable for indicating further modes, like further intra prediction modes and/or inter prediction modes. The mode index 200 might be inserted into the data stream 12 by an apparatus 14 for encoding the predetermined block 18 of the picture using intra-prediction.

According to an embodiment, the matrix-based intra-prediction modes $205_1$-$205_n$ in the list 204 of matrix-based intra-prediction modes have associated therewith 6, 8 or 16 different prediction matrices 19.

According to an embodiment, the list 204 of matrix-based intra-prediction modes comprises MIP-modes for a plurality of block dimensions.

According to an embodiment, there could exist two or more lists 204 of MIP-modes, wherein the two or more lists 204 of MIP-modes differ from each other in terms of a block size of the predetermined block 18 with which the MIP modes are associated. MIP-modes associated with the same or a similar block size are comprised in the same list of the two or more lists 204 of MIP-modes. For example, there could be different lists for mutually exclusive block size sets, one with 6 different matrices associated with 12 modes for block sizes within a first block size set, one with 8 different matrices associated with 16 modes for smaller block sizes within a second block size set and one with 16 different matrices associated with 32 modes for even smaller block sizes within a third block size set. This is only an example and it is clear that also a different number of lists 204 is possible and that each list might comprise MIP-modes associated with a block size set different from the ones described above.

The apparatus 54 is configured to predict samples 108 of the predetermined block 18 by computing a matrix-vector product 206 between an input vector 102 derived from reference samples 17 in a neighborhood of the predetermined block 18 and a prediction matrix 19 associated with the matrix-based intra-prediction mode 205 pointed to by the mode index 200 and associating components 210 of an output vector 208 obtained by the matrix-vector product 206 onto sample positions 104 of the predetermined block 18.

For each matrix-based intra-prediction mode $205_1$-$205_n$, all entries of the prediction matrix 19 associated with the respective matrix-based intra-prediction mode 205 are represented by a fixed point representation 190 of a predetermined bit-depth 192. The fixed point representation 190 might have a fractional part 194 with n bits, an integer part 196 with m bits and optionally a sign bit 198. The predetermined bit-depth 192 is equal for all matrix-based intra-prediction modes $205_1$-$205_n$ of the list 204 of MIP modes, as shown in FIG. 7, compare constraint 1 below. In case there exist two or more lists 204 of MIP-modes, for each list of the two or more lists 204 of MIP-modes, the predetermined bit-depth 192, for example, is equal for all matrix-based intra-prediction modes $205_1$-$205_n$ of the respective list of MIP modes. In other words, the predetermined bit-depth 192, e.g., is at least the same for the MIP-modes relating to the same block size set.

According to an embodiment, the apparatus 54 is configured to store, for each matrix-based intra-prediction mode $205_1$-$205_n$, for each entry of the prediction matrix 19 associated with the respective matrix-based intra-prediction mode 205, the fixed point representation in the predetermined bit-depth. This, for example, is illustrated in the table examples below, see listing 1 to listing 4.

For each matrix-based intra-prediction mode $205_1$-$205_n$, the apparatus 54 is configured to compute the matrix-vector product 206 between the input vector 102 and the prediction matrix 19 associated with the respective matrix-based intra-prediction mode 205 by performing, for each component 210 of the output vector, a right shift 209 at a number 211 of bits which is equal for all matrix-based intra-prediction modes $205_1$-$205_n$ of the list 204 of MIP-modes, as shown in FIG. 7. The number 211 of bits for the right shift, e.g., are x bits. In case there exist two or more lists 204 of MIP-modes, for each list of the two or more lists 204 of MIP-modes, the number 211 of bits, for example, is equal for all matrix-based intra-prediction modes $205_1$-$205_n$ of the respective list of MIP modes. In other words, the number 211 of bits, e.g., is at least the same for the MIP-modes relating to the same block size set. The right shift 209, e.g., is indicated by $>>$ in the above described equation (2) and for the number 211 of bits compare $d_i$, wherein the apparatus 54 applies the constraint that the number 211 of bits is equal for the matrix-based intra-prediction modes $205_1$-$205_n$, compare constraint 2 below.

The following constraints on the matrices $A_i$, i.e. the prediction matrices 19, and the parameters $c_i$ and $d_i$ in equation (2) are desirable.

1. The range of the matrix entries used for MIP is fixed, e.g., the entries of the prediction matrix 19 are represented by a fixed point representation 190 of a predetermined bit-depth 192. Thus, there exist, e.g., predefined non-negative integers $\mu_{1,low}$, $\mu_{1,up}$ and $\mu_{2,low}$, $\mu_{2,up}$ such that for each MIP mode i $205_1$-$205_n$ and for each matrix entry $a_{k,l}$ of the matrix $A_i$, i.e. the prediction matrix 19, one has $$-2^{\mu_{1,low}} \le a_{k,l} \le 2^{\mu_{1,up}} - 1$$

and $$-2^{\mu_{2,low}} \le a_{k,l} - c_i \le 2^{\mu_{2,up}} - 1.$$

Two particular examples of this constraint are given as follows.

The first example is that for a fixed positive integer $\mu$, for all matrix entries $a_{k,l}$ of all matrices $A_i$ used in the MIP-prediction one has $$0 \le a_{k,l} \le 2^{\mu} - 1$$

and $$-2^{\mu} \le a_{k,l} - c_i \le 2^{\mu} - 1.$$

According to the first example, the entries of the prediction matrix 19 associated with the respective matrix-based intra-prediction mode 205 are of the same sign, e.g. positive, and the apparatus 54 is configured to, prior to computing the matrix-vector product 206, offset, for each matrix-based intra-prediction mode $205_1$-$205_n$, all entries of the prediction matrix 19 associated with the respective matrix-based intra-prediction mode 205 by an offset value $c_i$ which is equal for the matrix-based intra-prediction modes $205_1$-$205_n$ wherein, for each matrix-based intra-prediction mode $205_1$-$205_n$, all entries of the prediction matrix 19 associated with the respective matrix-based intra-prediction mode 205 are representable by a signed 8-bit representation. Accordingly, according to this alternative, merely a 7-bit magnitude might be stored for each matrix entry. This is due to the fact, that the sign bit doesn't have to be stored.

The second example is that one has $$c_i=0$$

for each MIP mode i $205_1$-$205_n$ and that there exists a fixed positive integer v such that for each MIP mode i $205_1$-$205_n$ and each matrix entry $a_{k,l}$ of the matrix $A_i$ one has $$-2^{v} \le a_{k,l} \le 2^{v} - 1.$$

According to the second example, the apparatus 54 is configured to store, for each matrix-based intra-prediction mode $205_1$-$205_n$, the entries of the prediction matrix 19 associated with the respective matrix-based intra-prediction mode 205 in 8-bit sign-magnitude representation. In this second example the apparatus 54 does not, prior to computing the matrix-vector product 206, offset the entries of the prediction matrix 19 associated with the respective matrix-based intra-prediction mode 205 by an offset value $c_i$.

2. The shift values $d_i$, i.e. the number 211 of bits for the right shift 209, are independent of the MIP-mode i 205$_1$-205$_n$. Thus, there exists a positive integer d such that one has $$d_i = d$$

for each MIP-mode i 205$_1$-205$_n$.

Optionally, also the following constraint may be desirable:

3. The values $c_i$, i.e. an offset to entries of the prediction matrix 19, are independent of the MIP-mode i 205$_1$-205$n$. Thus, there exists a positive integer c such that one has $$c_i = c$$

for each MIP-mode i 205$_1$-205$_n$.

Thus, the apparatus 54 might be configured to, prior to computing the matrix-vector product 206, offset, e.g. by addition or by subtraction, for each matrix-based intra-prediction mode 205$_1$-205$_n$, all entries of the prediction matrix 19 associated with the respective matrix-based intra-prediction mode 205 by an offset value, compare c, which is equal for all matrix-based intra-prediction modes 205$_1$-205$_n$ of the list 204 of MIP-modes.

In case of two or more lists 204 of MIP-modes, for each list of the two or more lists 204 of MIP-modes, the offset value c, for example, is equal for all matrix-based intra-prediction modes 205$_1$-205$_n$ of the respective list of MIP modes. In other words, the offset value c, e.g., is at least the same for the MIP-modes relating to the same block size set.

The reasons why one imposes these constraints are as follows. Constraint 1 enables an efficient implementation of the matrix-vector multiplication 206 ($A_i$–$c_i$)·$r_{red}$ of equation (2) since if the entries of all matrices ($A_i$–$c_i$) have a common fixed bit-depth, i.e. a predetermined bit-depth 192, specific multipliers adapted to that bit-depth can be used and shared across all MIP-modes 205$_1$-205$_n$ for the computation of the matrix-vector product 206. Moreover, an efficient memory-management when dealing with the matrices $A_i$ is enabled if all entries of all matrices $A_i$ can be stored in fixed precision, i.e. the entries of the prediction matrix 19 are represented in a fixed point representation 190. Here, an important example is that all entries of all matrices $A_i$ can be stored in 8-bit precision, i.e. in one byte. In other words, the entries of the prediction matrix 19 might be represented in a fixed point representation 190 with the predetermine bit-depth 192 being 8-bit.

Constraint 2 enables an efficient implementation of the shifts in the expression (2), since if the shift-value, i.e. the number 211 of bits for the right shift, does not depend on the MIP-mode i, a table-lookup is saved and a single fixed shifting operation can be implemented for MIP which is beneficial for a compact SIMD-implementation of equation (2) and which reduces a case-dependent implementation of equation (2), i.e. of a matrix-vector product 206 approximating a matrix-vector product with a prediction matrix in floating point precision, in a hardware implementation. Here, a particularly important example is that the value 6 is used as a fixed shift, i.e. as the number 211 of bits. The reason is that for 10-bit content, a clipping to the 10-bit range is applied to pred$_{red}$ in the MIP-prediction process. Thus, before down-shifting by 6, i.e. performing the right shift 209 with the number 211 of bits being 6, in equation (2), one can store the term $$(A_i - c_i) \cdot r_{red} + (1 \ll (d_i - 1))$$

in 16 bit, i.e. 2 bytes, wherein the term ($A_i$–$c_i$)·$r_{red}$+(1<<($d_i$–1)) represents an intermediate result 108' obtained by the matrix-vector product 206 for each component 210 of the output vector 208.

According to an embodiment, the apparatus 54 is configured to compute the matrix-vector product 206 between the input vector 102 and the prediction matrix 19 associated with the respective matrix-based intra-prediction mode 205 in fixed point arithmetic with applying the right shift 209 onto the intermediate result 108', e.g. ($A_i$–$c_i$)·$r_{red}$+(1<<($d_i$–1)), obtained by the matrix-vector product 206 for each component 210 of the output vector 208. Optionally, the intermediate result 108' is represented at bit precision which is at least twice as high as a bit precision at which the entries of the prediction matrix 19 associated with the matrix-based intra-prediction modes are stored, e.g. the intermediate result 108' might be stored in 16-bit and the entries of the prediction matrix 19 might be stored as a 7-bit magnitude or as a signed 8-bit representation.

According to an embodiment, the apparatus is configured to decode the picture in 10-bit resolution, store, for each matrix-based intra-prediction mode 205$_1$-205$_n$, a magnitude of the entries of the prediction matrix 19 associated with the respective matrix-based intra-prediction mode in a 7-bit precision, and use 6 bits as the number 211 of bits.

Similar to Constraint 2), Constraint 3) enables a more efficient implementation of equation (2) saving again a table-lookup.

The problem that the present application intends to solve is that it is not obvious how Constraint 2 or Constraint 3 should be satisfied together with Constraint 1 such that equation (2) serves as an approximation for equation (1).

Assume for example that by Constraint 1, all matrix entries of each MIP-matrix $A_i$ have to be stored in 8-bit precision and that by Constraint 2, the fixed shift $d_i$=6 has to be used for all MIP-modes i in equation (2). Also, assume for simplicity that $c_i$=0. This would mean that if equation (2) should approximate equation (1), for each floating point matrix $A_i^{float}$ that is a result of the training-algorithm for MIP, there has to exist a non-negative integer $c_i$ such that each entry $a_{k,i}^{float}$ of $A_i^{float}$ has to satisfy $$2^6 \cdot \left| a_{k,i}^{float} \right| \leq 2^7 + \varepsilon, \tag{3}$$

where $\varepsilon$ is reasonably small so that putting $$A_i := \mathrm{clip}\left(\mathrm{round}\left(2^6 \cdot A_i^{float}\right), 2^7\right) \tag{4}$$

one can execute equation (2) to reasonably approximate equation (1). Here, the rounding round is applied to each entry of the matrix. Moreover, for a real number x one defines $$\mathrm{clip}(x, 2^7) := \min(\max(x, -2^7), 2^7 - 1)$$

and denotes by clip $(A, 2^7)$, A a matrix, the matrix that arises by applying clip $(-, 2^7)$ to each entry of A. Note that the matrix $A_i$ defined in assignment (4) has to approximate $A_i^{float}$ reasonably well if one assumes that there exists a matrix $A'_i$ with integral entries in the 8-bit range for which equation (2) approximates equation (1) for variable input vectors $r_{red}$ with the fixed shift 6.

On the other hand, a priori, there is no reason why a training algorithm whose output are MIP-matrices $A_i^{float}$ should yield matrices $A_i^{float}$ which are approximated by the corresponding matrices $A_i$ defined in (4). The problem is that $A_i^{float}$ may contain matrix entries of absolute value greater than $2=2^7/2^6$ and that thus the clipping in equation (4) introduces a substantial difference between (1) and (2) by discarding parts of the most significant matrix entries of the matrices $A_i^{float}$. Thus, applying (4) a posteriori to trained matrices $A_i^{float}$ may lead to the phenomenon that the MIP prediction modes which are specified in a codec and which need to execute the matrix-vector product in equation (2) using the matrices $A_i$ largely deviate from the behavior of the "true", i.e. the trained MIP-modes which use a matrix-vector product with the matrices $A_i^{float}$. Thus, the whole concept of the data driven approach to intra prediction which stands behind MIP would be violated.

In fact, it can be observed that applying equation (4) to the trained matrices $A_i^{float}$ which are the basis of the MIP-modes used in the current VVC-draft [1] significantly changes the behavior of some MIP-modes when compared to the underlying trained modes since some of the matrices $A_i^{float}$ contain entries that are much larger than 2.

Finally, note that to solve solely Constraint 1 without Constraint 2 is trivial as long as the entries of each matrix $A_i^{float}$ lie between $-2^7$ and $2^7-1$, which is the case for the matrices $A_i^{float}$ that stand behind the MIP-modes of the current VVC-draft [1]. Here, assuming $c_i=0$ for the moment, one simply defines the shift-value $d_i$ such that $$-2^7 \le 2^{d_i} \cdot a_{k,l}^{float} \le 2^7 - 1 \qquad (5)$$

holds for each matrix-entry $a_{k,l}^{float}$ of $A_i^{float}$ and such that (5) does not hold for any $d'_i > d_i$.

Further it is to be said, that the apparatus 54 might comprise features and/or functionalities as described with regard to FIGS. 6.1 and 6.2. This means, for example, that the list 204 of matrix-based intra-prediction modes $205_1$-$205_n$ comprises one or more pairs 212 of matrix-based intra-prediction modes. Note that the list 204 may not be exclusively composed of such pairs 212 of MIP-modes as they are depicted to be present in list 204 in FIG. 6.1, rather there may also be other MIP-modes which are either applied using the transpose-option or the non-transpose option exclusively. For each pair 212 of matrix-based intra-prediction modes $205_1$-$205_n$, the prediction matrix 19 associated with a first matrix-based intra-prediction mode of the respective pair 212 of matrix-based intra-prediction modes is equal to the prediction matrix 19 associated with a second matrix-based intra-prediction mode of the respective pair of matrix-based intra-prediction modes, e.g. for modes 2k and 2k+1, the same matrix 19 is used. The apparatus is configured so that, if the matrix-based intra-prediction mode 205 pointed to by the mode index 200 is the first matrix-based intra-prediction mode of the respective pair 212 of matrix-based intra-prediction modes an association of the reference samples 17 in the neighborhood of the predetermined block with components 214 of the input vector 112 and of the sample positions 104 of the predetermined block 18 with the components 210 of the output vector 208 is transposed relative to the association in case of the matrix-based intra-prediction mode 205 pointed to by the mode index 200 being the second matrix-based intra-prediction mode of the respective pair 212 of matrix-based intra-prediction modes. That is, if a certain component of input vector 102 is associated with position (x,y) with (0,0) denoting the upper left corner sample of the predetermined block 18 in the former case, then it is associated with (y,x) in the latter case. The same applies to the components of the output vector 208. For more details, see description of FIGS. 6.1 and 6.2.

Further it is to be said, that the apparatus 54 might comprise features and/or functionalities as described with regard to FIGS. 5.1 to 5.4.

According to an embodiment, the apparatus 54 is configured to predict samples of the predetermined block 18 which are offset from the sample positions with which the components 210 of the output vector 208 are associated, by up-sampling and/or interpolation on the basis of the output vector 208 or on the basis of the output vector 208 and the reference samples 17 in the neighborhood of the predetermined block 18, as, for example, shown in one of FIGS. 5.1 to 5.4.

According to an embodiment, the apparatus 54 is configured to derive the input vector 102 from the reference samples 17 in the neighborhood of the predetermined block 18 by down-sampling and/or pooling, as, for example, shown in one of FIGS. 5.1 to 5.4.

According to an embodiment, the reference samples 17 in the neighborhood of the predetermined block 18 comprise first reference samples 17c above the predetermined block 18 and second reference samples 17a to the left of the predetermined block 18. The apparatus 54 is configured to derive the input vector 102 from the reference samples 17 in the neighborhood of the predetermined block 18 by deriving first intermediate components from the first reference samples 17c by down-sampling and/or pooling, deriving second intermediate components from the second reference samples 17a by down-sampling and/or pooling, concatenating the first intermediate components and the second intermediate components to derive a preliminary input vector, and forming the input vector out of the preliminary input vector.

According to an embodiment, the apparatus 54 is configured to decode the picture in B-bit resolution. The apparatus 54 might be configured to form the input vector 102 out of the preliminary input vector by subtraction of $2^{B-1}$ from a first component of the preliminary input vector so as to obtain a first component of the input vector 102 and subtracting the first component of the preliminary input vector from further components of the preliminary input vector so as to obtain further components of the input vector 102. Alternatively, the apparatus 54 might be configured to form the input vector 102 out of the preliminary input vector by subtracting a first component of the preliminary input vector from further components of the preliminary input vector so that the input vector 102 is formed out of the further components. Additionally, the apparatus 54 is configured to correct the output vector 208 by component-wise addition of the first component of the preliminary input vector.

According to an embodiment, the entries of the prediction matrices of the matrix-based intra-prediction modes $205_1$-$205_n$ in the list 204 of matrix-based intra-prediction modes corresponds to the entries in table 2 below, see, e.g., listing 2. However, note that maybe another shift value, i.e. another number 211 of bits, is chosen for listing the values in the table and maybe the values in the table might be represented at another scale.

The following embodiments will focus on data driven training of matrix based intra prediction modes having a predefined fixed coefficient range and predefined fixed shifts and their application in a codec.

The solution presented in the present invention for the problem of getting a fixed bit-depth, a fixed shift and a fixed offset is to include Constraint 1, Constraint 2 and Constraint 3 already in the training of the MIP-prediction modes, i.e. in the derivation of the matrices $A_i^{float}$. Thus, one restricts the range of all matrix entries already during training, where a gradient descent algorithm is applied to successively steer the matrices towards a (local) optimum with respect to a predefined loss function on a large set of training data.

The simplest way to do this would be to multiply each matrix by $2^d$, d as in Constraint 2, then to add the offset c from Constraint 3 (if desired), then clip the result to the desired range of Constraint 1, then subtract the offset c and finally divide the result by $2^d$. However, this is infeasible since the clipping function has gradient zero outside the clipping range and thus, in such an approach, every weight that falls outside the clipping range at some point of the stochastic gradient descent would never be updated from then on.

Figure 8:
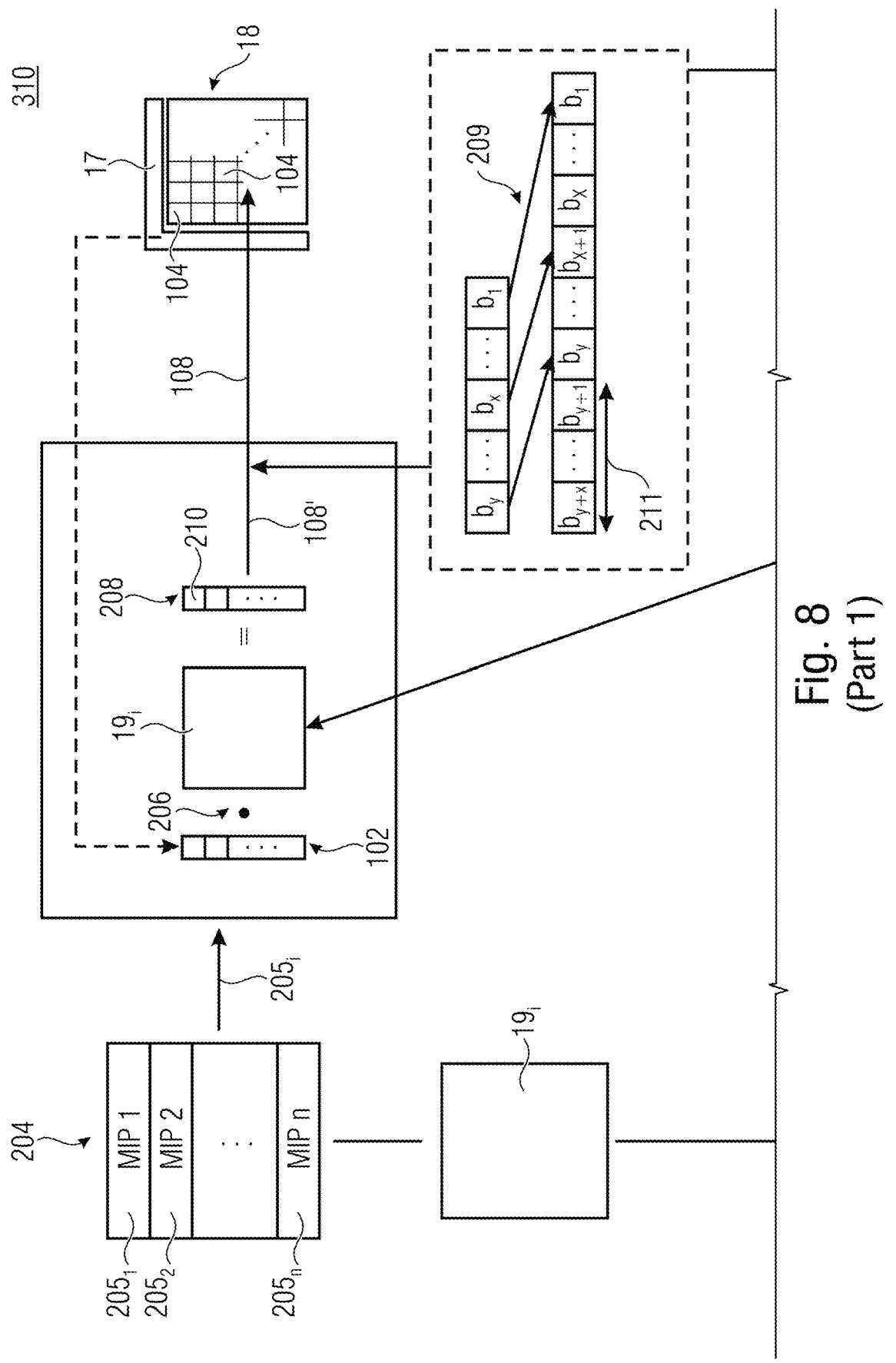
FIG. 8 shows an apparatus for training a prediction matrix, according to an embodiment.
Figure 8:
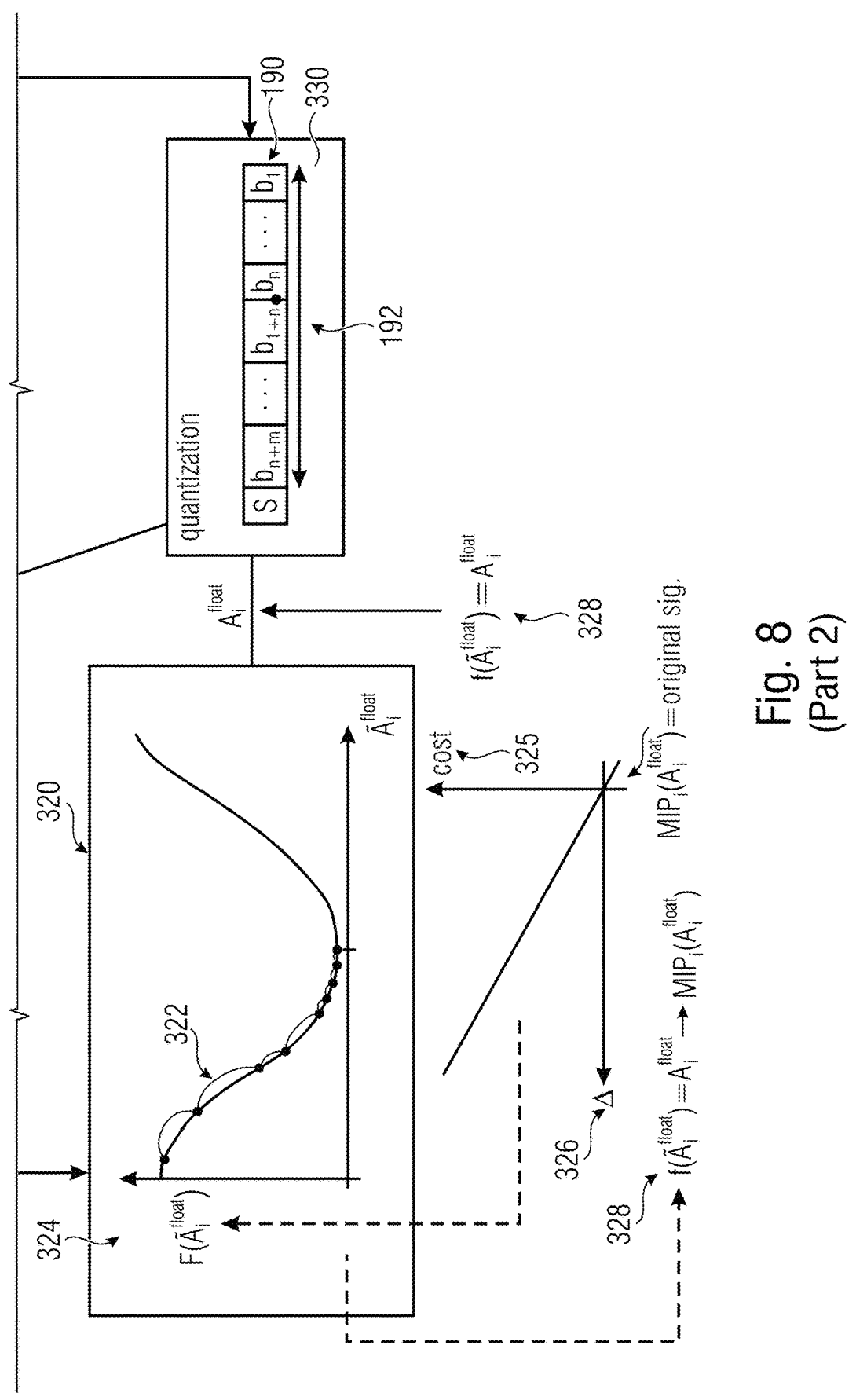

FIG. 8 shows an embodiment of an apparatus 310 for training prediction matrices 19, of a list 204 of matrix-based intra-prediction modes $205_1$-$205_n$ among which one 205, is ought to be selected for a predetermined block 18 for predicting samples 108 of the predetermined block 18 by computing a matrix-vector product 206 between an input vector 102 derived from reference samples 17 in a neighborhood of the predetermined block 18 and one of the prediction matrices $19_i$ which is associated with the matrix-based intra-prediction mode $205_i$ selected for the predetermined block 18 and associating components 210 of an output vector 208 obtained by the matrix-vector product 206 onto sample positions 104 of the predetermined block 18.

The apparatus 310 is configured to train 320 the prediction matrices $19_i$ of the list 204 of matrix-based intra-prediction modes $205_1$-$205_n$ using a gradient descent approach 322. The prediction matrices $19_i$, for example, are trained 320 by use of a training set of predetermined blocks 18 of known original samples and their corresponding neighborhood 17. The prediction matrices $19_i$ are trained 320 by optimizing representative values, compare $\tilde{A}_i^{float}$, for entries of the prediction matrices $19_1$ of the list 204 of matrix-based intra-prediction modes $205_1$-$205_n$, which are represented in floating point representation, using a cost function 324 which depends on a prediction distortion measure 326 associated with setting the entries of the prediction matrices $19_i$ to intermediate values onto which the representative values are mapped using a differentiable function 328, compare f(x). The cost function 324 depends on a prediction distortion measure 326, for example such that a cost 325 increases with decreasing quality of the prediction as resulting from $f(\tilde{A}_i^{float})=A_i^{float}$ meaning that f(x) is applied onto every entry of $\tilde{A}_i^{float}$. The prediction distortion measure 326 might define a deviation between a prediction signal $MIP_i(A_i^{float})$ obtainable using a prediction matrix comprising the intermediate values and an original signal associated with a predetermined block of the training set. As can be seen in FIG. 8, the prediction distortion measure 326 is zero in case of the prediction signal $MIP_i$ $(A_i^{float})$ being equal to the original signal. The entries of the matrix $\tilde{A}_i^{float}$ might be the above mentioned representative values and the entries of the matrix $A_i^{float}$ might be the above mentioned intermediate values. The matrix $\tilde{A}_i^{float}$ might represent the prediction matrix under training. It is to be noted that the gradient descent approach 322 with the cost function 324 and the dependency of the cost 325 from the prediction distortion measure 326 are only shown schematically to illustrate the basic principle underlying the apparatus 310.

Figure 9:
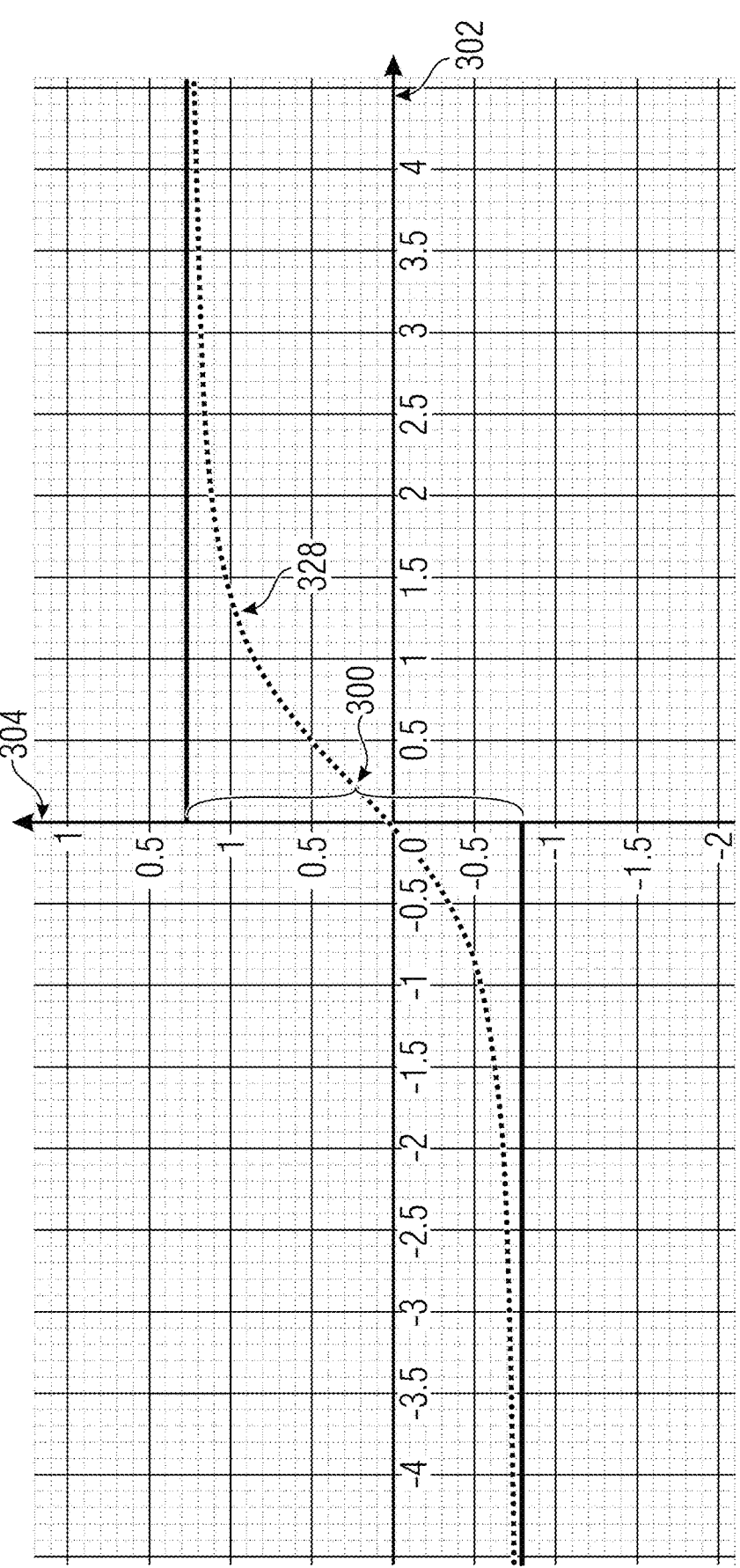
FIG. 9 shows an exemplary differentiable function.

A domain, e.g. the x axis 302 in FIG. 9, and a codomain, e.g. the y axis 304 in FIG. 9, of the differentiable function 328 is defined by the floating point representation, an image 300 of the differentiable function 328 has a predetermined dynamic range, and the differentiable function 328 is equal for the matrix-based intra-prediction modes $205_1$-$205_n$. The predetermined dynamic range, e.g., is defined by max(image 300)/min(image 300). According to an embodiment, max (image 300) is $\alpha+\delta$ and min(image 300) is $-\alpha+\delta$, see equation (7) below. It is to be noted that FIG. 9 shows only a graph of an exemplary differentiable function f(x) 328.

Additionally, the apparatus 310 is configured to quantize 330, e.g. after training 320, the intermediate values onto a fixed point representation 190 so that, for each matrix-based intra-prediction mode $205_1$-$205_n$, the prediction matrix $19_i$ associated with the respective matrix-based intra-prediction mode $205_i$ has all entries represented by a fixed point representation 190 of a predetermined bit-depth 192 so that the predetermined bit-depth 192 is equal for the matrix-based intra-prediction modes $205_1$-$205_n$, and so that, for each matrix-based intra-prediction mode $205_1$-$205_n$, the matrix-vector product 206 between the input vector 102 and the prediction matrix 19 associated with the respective matrix-based intra-prediction mode $205_i$ is computable by performing, for each component of the output vector 208, a right shift 209 at a number 211 of bits which is equal for the matrix-based intra-prediction modes $205_1$-$205_n$, e.g. meaning that the non-shifted-out portion $b_{x+1}$ to $b_{y+x}$ of the fixed-point representation suffices to represent $\alpha$, see equation (7) below. It is to be noted that FIG. 8 shows a fixed point representation 190 being a (x+y+1)-bit sign magnitude representation. However, it is also possible that the fixed point representation 190 is a (x+y)-bit magnitude representation, e.g., in case of all intermediate values having the same sign, e.g., all intermediate values might be positive values.

Thus, as a solution, in the present invention the clipping operation is approximated by a smooth function, e.g., the differentiable function 328. More precisely, out of Constraint 1, Constraint 2 and, optionally, Constraint 3, one computes the range for the unscaled matrix entries, i.e. for the representative values for entries of the prediction matrix, compare $\tilde{A}_i^{float}$, such that if one applies $$2^d \cdot \left(\tilde{A}_i^{float} + c\right), \tag{6}$$

during training, where $\tilde{A}_i^{float}$ denotes a current matrix in the training process, the result lies within the range of Constraint 1. Then, during training, one clips each $\tilde{A}_i^{float}$ to this range by applying a smooth approximation f, i.e. the differentiable function 328, of the clipping function that is realized as $$f(x) = \alpha \cdot \frac{\beta(x-\gamma)}{\left(1+(\beta(x-\gamma))^{2\lambda}\right)^{\frac{1}{2\lambda}}} + \delta, \tag{7}$$

where $\alpha$, $\beta$, $\gamma$ and $\delta$ are real numbers that depend on the clipping range, i.e. the predetermined dynamic range. Moreover, $\lambda$ is a non-negative integer that might be chosen experimentally. FIG. 9 shows an example of the clipping function f(x), i.e. of the differentiable function 328.

According to an embodiment, the differentiable function 328 has slope 1 at the origin, is strictly monotonically increasing and has horizontal asymptotes at the upper and lower bound of the image 300.

According to an embodiment, the differentiable function 328 is parametrizable by a shift parameter, e.g. $\delta$, in terms of a shift of the image 300 within the codomain 304. Additionally, the apparatus 310 might be configured to subject the shift parameter to optimization using the gradient descent approach 322. Furthermore, the apparatus 310 might be configured to derive an offset value, compare c, from the shift parameter so as to be used, prior to the computation of the matrix-vector product 206, to offset, e.g., by addition or by subtraction, for each matrix-based intra-prediction mode, all entries of the prediction matrix 19 associated with the respective matrix-based intra-prediction mode. The derived offset value c is equal for the matrix-based intra-prediction modes 205₁-205ₙ.

In summary, the invention of the present application is a realization of MIP having a part given by equation (2) for which Constraint 1 and Constraint 2 are satisfied or a realization of MIP having a part given by equation (2) for which Constraint 1, Constraint 2 and Constraint 3 are satisfied and for which in both cases, in the training algorithm for the floating point matrices $A_i^{float}$ that are then quantized to the integral matrices, Constraint 1 and Constraint 2, and, if desirable, also Constraint 3 are employed as described in this section.

The following embodiments describe examples for a stored representation of the prediction matrices.

The following listing shows the floating-point matrices $A_i^{float}$ that resulted from a training using the techniques provided in the present application for the MIP-modes used for mipSizeId=2, [1]. In detail, the parameters of the clipping function, i.e. the differentiable function, were selected in such a way that the training generates matrix coefficients that can be represented using 7-bit unsigned integer numbers with a fixed shift of 6 and a fixed offset of 32.

---

Listing 1: Floating-point matrix coefficients resulting from the training

```
{
{
{   0.156293,    0.073099,    0.011236,   -0.081875,    0.180458,    0.015021,    0.049324},
{   0.606067,    0.107375,    0.025546,   -0.123018,    0.063387,    0.048895,    0.057722},
{   0.698232,    0.220420,    0.040443,    0.011782,   -0.026354,    0.030684,    0.062533},
{   0.492302,    0.440029,    0.044884,    0.019444,   -0.016275,   -0.003603,    0.068572},
{   0.265188,    0.605197,    0.094944,    0.006438,   -0.004950,   -0.014262,    0.067448},
{   0.163001,    0.527234,    0.283442,    0.008982,   -0.013683,   -0.003823,    0.058731},
{   0.119232,    0.306427,    0.552822,    0.016206,   -0.013183,   -0.003781,    0.053009},
{   0.092598,    0.179032,    0.677887,    0.012227,    0.004529,    0.001850,    0.050966},
{   0.373969,    0.126033,    0.015260,   -0.088333,    0.179162,    0.097870,    0.066010},
{   0.593118,    0.263304,    0.028354,   -0.035170,   -0.062775,    0.099443,    0.091544},
{   0.515824,    0.387306,    0.055880,    0.029484,   -0.066091,    0.020715,    0.104382},
{   0.415606,    0.436490,    0.111027,    0.016547,   -0.030781,   -0.015091,    0.097426},
{   0.364228,    0.438957,    0.171887,    0.015334,   -0.026030,   -0.021231,    0.092298},
{   0.301686,    0.452163,    0.234044,    0.021006,   -0.036379,   -0.005480,    0.082836},
{   0.215830,    0.474470,    0.296413,    0.023777,   -0.035479,   -0.001982,    0.078009},
{   0.156492,    0.433249,    0.366387,    0.018292,   -0.013762,   -0.000218,    0.074744},
{   0.431118,    0.158733,    0.031856,   -0.035500,    0.075831,    0.170211,    0.091174},
{   0.557050,    0.318780,    0.048904,    0.045185,   -0.154186,    0.085427,    0.129750},
{   0.461996,    0.413619,    0.079465,    0.032963,   -0.063481,   -0.014063,    0.131527},
{   0.403047,    0.423969,    0.133604,    0.018908,   -0.027481,   -0.024920,    0.110289},
{   0.375511,    0.415656,    0.180029,    0.024069,   -0.033491,   -0.014334,    0.098019},
{   0.334578,    0.443876,    0.202064,    0.018139,   -0.031427,   -0.013438,    0.098341},
{   0.270864,    0.513090,    0.197160,    0.017286,   -0.030583,   -0.008366,    0.095451},
{   0.210585,    0.498667,    0.239854,    0.016953,   -0.015374,   -0.002945,    0.092236},
{   0.416600,    0.181693,    0.046821,   -0.015419,    0.026747,    0.175413,    0.135097},
{   0.526151,    0.331933,    0.066516,    0.048839,   -0.102738,   -0.016945,    0.173375},
{   0.455986,    0.400834,    0.093432,    0.027543,   -0.046809,   -0.033469,    0.129583},
{   0.420983,    0.395286,    0.143459,    0.020807,   -0.031294,   -0.012908,    0.104669},
{   0.393122,    0.399438,    0.174241,    0.019973,   -0.026684,   -0.012491,    0.103690},
{   0.342713,    0.451867,    0.172338,    0.012698,   -0.023236,   -0.015083,    0.106435},
{   0.293995,    0.506592,    0.166519,    0.010111,   -0.018563,   -0.016039,    0.105643},
{   0.249943,    0.492537,    0.199505,    0.015763,   -0.007547,   -0.011321,    0.103762},
{   0.385402,    0.208951,    0.051125,   -0.027380,    0.046611,    0.122142,    0.191803},
{   0.511764,    0.337944,    0.072253,    0.015791,    0.015631,   -0.122365,    0.187135},
{   0.483588,    0.373359,    0.096523,    0.024450,   -0.025463,   -0.039962,    0.116124},
{   0.453858,    0.367956,    0.136444,    0.024037,   -0.033257,   -0.006121,    0.101890},
{   0.411979,    0.398560,    0.151047,    0.021495,   -0.023413,   -0.013383,    0.111609},
{   0.340257,    0.468787,    0.147289,    0.017505,   -0.019535,   -0.020909,    0.115067},
{   0.291018,    0.511050,    0.148542,    0.011124,   -0.016596,   -0.020766,    0.115133},
{   0.255665,    0.491851,    0.176971,    0.010344,   -0.006152,   -0.015973,    0.116770},
{   0.359211,    0.220905,    0.051607,   -0.035487,    0.056322,    0.097523,    0.234286},
{   0.514522,    0.326488,    0.074953,   -0.000097,    0.057045,   -0.087731,    0.129069},
{   0.515249,    0.341748,    0.094599,    0.023078,   -0.015958,   -0.023977,    0.093740},
{   0.484363,    0.357211,    0.115186,    0.023263,   -0.030780,   -0.004817,    0.100624},
{   0.426545,    0.414018,    0.120376,    0.018820,   -0.020290,   -0.016997,    0.115613},
{   0.336161,    0.493071,    0.120720,    0.015462,   -0.010575,   -0.034881,    0.130971},
{   0.272586,    0.531859,    0.129935,    0.006819,   -0.001983,   -0.038237,    0.134591},
{   0.243823,    0.502737,    0.161133,    0.007145,    0.003676,   -0.032656,    0.138782},
```

Listing 1: Floating-point matrix coefficients resulting from the training

```
{   0.340960,    0.217118,    0.048494,   −0.029621,    0.034911,    0.108358,    0.268165},
{   0.503087,    0.320041,    0.064339,    0.000293,    0.034556,    0.035687,    0.049310},
{   0.518032,    0.333973,    0.080014,    0.015306,   −0.001989,   −0.001678,    0.074004},
{   0.490058,    0.360685,    0.092649,    0.022810,   −0.015312,   −0.013696,    0.102650},
{   0.425483,    0.429863,    0.091518,    0.015760,   −0.009297,   −0.022074,    0.119485},
{   0.336805,    0.500439,    0.096341,    0.013806,   −0.000879,   −0.033358,    0.132760},
{   0.269898,    0.528945,    0.115827,    0.008354,    0.007197,   −0.043011,    0.143460},
{   0.231039,    0.498745,    0.151489,    0.003097,    0.017822,   −0.041927,    0.152129},
{   0.302807,    0.216066,    0.043654,   −0.009591,    0.016510,    0.082581,    0.336258},
{   0.459018,    0.303108,    0.061229,    0.002951,    0.013946,    0.093121,    0.067138},
{   0.487567,    0.323310,    0.073459,    0.007215,    0.004632,    0.029492,    0.083354},
{   0.461155,    0.357203,    0.083060,    0.015685,   −0.001253,    0.000539,    0.109001},
{   0.407081,    0.421079,    0.083363,    0.020312,   −0.003346,   −0.008303,    0.120160},
{   0.326494,    0.482484,    0.093042,    0.016544,    0.001694,   −0.010624,    0.127140},
{   0.262867,    0.496682,    0.120844,    0.010090,    0.009979,   −0.023689,    0.142324},
{   0.222190,    0.469664,    0.155153,    0.011594,    0.013390,   −0.023464,    0.153361}
},
{
{   0.107260,   −0.026029,   −0.008204,    0.546058,    0.014117,    0.029630,   −0.014525},
{   0.618893,   −0.165439,    0.006712,    0.164170,    0.112116,    0.021391,   −0.013819},
{   1.066741,   −0.133683,   −0.003519,    0.049057,    0.110726,    0.025015,   −0.008353},
{   0.670999,    0.488101,   −0.118502,   −0.002130,    0.098437,    0.029483,   −0.003224},
{  −0.001429,    1.032687,   −0.091670,   −0.042892    0.081062,    0.041097,   −0.005540},
{  −0.154838,    0.710577,    0.366862,   −0.050373,    0.066718,    0.042161,   −0.008724},
{  −0.014507,    0.070540,    0.907406,   −0.020015,    0.039145,    0.045846,   −0.003600},
{   0.050906,   −0.158759,    1.060884,    0.009217,    0.014558,    0.054824,    0.012138},
{   0.238429,   −0.047538,    0.000611,    0.649856,    0.337899,   −0.002804,   −0.018107},
{   0.608376,   −0.127751,    0.000796,    0.444606,    0.275670,    0.056391,   −0.032948},
{   0.849629,   −0.020332,   −0.032183,    0.211561,    0.252866,    0.084718,   −0.035065},
{   0.514442,    0.481396,   −0.104624,    0.035482,    0.222825,    0.105838,   −0.029725},
{   0.021361,    0.828408,   −0.001501,   −0.061590,    0.168987,    0.132615,   −0.032451},
{  −0.085959,    0.505611,    0.434523,   −0.078258,    0.111367,    0.143922,   −0.029193},
{   0.020148,    0.014172,    0.860172,   −0.042242,    0.054068,    0.146415,   −0.017008},
{   0.076920,   −0.144742,    0.960499,   −0.005259,    0.020722,    0.144711,    0.007053},
{   0.141305,   −0.002910,    0.006015,    0.201169,    0.811433,    0.004161,   −0.006115},
{   0.358242,   −0.022149,    0.004054,    0.285164,    0.586681,    0.124572,   −0.036458},
{   0.475204,    0.080981,   −0.015072,    0.202757,    0.457306,    0.196909,   −0.049877},
{   0.326632,    0.352748,   −0.018700,    0.058484,    0.357006,    0.247787,   −0.052396},
{   0.093539,    0.484022,    0.123705,   −0.047671,    0.256779,    0.286164,   −0.054961},
{   0.033576,    0.262974,    0.443828,   −0.085279,    0.166640,    0.296768,   −0.044126},
{   0.087145,   −0.028909,    0.726360,   −0.069477,    0.097268,    0.275482,   −0.014002},
{   0.118746,   −0.118336,    0.792869,   −0.038443,    0.055353,    0.250275,    0.022660},
{   0.045886,    0.023180,    0.010946,   −0.050619,    0.670235,    0.399538,   −0.045134},
{   0.103870,    0.051754,    0.012504,    0.038896,    0.557633,    0.421991,   −0.046833},
{   0.136578,    0.115293,    0.023567,    0.054881,    0.446563,    0.462108,   −0.054452},
{   0.143303,    0.179045,    0.074593,    0.016097,    0.342236,    0.496863,   −0.055840},
{   0.142481,    0.164351,    0.196123,   −0.036687,    0.253952,    0.511985,   −0.052324},
{   0.151309,    0.062088,    0.371178,   −0.072032,    0.188902,    0.487639,   −0.029961},
{   0.160267,   −0.037619,    0.513713,   −0.083318,    0.134950,    0.436893,    0.010732},
{   0.163771,   −0.069174,    0.563673,   −0.060009,    0.084983,    0.381749,    0.059341},
{   0.014103,    0.024927,    0.016318,   −0.015731,    0.148619,    0.877274,   −0.031499},
{  −0.012983,    0.060509,    0.023862,   −0.011639,    0.189092,    0.807680,   −0.017025},
{  −0.014774,    0.080862,    0.050642,    0.000604,    0.164360,    0.795477,   −0.021081},
{   0.043906,    0.048800,    0.110034,    0.004015,    0.131100,    0.783948,   −0.020171},
{   0.131759,   −0.005717,    0.184801,   −0.008576,    0.100213,    0.765530,   −0.013858},
{   0.185980,   −0.036662,    0.253471,   −0.036757,    0.085366,    0.711707,    0.014100},
{   0.192352,   −0.033052,    0.307386,   −0.056373,    0.071912,    0.627956,    0.061172},
{   0.178786,   −0.032873,    0.353914,   −0.050846,    0.054657,    0.526441,    0.119266},
{  −0.000808,    0.019069,    0.021450,    0.025822,   −0.107479,    0.827570,    0.245731},
{  −0.028301,    0.034892,    0.032753,    0.021674,   −0.103493,    0.877919,    0.183479},
{  −0.032816,    0.033933,    0.055626,    0.025029,   −0.113411,    0.911268,    0.141381},
{   0.015933,   −0.005817,    0.094562,    0.032106,   −0.109773,    0.901540,    0.127060},
{   0.094705,   −0.053374,    0.132874,    0.027418,   −0.096923,    0.872749,    0.128664},
{   0.150301,   −0.051452,    0.146594,    0.007916,   −0.081464,    0.827798,    0.143287},
{   0.169926,   −0.029455,    0.163334,   −0.014408,   −0.058908,    0.743447,    0.176764},
{   0.160071,   −0.023046,    0.210236,   −0.021195,   −0.031939,    0.617422,    0.228961},
{  −0.005020,    0.009329,    0.021099,    0.016213,   −0.095908,    0.345111,    0.728693},
{  −0.008440,    0.002355,    0.036953,    0.043366,   −0.182771,    0.564203,    0.569874},
{  −0.002852,   −0.003232,    0.049077,    0.057954,   −0.229015,    0.688589,    0.473832},
{   0.026554,   −0.023370,    0.063161,    0.068505,   −0.239453,    0.737590,    0.423041},
{   0.073605,   −0.044742,    0.075286,    0.066054,   −0.215656,    0.724833,    0.410048},
{   0.114138,   −0.042940,    0.074562,    0.050917,   −0.187319,    0.707135,    0.400114},
{   0.133999,   −0.027891,    0.080295,    0.028648,   −0.150044,    0.654321,    0.403489},
{   0.129005,   −0.022323,    0.120399,    0.007133,   −0.099787,    0.562818,    0.418081},
{   0.014595,   −0.012695,    0.026833,    0.011107,   −0.041665,   −0.014766,    1.031660},
{   0.028480,   −0.025140,    0.035126,    0.042934,   −0.139476,    0.209869,    0.881982},
{   0.037626,   −0.023005,    0.035065,    0.058937,   −0.194685,    0.347779,    0.783420},
```

| | | | | | | |
|---|---|---|---|---|---|---|
| Listing 1: Floating-point matrix coefficients resulting from the training | | | | | | |

```
{    0.048122,     −0.022709,     0.034273,      0.067384,     −0.214671,      0.424167,      0.718002},
{    0.063316,     −0.018865,     0.032563,      0.073057,     −0.210325,      0.443612,      0.689224},
{    0.092682,     −0.025569,     0.038088,      0.068597,     −0.194211,      0.454670,      0.658795},
{    0.106728,     −0.022110,     0.048853,      0.048771,     −0.160414,      0.441494,      0.633951},
{    0.104729,     −0.018162,     0.077875,      0.032750,     −0.129577,      0.422317,      0.601770}
},
{
{    0.112861,      0.025814,     0.010346,      0.404485,      0.189168,     −0.021271,     −0.007071},
{    0.437461,      0.096294,    −0.006696,      0.130288,      0.294378,     −0.028465,     −0.011061},
{    0.642236,      0.268765,    −0.022696,      0.110987,      0.257101,     −0.005577,     −0.009859},
{    0.437571,      0.636820,    −0.038251,      0.108596,      0.218692,      0.011050,     −0.007157},
{    0.164606,      0.860239,     0.053449,      0.089220,      0.204907,      0.012355,     −0.002085},
{    0.039110,      0.710985,     0.348677,      0.057394,      0.202331,      0.013177,     −0.001976},
{    0.018540,      0.233433,     0.837161,      0.039973,      0.192451,      0.017294,      0.000783},
{   −0.016834,     −0.240349,     1.286045,      0.024838,      0.191256,      0.025996,      0.019767},
{    0.179084,      0.070355,     0.005592,      0.320730,      0.586929,     −0.035464,     −0.017143},
{    0.322913,      0.277252,    −0.026083,      0.150904,      0.624391,     −0.010312,     −0.029283},
{    0.319107,      0.536449,    −0.027733,      0.104233,      0.596445,      0.005223,     −0.027418},
{    0.224526,      0.712220,     0.048672,      0.083415,      0.563552,      0.028480,     −0.029565},
{    0.174370,      0.677968,     0.245125,      0.077017,      0.537762,      0.038693,     −0.028575},
{    0.117302,      0.466700,     0.562969,      0.052871,      0.511443,      0.052361,     −0.026229},
{    0.017581,      0.082954,     1.008298,      0.020323,      0.468104,      0.074134,     −0.017935},
{   −0.097880,     −0.288918,     1.407572,     −0.002520,      0.419295,      0.094055,      0.009437},
{    0.131598,      0.113510,     0.010372,      0.031084,      0.864505,      0.075093,     −0.030630},
{    0.202161,      0.348830,    −0.000616,      0.034981,      0.805868,      0.134070,     −0.049526},
{    0.133066,      0.586492,     0.040432,      0.018373,      0.798409,      0.123903,     −0.042461},
{    0.081346,      0.646819,     0.182190,     −0.001777,      0.788760,      0.122783,     −0.038254},
{    0.082148,      0.509282,     0.433295,     −0.008961,      0.766197,      0.141415,     −0.042010},
{    0.053615,      0.250027,     0.775987,     −0.028510,      0.736205,      0.168422,     −0.043357},
{   −0.062840,     −0.081288,     1.187568,     −0.063620,      0.680248,      0.200707,     −0.033002},
{   −0.206889,     −0.321235,     1.492187,     −0.077732,      0.589141,      0.223735,      0.007435},
{    0.091104,      0.123265,     0.024814,     −0.072709,      0.642759,      0.469563,     −0.062704},
{    0.104830,      0.343030,     0.049669,     −0.032573,      0.636411,      0.462814,     −0.062699},
{    0.021865,      0.520847,     0.140645,     −0.042594,      0.666183,      0.427156,     −0.055160},
{   −0.036235,      0.517579,     0.335324,     −0.073917,      0.694421,      0.409102,     −0.050944},
{   −0.049362,      0.334183,     0.628250,     −0.095473,      0.709894,      0.412424,     −0.052923},
{   −0.085849,      0.050039,     0.986070,     −0.122531,      0.703034,      0.436106,     −0.055706},
{   −0.204479,     −0.201102,     1.335324,     −0.143304,      0.649391,      0.456773,     −0.035288},
{   −0.363644,     −0.254617,     1.492187,     −0.139751,      0.557883,      0.442673,      0.030297},
{    0.050830,      0.128297,     0.041151,     −0.049595,      0.194307,      0.889563,     −0.034428},
{    0.018629,      0.300863,     0.110276,     −0.047379,      0.267616,      0.844634,     −0.028034},
{   −0.065024,      0.392365,     0.265670,     −0.064980,      0.330841,      0.802901,     −0.023974},
{   −0.127947,      0.318075,     0.519012,     −0.093069,      0.377286,      0.782511,     −0.024919},
{   −0.161318,      0.104412,     0.842119,     −0.123324,      0.409912,      0.775875,     −0.026120},
{   −0.220662,     −0.149141,     1.184358,     −0.142732,      0.422636,      0.776354,     −0.020619},
{   −0.343912,     −0.298222,     1.456446,     −0.157179,      0.405201,      0.750060,      0.021694},
{   −0.497356,     −0.210617,     1.492187,     −0.160324,      0.377775,      0.656488,      0.119743},
{    0.011012,      0.129165,     0.058441,     −0.021381,     −0.068335,      0.902653,      0.208172},
{   −0.048316,      0.222264,     0.189843,     −0.039344,     −0.022021,      0.936009,      0.176978},
{   −0.123944,      0.208873,     0.411157,     −0.063206,      0.031947,      0.921031,      0.172544},
{   −0.203933,      0.073767,     0.713402,     −0.092687,      0.071056,      0.918549,      0.164918},
{   −0.257952,     −0.150229,     1.052984,     −0.114621,      0.095163,      0.921215,      0.163954},
{   −0.329906,     −0.332817,     1.351026,     −0.124346,      0.113068,      0.899257,      0.184368},
{   −0.464554,     −0.321353,     1.492188,     −0.135041,      0.138811,      0.824181,      0.246626},
{   −0.507812,     −0.241676,     1.492187,     −0.138547,      0.170752,      0.677168,      0.357724},
{   −0.017165,      0.076250,     0.105473,     −0.032343,     −0.058495,      0.339660,      0.773517},
{   −0.085229,      0.071876,     0.305256,     −0.057746,     −0.034265,      0.398957,      0.736766},
{   −0.163701,     −0.037106,     0.588421,     −0.079981,      0.001662,      0.402693,      0.733500},
{   −0.259935,     −0.208288,     0.920387,     −0.099808,      0.020475,      0.411642,      0.730828},
{   −0.345647,     −0.380092,     1.232422,     −0.110220,      0.035130,      0.413758,      0.736204},
{   −0.426312,     −0.468673,     1.459483,     −0.111496,      0.052711,      0.394434,      0.755923},
{   −0.507812,     −0.357331,     1.492187,     −0.104164,      0.069783,      0.335406,      0.807992},
{   −0.507812,     −0.293642,     1.492188,     −0.106874,      0.103755,      0.241235,      0.871842},
{   −0.066166,     −0.040614,     0.221643,     −0.055791,      0.105726,     −0.461538,      1.419265},
{   −0.129492,     −0.127075,     0.469548,     −0.084004,      0.138642,     −0.478853,      1.446625},
{   −0.200803,     −0.279119,     0.771764,     −0.106300,      0.171673,     −0.507812,      1.476373},
{   −0.296672,     −0.433668,     1.075705,     −0.121666,      0.183873,     −0.507812,      1.487935},
{   −0.411296,     −0.507812,     1.314396,     −0.134275,      0.197027,     −0.501613,      1.492187},
{   −0.504677,     −0.507812,     1.467733,     −0.137158,      0.199139,     −0.485395,      1.492188},
{   −0.507812,     −0.431281,     1.492187,     −0.114751,      0.179736,     −0.464444,      1.492187},
{   −0.507812,     −0.362740,     1.492187,     −0.113993,      0.187923,     −0.456651,      1.480017}
},
{
{   −0.034325,      0.001569,     0.005530,      0.151242,      0.031908,     −0.000339,     −0.006503},
{    0.481380,     −0.099641,     0.024538,     −0.255709,      0.087555,      0.003320,     −0.000636},
{    1.027682,     −0.091891,     0.034171,     −0.102695,      0.029278,      0.015031,      0.002811},
{    0.678526,      0.456267,    −0.037558,     −0.008783,      0.007110,      0.010517,     −0.000412},
```

Listing 1: Floating-point matrix coefficients resulting from the training

```
{     0.060580,     0.966522,    -0.007496,    -0.027712,     0.019569,     0.000350,    -0.000759},
{    -0.101187,     0.692030,     0.405214,    -0.035030,     0.018387,     0.004287,    -0.004629},
{    -0.033081,     0.114897,     0.925561,    -0.016107,     0.006108,     0.010169,    -0.009368},
{     0.006953,    -0.145125,     1.139657,    -0.004849,     0.006279,     0.007573,    -0.005811},
{     0.035646,    -0.025929,     0.012973,    -0.010717,     0.305068,    -0.039979,    -0.006034},
{     0.536959,    -0.121482,     0.030792,    -0.320575,     0.141572,     0.012514,    -0.002295},
{     1.016885,    -0.064991,     0.034736,    -0.132380,     0.026628,     0.021802,     0.002717},
{     0.610152,     0.515787,    -0.028016,    -0.024222,     0.004897,     0.011277,    -0.001516},
{     0.028732,     0.941744,     0.051942,    -0.034170,     0.019969,    -0.003735,    -0.002846},
{    -0.096090,     0.600738,     0.495175,    -0.043072,     0.029009,    -0.003391,    -0.006871},
{    -0.033107,     0.073805,     0.969546,    -0.023589,     0.015856,     0.005932,    -0.011706},
{     0.002105,    -0.141850,     1.146868,    -0.009832,     0.015081,     0.008460,    -0.010161},
{     0.074544,    -0.042766,     0.020221,    -0.369731,     0.739300,    -0.078537,    -0.000460},
{     0.613573,    -0.153120,     0.043128,    -0.424230,     0.278034,    -0.002755,     0.002647},
{     1.024751,    -0.046527,     0.035990,    -0.136882,     0.029082,     0.024136,     0.003750},
{     0.533077,     0.591379,    -0.034024,    -0.019925,    -0.008012,     0.017235,    -0.002173},
{    -0.014319,     0.938381,     0.091929,    -0.034490,     0.016964,     0.000256,    -0.006622},
{    -0.100216,     0.528485,     0.568737,    -0.048619,     0.032718,     0.002396,    -0.013690},
{    -0.036110,     0.032959,     1.010944,    -0.034531,     0.025099,     0.010068,    -0.017841},
{    -0.009138,    -0.150246,     1.160893,    -0.024482,     0.026270,     0.013842,    -0.014276},
{     0.123105,    -0.061005,     0.028033,    -0.507812,     0.693829,     0.223976,    -0.056566},
{     0.683360,    -0.169746,     0.047708,    -0.507812,     0.354379,     0.052162,    -0.002308},
{     1.012127,    -0.005055,     0.025325,    -0.167685,     0.072309,     0.008087,     0.011593},
{     0.452040,     0.668821,    -0.043507,    -0.033289,     0.007733,     0.000765,     0.002871},
{    -0.052872,     0.933156,     0.129945,    -0.042108,     0.023327,    -0.002482,    -0.007493},
{    -0.099983,     0.464203,     0.634423,    -0.048683,     0.034273,     0.007461,    -0.019378},
{    -0.041381,     0.005347,     1.043087,    -0.038195,     0.030091,     0.017212,    -0.025543},
{    -0.013938,    -0.153607,     1.169404,    -0.033633,     0.031569,     0.021967,    -0.021104},
{     0.151733,    -0.070618,     0.028429,    -0.487027,     0.242645,     0.734684,    -0.103563},
{     0.749715,    -0.185314,     0.048414,    -0.507812,     0.250239,     0.226722,    -0.015938},
{     0.971151,     0.061667,     0.002776,    -0.227724,     0.124305,     0.010384,     0.015503},
{     0.365008,     0.744356,    -0.050534,    -0.076051,     0.049063,    -0.012936,     0.003654},
{    -0.083760,     0.910826,     0.174464,    -0.058108,     0.036064,    -0.002212,    -0.010784},
{    -0.096006,     0.401651,     0.694301,    -0.044318,     0.022825,     0.020602,    -0.026669},
{    -0.042130,    -0.024539,     1.072860,    -0.047736,     0.030026,     0.024415,    -0.028771},
{    -0.014375,    -0.164467,     1.179954,    -0.051930,     0.041596,     0.025608,    -0.023935},
{     0.188821,    -0.086042,     0.030328,    -0.408917,    -0.032759,     0.755070,     0.130274},
{     0.765306,    -0.169899,     0.042659,    -0.507812,     0.140273,     0.313395,     0.052757},
{     0.907210,     0.133382,    -0.013235,    -0.279435,     0.134073,     0.049870,     0.016728},
{     0.300837,     0.783899,    -0.042348,    -0.129478,     0.078418,    -0.002376,    -0.000986},
{    -0.085087,     0.857832,     0.226911,    -0.073433,     0.042704,     0.003829,    -0.016726},
{    -0.087926,     0.347601,     0.741767,    -0.049421,     0.024228,     0.020794,    -0.028560},
{    -0.043631,    -0.039381,     1.088677,    -0.055236,     0.034890,     0.017476,    -0.024162},
{    -0.017769,    -0.170068,     1.183458,    -0.065201,     0.049184,     0.018404,    -0.014744},
{     0.228654,    -0.090457,     0.027586,    -0.383619,     0.033231,     0.181296,     0.670999},
{     0.747469,    -0.129587,     0.032853,    -0.507812,     0.133726,     0.138614,     0.285490},
{     0.813307,     0.204125,    -0.015909,    -0.304804,     0.123736,     0.059707,     0.059779},
{     0.262307,     0.770153,    -0.008735,    -0.160482,     0.083308,     0.020558,    -0.000130},
{    -0.057483,     0.765506,     0.294256,    -0.087665,     0.050740,     0.011699,    -0.018727},
{    -0.068611,     0.300649,     0.773268,    -0.058339,     0.039061,     0.015453,    -0.026544},
{    -0.042819,    -0.032497,     1.079797,    -0.054999,     0.041442,     0.009331,    -0.019310},
{    -0.021722,    -0.162345,     1.174345,    -0.064624,     0.049923,     0.010429,    -0.005468},
{     0.250122,    -0.071064,     0.031990,    -0.341019,     0.129806,    -0.253140,     1.012005},
{     0.677208,    -0.072684,     0.037826,    -0.460460,     0.151657,    -0.087653,     0.528732},
{     0.698083,     0.237873,     0.013722,    -0.315267,     0.121877,     0.002373,     0.171610},
{     0.264217,     0.668556,     0.069553,    -0.178096,     0.085322,     0.014721,     0.043578},
{     0.002958,     0.631598,     0.364001,    -0.105525,     0.058062,     0.012313,     0.004362},
{    -0.038860,     0.264586,     0.772518,    -0.074149,     0.051121,     0.011399,    -0.008951},
{    -0.035574,    -0.006762,     1.036897,    -0.063656,     0.047431,     0.003613,    -0.002756},
{    -0.019586,    -0.129443,     1.130309,    -0.064328,     0.047184,     0.006657,     0.009528}
},
{
{     0.068738,    -0.045099,     0.021494,     0.171547,     0.229198,    -0.039505,    -0.011680},
{     0.657397,    -0.188129,     0.048706,    -0.208613,     0.233103,     0.037174,    -0.002220},
{     0.933907,     0.050277,    -0.002891,    -0.041867,    -0.014434,     0.124019,     0.028573},
{     0.332835,     0.757786,    -0.086782,     0.022305,    -0.068381,     0.061912,     0.072395},
{    -0.127684,     0.922352,     0.137286,    -0.012707,    -0.021441,    -0.013914,     0.086793},
{    -0.105527,     0.396501,     0.663446,    -0.016526,    -0.002526,    -0.038763,     0.076334},
{    -0.003499,    -0.064470,     1.050392,    -0.002973,     0.003758,    -0.048177,     0.065146},
{     0.036810,    -0.195088,     1.142889,     0.009324,    -0.003157,    -0.037661,     0.054272},
{     0.281470,    -0.099393,     0.032971,     0.021435,     0.657083,    -0.032091,    -0.014378},
{     0.664621,    -0.062573,     0.016500,    -0.147311,     0.215054,     0.236551,     0.013967},
{     0.502568,     0.412405,    -0.046138,    -0.029312,    -0.098035,     0.211710,     0.123116},
{    -0.019869,     0.820922,     0.070349,    -0.014882,    -0.071720,     0.022503,     0.181200},
{    -0.153552,     0.543040,     0.502488,    -0.028386,    -0.008503,    -0.068554,     0.160031},
{    -0.041373,     0.044791,     0.945654,    -0.009528,     0.003845,    -0.079205,     0.119327},
{     0.017924,    -0.184058,     1.144112,     0.002706,     0.009292,    -0.072070,     0.085083},
```

-continued

| Listing 1: Floating-point matrix coefficients resulting from the training | | | | | | |
|---|---|---|---|---|---|---|
| { 0.032134, | −0.204080, | 1.154160, | 0.008431, | 0.004075, | −0.048591, | 0.058887}, |
| { 0.297423, | −0.049550, | 0.018801, | −0.110500, | 0.631126, | 0.290356, | −0.035512}, |
| { 0.445870, | 0.162202, | −0.015972, | −0.026757, | −0.008519, | 0.444035, | 0.111425}, |
| { 0.118630, | 0.601199, | 0.023628, | −0.002549, | −0.122848, | 0.137117, | 0.286665}, |
| { −0.153701, | 0.617545, | 0.342329, | −0.033685, | −0.023101, | −0.077004, | 0.277434}, |
| { −0.107799, | 0.192462, | 0.804537, | −0.025826, | 0.014196, | −0.111425, | 0.191230}, |
| { −0.007363, | −0.133151, | 1.091021, | −0.005373, | 0.012989, | −0.091784, | 0.123949}, |
| { 0.027585, | −0.224374, | 1.177759, | 0.002704, | 0.009225, | −0.064944, | 0.076072}, |
| { 0.031817, | −0.196633, | 1.147540, | 0.010418, | 0.000144, | −0.036203, | 0.049707}, |
| { 0.201981, | 0.051365, | −0.005137, | −0.024189, | 0.110640, | 0.741128, | 0.017437}, |
| { 0.171411, | 0.324673, | 0.008097, | 0.042287, | −0.131479, | 0.335713, | 0.363502}, |
| { −0.083203, | 0.552180, | 0.208284, | −0.000136, | −0.043853, | −0.076393, | 0.452798}, |
| { −0.148746, | 0.334242, | 0.621949, | −0.028680, | 0.021977, | −0.151592, | 0.308629}, |
| { −0.059292, | −0.020687, | 0.988464, | −0.017882, | 0.018807, | −0.108935, | 0.172367}, |
| { 0.003916, | −0.189947, | 1.145743, | −0.002285, | 0.008037, | −0.072674, | 0.101232}, |
| { 0.027737, | −0.221094, | 1.178576, | 0.007109, | −0.004333, | −0.039570, | 0.056196}, |
| { 0.027921, | −0.186723, | 1.137868, | 0.018738, | −0.014806, | −0.014782, | 0.039341}, |
| { 0.096178, | 0.128946, | −0.007053, | 0.040296, | −0.145563, | 0.629720, | 0.344141}, |
| { −0.011150, | 0.357132, | 0.109626, | 0.028165, | −0.050913, | −0.007233, | 0.643270}, |
| { −0.148662, | 0.390771, | 0.437437, | −0.015569, | 0.041171, | −0.216833, | 0.504409}, |
| { −0.108028, | 0.111047, | 0.838045, | −0.016001, | 0.039900, | −0.153095, | 0.267154}, |
| { −0.025878, | −0.119890, | 1.079257, | −0.004190, | 0.011090, | −0.076421, | 0.127718}, |
| { 0.008160, | −0.197575, | 1.160343, | 0.005484, | −0.006163, | −0.037543, | 0.066224}, |
| { 0.029794, | −0.212721, | 1.170664, | 0.013683, | −0.014302, | −0.020473, | 0.041253}, |
| { 0.028827, | −0.179797, | 1.125686, | 0.019730, | −0.016624, | −0.007632, | 0.036632}, |
| { 0.010543, | 0.154768, | 0.040192, | 0.032708, | −0.059601, | 0.114284, | 0.775509}, |
| { −0.098499, | 0.294878, | 0.274127, | 0.013150, | 0.035109, | −0.218188, | 0.742280}, |
| { −0.146361, | 0.216624, | 0.650005, | −0.010306, | 0.053495, | −0.194626, | 0.424767}, |
| { −0.082332, | −0.006277, | 0.960607, | −0.005195, | 0.027383, | −0.100160, | 0.194346}, |
| { −0.012983, | −0.149388, | 1.112558, | 0.006884, | −0.002197, | −0.037495, | 0.084134}, |
| { 0.018397, | −0.196830, | 1.160043, | 0.008523, | −0.014957, | −0.012640, | 0.043540}, |
| { 0.036553, | −0.200628, | 1.156953, | 0.015489, | −0.021298, | −0.003120, | 0.028772}, |
| { 0.039866, | −0.172909, | 1.111433, | 0.026786, | −0.021076, | 0.002368, | 0.031029}, |
| { −0.047538, | 0.137475, | 0.148196, | 0.016804, | 0.028897, | −0.183178, | 0.945274}, |
| { −0.121189, | 0.190755, | 0.462237, | 0.027991, | 0.043963, | −0.211643, | 0.648326}, |
| { −0.117439, | 0.084596, | 0.803356, | 0.026180, | 0.019225, | −0.105676, | 0.305087}, |
| { −0.059667, | −0.057559, | 1.014054, | 0.017289, | −0.001200, | −0.033306, | 0.126323}, |
| { −0.004033, | −0.144848, | 1.109527, | 0.018644, | −0.015858, | −0.007044, | 0.056582}, |
| { 0.032106, | −0.186695, | 1.141850, | 0.024055, | −0.028336, | 0.008165, | 0.029412}, |
| { 0.048002, | −0.185056, | 1.130533, | 0.029488, | −0.029121, | 0.009527, | 0.021342}, |
| { 0.045216, | −0.159339, | 1.087018, | 0.036410, | −0.025146, | 0.008344, | 0.030161}, |
| { −0.072259, | 0.086506, | 0.299479, | 0.026081, | 0.038674, | −0.187337, | 0.839973}, |
| { −0.098284, | 0.083055, | 0.609453, | 0.040418, | 0.025415, | −0.121712, | 0.501435}, |
| { −0.072893, | 0.011224, | 0.860998, | 0.040933, | −0.002668, | −0.037735, | 0.232183}, |
| { −0.032265, | −0.063634, | 0.994922, | 0.038156, | −0.023328, | −0.001123, | 0.112326}, |
| { 0.007066, | −0.118128, | 1.060264, | 0.039705, | −0.028133, | 0.005114, | 0.063170}, |
| { 0.031177, | −0.144750, | 1.085368, | 0.037057, | −0.028959, | 0.012149, | 0.038183}, |
| { 0.041573, | −0.145244, | 1.078051, | 0.035695, | −0.025746, | 0.007714, | 0.032320}, |
| { 0.035697, | −0.130464, | 1.044626, | 0.044188, | −0.026680, | 0.011267, | 0.037620} |
| }, | | | | | | |
| { | | | | | | |
| { −0.035805, | 0.013398, | −0.006436, | 0.365960, | 0.000116, | 0.005124, | −0.005862}, |
| { 0.231934, | −0.029143, | −0.007987, | −0.042149, | 0.058446, | −0.005335, | −0.003382}, |
| { 0.760295, | −0.070218, | −0.001529, | −0.063700, | 0.036665, | 0.001119, | −0.001547}, |
| { 0.824906, | 0.225873, | −0.048345, | −0.004471, | 0.002944, | 0.010241, | −0.002492}, |
| { 0.338512, | 0.776329, | −0.097159, | −0.006766, | −0.003352, | 0.014492, | −0.004083}, |
| { −0.033923, | 0.911493, | 0.097395, | −0.020425, | 0.005599, | 0.011437, | −0.004848}, |
| { −0.032803, | 0.371344, | 0.648116, | −0.016397, | 0.008622, | 0.003099, | −0.005196}, |
| { 0.084228, | −0.176100, | 1.096010, | 0.001109, | 0.002241, | 0.003714, | −0.002616}, |
| { 0.019062, | 0.004420, | −0.009051, | 0.566904, | 0.110318, | −0.008740, | −0.010864}, |
| { 0.100794, | 0.002211, | −0.016015, | 0.174787, | 0.024086, | 0.012160, | −0.009956}, |
| { 0.487135, | −0.038456, | −0.011293, | −0.040158, | 0.028457, | 0.004420, | −0.002782}, |
| { 0.785439, | 0.070909, | −0.024963, | −0.044351, | 0.014644, | 0.007540, | −0.002195}, |
| { 0.602422, | 0.478538, | −0.075206, | −0.022803, | 0.003769, | 0.010707, | −0.005817}, |
| { 0.185708, | 0.837774, | −0.023654, | −0.024618, | 0.008087, | 0.008446, | −0.007697}, |
| { 0.011224, | 0.620403, | 0.356463, | −0.026091, | 0.007200, | 0.005837, | −0.008802}, |
| { 0.078599, | 0.075807, | 0.848196, | −0.009473, | −0.004244, | 0.011869, | −0.009722}, |
| { 0.025578, | 0.007954, | −0.007617, | 0.440160, | 0.450475, | −0.052518, | −0.006065}, |
| { 0.057270, | 0.007953, | −0.014764, | 0.371470, | 0.087172, | 0.005643, | −0.011380}, |
| { 0.297240, | −0.023527, | −0.014889, | 0.096633, | 0.009758, | 0.017394, | −0.006675}, |
| { 0.665184, | −0.010402, | −0.015964, | −0.024131, | 0.012728, | 0.014698, | −0.005736}, |
| { 0.744984, | 0.236041, | −0.052689, | −0.028863, | 0.006440, | 0.011933, | −0.007977}, |
| { 0.431208, | 0.644677, | −0.070360, | −0.032211, | 0.008226, | 0.012109, | −0.010540}, |
| { 0.144502, | 0.720634, | 0.136253, | −0.034618, | 0.009379, | 0.007650, | −0.009401}, |
| { 0.098226, | 0.334179, | 0.565373, | −0.024734, | 0.003108, | 0.008929, | −0.007815}, |
| { 0.022178, | 0.014380, | −0.006938, | 0.171603, | 0.705947, | 0.049379, | −0.024919}, |
| { 0.043639, | 0.015401, | −0.015481, | 0.357463, | 0.350556, | −0.039575, | −0.006373}, |

-continued

| Listing 1: Floating-point matrix coefficients resulting from the training | | | | | | |
|---|---|---|---|---|---|---|
| { 0.173885, | −0.002970, | −0.018925, | 0.222444, | 0.104353, | −0.011067, | −0.004879}, |
| { 0.498835, | −0.029124, | −0.016768, | 0.046253, | 0.029427, | 0.008635, | −0.006515}, |
| { 0.740893, | 0.081150, | −0.035166, | −0.012628, | 0.005372, | 0.011766, | −0.007998}, |
| { 0.635067, | 0.398233, | −0.064642, | −0.023515, | −0.000199, | 0.011752, | −0.008870}, |
| { 0.343657, | 0.643352, | 0.020836, | −0.032770, | 0.003068, | 0.009591, | −0.009115}, |
| { 0.176709, | 0.501366, | 0.317955, | −0.027098, | 0.002177, | 0.013055, | −0.008787}, |
| { 0.016691, | 0.014716, | −0.005121, | 0.032595, | 0.566663, | 0.406447, | −0.067097}, |
| { 0.031363, | 0.016854, | −0.015208, | 0.204881, | 0.592424, | 0.014773, | −0.015534}, |
| { 0.100458, | 0.012384, | −0.023193, | 0.246148, | 0.312418, | −0.049881, | −0.000952}, |
| { 0.344124, | −0.021031, | −0.020297, | 0.131917, | 0.104868, | −0.014382, | −0.003843}, |
| { 0.641234, | 0.002027, | −0.022963, | 0.028542, | 0.024559, | 0.008902, | −0.008461}, |
| { 0.709242, | 0.203227, | −0.048042, | −0.009809, | 0.001310, | 0.006980, | −0.006412}, |
| { 0.519566, | 0.482807, | −0.025459, | −0.021268, | −0.008212, | 0.014930, | −0.010154}, |
| { 0.296418, | 0.530269, | 0.157038, | −0.025153, | −0.001801, | 0.019472, | −0.009795}, |
| { 0.020229, | 0.005186, | −0.004551, | 0.030664, | 0.181757, | 0.770508, | −0.017006}, |
| { 0.025916, | 0.014347, | −0.013635, | 0.094587, | 0.524210, | 0.316479, | −0.056498}, |
| { 0.066997, | 0.020019, | −0.024440, | 0.194979, | 0.471853, | 0.023675, | −0.019610}, |
| { 0.240920, | −0.011455, | −0.021591, | 0.169186, | 0.247036, | −0.027237, | −0.004708}, |
| { 0.507420, | −0.021248, | −0.020489, | 0.089602, | 0.086865, | −0.006330 | −0.006060}, |
| { 0.666827, | 0.095838, | −0.038102, | 0.018402, | 0.026284, | 0.004009, | −0.006034}, |
| { 0.608591, | 0.322639, | −0.033431, | −0.014829, | 0.003399, | 0.012006, | −0.007434}, |
| { 0.415828, | 0.455271, | 0.077589, | −0.024144, | 0.002281, | 0.019617, | −0.006713}, |
| { 0.014239, | 0.003112, | −0.009217, | 0.043933, | −0.021825, | 0.616451, | 0.344330}, |
| { 0.024208, | 0.010124, | −0.013781, | 0.072798, | 0.259042, | 0.588487, | 0.010475}, |
| { 0.058496, | 0.016564, | −0.021623, | 0.140430, | 0.434636, | 0.250382, | −0.038768}, |
| { 0.174576, | −0.001465, | −0.022489, | 0.169138, | 0.344692, | 0.049439, | −0.017541}, |
| { 0.381754, | −0.016895, | −0.020894, | 0.124388, | 0.187600, | 0.001242, | −0.007788}, |
| { 0.563584, | 0.042415, | −0.027144, | 0.055905, | 0.080970, | 0.003363, | −0.004956}, |
| { 0.597681, | 0.205124, | −0.024896, | 0.009466, | 0.026215, | 0.012807, | −0.004472}, |
| { 0.477574, | 0.356402, | 0.043704, | −0.010865, | 0.010049, | 0.020665, | −0.001213}, |
| { 0.011657, | 0.003270, | −0.007884, | 0.020513, | 0.028806, | 0.063422, | 0.860421}, |
| { 0.034281, | 0.001866, | −0.012387, | 0.066706, | 0.094114, | 0.466037, | 0.314963}, |
| { 0.067516, | 0.009211, | −0.017032, | 0.112214, | 0.275119, | 0.396701, | 0.059915}, |
| { 0.145639, | 0.008845, | −0.019640, | 0.145497, | 0.328488, | 0.176877, | 0.011649}, |
| { 0.281478, | 0.013272, | −0.021484, | 0.134456, | 0.245584, | 0.059369, | 0.004963}, |
| { 0.426355, | 0.050152, | −0.019500, | 0.080344, | 0.141916, | 0.026211, | 0.003232}, |
| { 0.508394, | 0.151940, | −0.009598, | 0.039151, | 0.062713, | 0.023085, | 0.004885}, |
| { 0.469290, | 0.268214, | 0.043406, | 0.015376, | 0.024397, | 0.024722, | 0.012916} |
| } |
| } |

The matrix coefficients shown in Listing 1 fulfill the requirements presented in the previous sections. To illustrate this, Listing 2 shows the matrix coefficients after a multiplication by $2^6$. The range of these coefficients deviates from the final range only by the fixed offset 32. Thus, the below values are the stored matrix entries in fixed point representation in accordance with an example. The matrices are 7×64 matrices (7-component input vector and 64 component output vector). 6 matrices for 6 modes are there. According to an embodiment, the entries may deviate from the values shown below. For example, the multiplication by $2^6$ has been chosen for illustration purposes only and, accordingly, the entries of the matrices as they are shown below might look different when choosing another factor.

| Listing 2: Scaled floating-point matrix coefficients | | | | | | |
|---|---|---|---|---|---|---|
| { | | | | | | |
| { | | | | | | |
| { 10.0028, | 4.6783, | 0.7191, | −5.2400, | 11.5493, | 0.9614, | 3.1568}, |
| { 38.7883, | 6.8720, | 1.6349, | −7.8731, | 4.0568, | 3.1293, | 3.6942}, |
| { 44.6869, | 14.1069, | 2.5884, | 0.7541, | −1.6866, | 1.9638, | 4.0021}, |
| { 31.5073, | 28.1619, | 2.8726, | 1.2444, | −1.0416, | −0.2306, | 4.3886}, |
| { 16.9721, | 38.7326, | 6.0764, | 0.4121, | −0.3168, | −0.9128, | 4.3166}, |
| { 10.4321, | 33.7430, | 18.1403, | 0.5748, | −0.8757, | −0.2447, | 3.7588}, |
| { 7.6308, | 19.6113, | 35.3806, | 1.0372, | −0.8437, | −0.2420, | 3.3926}, |
| { 5.9263, | 11.4581, | 43.3847, | 0.7825, | 0.2899, | 0.1184, | 3.2618}, |
| { 23.9340, | 8.0661, | 0.9766, | −5.6533, | 11.4664, | 6.2637, | 4.2246}, |
| { 37.9596, | 16.8514, | 1.8146, | −2.2509, | −4.0176, | 6.3644, | 5.8588}, |
| { 33.0128, | 24.7876, | 3.5763, | 1.8870, | −4.2298, | 1.3258, | 6.6804}, |
| { 26.5988, | 27.9354, | 7.1057, | 1.0590, | −1.9700, | −0.9658, | 6.2353}, |
| { 23.3106, | 28.0932, | 11.0008, | 0.9814, | −1.6659, | −1.3588, | 5.9071}, |
| { 19.3079, | 28.9384, | 14.9788, | 1.3444, | −2.3283, | −0.3507, | 5.3015}, |
| { 13.8131, | 30.3660, | 18.9704, | 1.5217, | −2.2707, | −0.1269, | 4.9926}, |
| { 10.0155, | 27.7279, | 23.4488, | 1.1707, | −0.8808, | −0.0139, | 4.7836}, |
| { 27.5915, | 10.1589, | 2.0388, | −2.2720, | 4.8532, | 10.8935, | 5.8351}, |
| { 35.6512, | 20.4019, | 3.1298, | 2.8918, | −9.8679, | 5.4673, | 8.3040}, |
| { 29.5677, | 26.4716, | 5.0857, | 2.1097, | −4.0628, | −0.9001, | 8.4177}, |
| { 25.7950, | 27.1340, | 8.5506, | 1.2101, | −1.7588, | −1.5949, | 7.0585}, |

| | | Listing 2: Scaled floating-point matrix coefficients | | | | |
|---|---|---|---|---|---|---|
| { | 24.0327, | 26.6020, | 11.5219, | 1.5404, | −2.1434, | −0.9174, | 6.2732}, |
| { | 21.4130, | 28.4081, | 12.9321, | 1.1609, | −2.0113, | −0.8600, | 6.2938}, |
| { | 17.3353, | 32.8377, | 12.6182, | 1.1063, | −1.9573, | −0.5354, | 6.1088}, |
| { | 13.4774, | 31.9147, | 15.3506, | 1.0850, | −0.9839, | −0.1885, | 5.9031}, |
| { | 26.6624, | 11.6284, | 2.9965, | −0.9868, | 1.7118, | 11.2265, | 8.6462}, |
| { | 33.6736, | 21.2437, | 4.2570, | 3.1257, | −6.5752, | −1.0845, | 11.0960}, |
| { | 29.1831, | 25.6534, | 5.9796, | 1.7627, | −2.9958, | −2.1420, | 8.2933}, |
| { | 26.9429, | 25.2983, | 9.1814, | 1.3317, | −2.0028, | −0.8261, | 6.6988}, |
| { | 25.1598, | 25.5641, | 11.1514, | 1.2783, | −1.7077, | −0.7994, | 6.6362}, |
| { | 21.9337, | 28.9195, | 11.0296, | 0.8127, | −1.4871, | −0.9653, | 6.8119}, |
| { | 18.8157, | 32.4219, | 10.6572, | 0.6471, | −1.1880, | −1.0265, | 6.7612}, |
| { | 15.9964, | 31.5224, | 12.7683, | 1.0088, | −0.4830, | −0.7245, | 6.6408}, |
| { | 24.6657, | 13.3729, | 3.2720, | −1.7523, | 2.9831, | 7.8171, | 12.2754}, |
| { | 32.7529, | 21.6284, | 4.6242, | 1.0106, | 1.0004, | −7.8314, | 11.9766}, |
| { | 30.9496, | 23.8950, | 6.1775, | 1.5648, | −1.6296, | −2.5576, | 7.4320}, |
| { | 29.0469, | 23.5492, | 8.7324, | 1.5384, | −2.1284, | −0.3918, | 6.5209}, |
| { | 26.3667, | 25.5078, | 9.6670, | 1.3757, | −1.4984, | −0.8565, | 7.1430}, |
| { | 21.7765, | 30.0024, | 9.4265, | 1.1203, | −1.2502, | −1.3382, | 7.3643}, |
| { | 18.6251, | 32.7072, | 9.5067, | 0.7119, | −1.0621, | −1.3291, | 7.3685}, |
| { | 16.3625, | 31.4785, | 11.3262, | 0.6620, | −0.3937, | −1.0223, | 7.4733}, |
| { | 22.9895, | 14.1379, | 3.3029, | −2.2712, | 3.6046, | 6.2415, | 14.9943}, |
| { | 32.9294, | 20.8952, | 4.7970, | −0.0062, | 3.6509, | −5.6148, | 8.2604}, |
| { | 32.9759, | 21.8719, | 6.0543, | 1.4770, | −1.0213, | −1.5345, | 5.9994}, |
| { | 30.9992, | 22.8615, | 7.3719, | 1.4888, | −1.9700, | −0.3083, | 6.4399}, |
| { | 27.2989, | 26.4972, | 7.7041, | 1.2045, | −1.2986, | −1.0878, | 7.3992}, |
| { | 21.5143, | 31.5566, | 7.7261, | 0.9896, | −0.6768, | −2.2324, | 8.3821}, |
| { | 17.4455, | 34.0390, | 8.3158, | 0.4364, | −0.1269, | −2.4472, | 8.6138}, |
| { | 15.6047, | 32.1752, | 10.3125, | 0.4573, | 0.2353, | −2.0900, | 8.8820}, |
| { | 21.8214, | 13.8955, | 3.1036, | −1.8957, | 2.2343, | 6.9349, | 17.1625}, |
| { | 32.1976, | 20.4826, | 4.1177, | 0.0188, | 2.2116, | 2.2840, | 3.1558}, |
| { | 33.1540, | 21.3743, | 5.1209, | 0.9796, | −0.1273, | −0.1074, | 4.7363}, |
| { | 31.3637, | 23.0838, | 5.9296, | 1.4598, | −0.9800, | −0.8766, | 6.5696}, |
| { | 27.2309, | 27.5113, | 5.8571, | 1.0086, | −0.5950, | −1.4127, | 7.6471}, |
| { | 21.5555, | 32.0281, | 6.1658, | 0.8836, | −0.0563, | −2.1349, | 8.4967}, |
| { | 17.2735, | 33.8525, | 7.4129, | 0.5347, | 0.4606, | −2.7527, | 9.1814}, |
| { | 14.7865, | 31.9197, | 9.6953, | 0.1982, | 1.1406, | −2.6833, | 9.7363}, |
| { | 19.3797, | 13.8282, | 2.7939, | −0.6138, | 1.0566, | 5.2852, | 21.5205}, |
| { | 29.3772, | 19.3989, | 3.9186, | 0.1888, | 0.8925, | 5.9598, | 4.2968}, |
| { | 31.2043, | 20.6918, | 4.7014, | 0.4618, | 0.2964, | 1.8875, | 5.3346}, |
| { | 29.5139, | 22.8610, | 5.3158, | 1.0038, | −0.0802, | 0.0345, | 6.9761}, |
| { | 26.0532, | 26.9491, | 5.3353, | 1.2999, | −0.2141, | −0.5314, | 7.6902}, |
| { | 20.8956, | 30.8790, | 5.9547, | 1.0588, | 0.1084, | −0.6800, | 8.1370}, |
| { | 16.8235, | 31.7877, | 7.7340, | 0.6458, | 0.6387, | −1.5161, | 9.1087}, |
| { | 14.2202, | 30.0585, | 9.9298, | 0.7420, | 0.8570, | −1.5017, | 9.8151} |
| }, | | | | | | |
| { | | | | | | |
| { | 6.8646, | −1.6659, | −0.5250, | 34.9477, | 0.9035, | 1.8963, | −0.9296}, |
| { | 39.6092, | −10.5881, | 0.4296, | 10.5069, | 7.1754, | 1.3690, | −0.8844}, |
| { | 68.2714, | −8.5557, | −0.2252, | 3.1396, | 7.0865, | 1.6010, | −0.5346}, |
| { | 42.9440, | 31.2384, | −7.5841, | −0.1363, | 6.2999, | 1.8869, | −0.2063}, |
| { | −0.0915, | 66.0919, | −5.8669, | −2.7451, | 5.1879, | 2.6302, | −0.3545}, |
| { | −9.9097, | 45.4769, | 23.4791, | −3.2239, | 4.2699, | 2.6983, | −0.5583}, |
| { | −0.9284, | 4.5146, | 58.0740, | −1.2809, | 2.5053, | 2.9342, | −0.2304}, |
| { | 3.2580, | −10.1606, | 67.8966, | 0.5899, | 0.9317, | 3.5087, | 0.7768}, |
| { | 15.2594, | −3.0424, | 0.0391, | 41.5908, | 21.6255, | −0.1795, | −1.1588}, |
| { | 38.9361, | −8.1761, | 0.0509, | 28.4548, | 17.6429, | 3.6090, | −2.1087}, |
| { | 54.3763, | −1.3013, | −2.0597, | 13.5399, | 16.1834, | 5.4220, | −2.2442}, |
| { | 32.9243, | 30.8093, | −6.6960, | 2.2709, | 14.2608, | 6.7737, | −1.9024}, |
| { | 1.3671, | 53.0181, | −0.0961, | −3.9417, | 10.8152, | 8.4874, | −2.0769}, |
| { | −5.5014, | 32.3591, | 27.8095, | −5.0085, | 7.1275, | 9.2110, | −1.8684}, |
| { | 1.2894, | 0.9070, | 55.0510, | −2.7035, | 3.4604, | 9.3705, | −1.0885}, |
| { | 4.9229, | −9.2635, | 61.4719, | −0.3365, | 1.3262, | 9.2615, | 0.4514}, |
| { | 9.0435, | −0.1862, | 0.3850, | 12.8748, | 51.9317, | 0.2663, | −0.3914}, |
| { | 22.9275, | −1.4175, | 0.2594, | 18.2505, | 37.5476, | 7.9726, | −2.3333}, |
| { | 30.4130, | 5.1828, | −0.9646, | 12.9764, | 29.2676, | 12.6022, | −3.1921}, |
| { | 20.9044, | 22.5758, | −1.1968, | 3.7430, | 22.8484, | 15.8584, | −3.3533}, |
| { | 5.9865, | 30.9774, | 7.9171, | −3.0509, | 16.4339, | 18.3145, | −3.5175}, |
| { | 2.1489, | 16.8304, | 28.4050, | −5.4579, | 10.6650, | 18.9932, | −2.8241}, |
| { | 5.5773, | −1.8502, | 46.4870, | −4.4465, | 6.2252, | 17.6308, | −0.8961}, |
| { | 7.5997, | −7.5735, | 50.7436, | −2.4603, | 3.5426, | 16.0176, | 1.4502}, |
| { | 2.9367, | 1.4835, | 0.7005, | −3.2396, | 42.8950, | 25.5705, | −2.8886}, |
| { | 6.6477, | 3.3123, | 0.8002, | 2.4893, | 35.6885, | 27.0074, | −2.9973}, |
| { | 8.7410, | 7.3787, | 1.5083, | 3.5124, | 28.5847, | 29.5749, | −3.4849}, |
| { | 9.1714, | 11.4589, | 4.7740, | 1.0302, | 21.9031, | 31.7992, | −3.5738}, |
| { | 9.1188, | 10.5185, | 12.5519, | −2.3480, | 16.2529, | 32.7670, | −3.3487}, |
| { | 9.6837, | 3.9736, | 23.7554, | −4.6101, | 12.0897, | 31.2089, | −1.9175}, |
| { | 10.2571, | −2.4076, | 32.8776, | −5.3324, | 8.6368, | 27.9612, | 0.6868}, |

-continued

| Listing 2: Scaled floating-point matrix coefficients | | | | | | |
|---|---|---|---|---|---|---|
| { | 10.4814, | −4.4271, | 36.0751, | −3.8405, | 5.4389, | 24.4319, | 3.7978}, |
| { | 0.9026, | 1.5953, | 1.0444, | −1.0068, | 9.5116, | 56.1456, | −2.0159}, |
| { | −0.8309, | 3.8726, | 1.5271, | −0.7449, | 12.1019, | 51.6915, | −1.0896}, |
| { | −0.9456, | 5.1751, | 3.2411, | 0.0386, | 10.5190, | 50.9106, | −1.3492}, |
| { | 2.8100, | 3.1232, | 7.0422, | 0.2570, | 8.3904, | 50.1727, | −1.2910}, |
| { | 8.4326, | −0.3659, | 11.8272, | −0.5489, | 6.4136, | 48.9939, | −0.8869}, |
| { | 11.9027, | −2.3464, | 16.2221, | −2.3524, | 5.4634, | 45.5492, | 0.9024}, |
| { | 12.3106, | −2.1153, | 19.6727, | −3.6079, | 4.6024, | 40.1892, | 3.9150}, |
| { | 11.4423, | −2.1039, | 22.6505, | −3.2541, | 3.4980, | 33.6922, | 7.6330}, |
| { | −0.0517, | 1.2204, | 1.3728, | 1.6526, | −6.8786, | 52.9645, | 15.7268}, |
| { | −1.8113, | 2.2331, | 2.0962, | 1.3871, | −6.6236, | 56.1868, | 11.7427}, |
| { | −2.1003, | 2.1717, | 3.5600, | 1.6018, | −7.2583, | 58.3211, | 9.0484}, |
| { | 1.0197, | −0.3723, | 6.0520, | 2.0548, | −7.0255, | 57.6985, | 8.1318}, |
| { | 6.0611, | −3.4159, | 8.5039, | 1.7548, | −6.2031, | 55.8559, | 8.2345}, |
| { | 9.6193, | −3.2929, | 9.3820, | 0.5066, | −5.2137, | 52.9791, | 9.1704}, |
| { | 10.8752, | −1.8851, | 10.4534, | −0.9221, | −3.7701, | 47.5806, | 11.3129}, |
| { | 10.2445, | −1.4749, | 13.4551, | −1.3565, | −2.0441, | 39.5195, | 14.6535}, |
| { | −0.3213, | 0.5970, | 1.3503, | 1.0376, | −6.1381, | 22.0871, | 46.6363}, |
| { | −0.5401, | 0.1507, | 2.3650, | 2.7754, | −11.6974, | 36.1090, | 36.4719}, |
| { | −0.1825, | −0.2069, | 3.1409, | 3.7090, | −14.6570, | 44.0697, | 30.3252}, |
| { | 1.6994, | −1.4957, | 4.0423, | 4.3843, | −15.3250, | 47.2058, | 27.0747}, |
| { | 4.7107, | −2.8635, | 4.8183, | 4.2275, | −13.8020, | 46.3893, | 26.2431}, |
| { | 7.3048, | −2.7481, | 4.7720, | 3.2587, | −11.9884, | 45.2567, | 25.6073}, |
| { | 8.5760, | −1.7850, | 5.1389, | 1.8335, | −9.6028, | 41.8765, | 25.8233}, |
| { | 8.2563, | −1.4287, | 7.7055, | 0.4565, | −6.3863, | 36.0204, | 26.7572}, |
| { | 0.9341, | −0.8125, | 1.7173, | 0.7108, | −2.6666, | −0.9450, | 66.0262}, |
| { | 1.8227, | −1.6090, | 2.2481, | 2.7477, | −8.9265, | 13.4316, | 56.4468}, |
| { | 2.4081, | −1.4723, | 2.2442, | 3.7720, | −12.4599, | 22.2578, | 50.1389}, |
| { | 3.0798, | −1.4534, | 2.1935, | 4.3126, | −13.7389, | 27.1467, | 45.9521}, |
| { | 4.0522, | −1.2073, | 2.0841, | 4.6756, | −13.4608, | 28.3912, | 44.1104}, |
| { | 5.9317, | −1.6364, | 2.4376, | 4.3902, | −12.4295, | 29.0989, | 42.1629}, |
| { | 6.8306, | −1.4150, | 3.1266, | 3.1214, | −10.2665, | 28.2556, | 40.5729}, |
| { | 6.7026, | −1.1624, | 4.9840, | 2.0960, | −8.2930, | 27.0283, | 38.5133} |
| }, | | | | | | | |
| { | | | | | | | |
| { | 7.2231, | 1.6521, | 0.6622, | 25.8871, | 12.1068, | −1.3613, | −0.4526}, |
| { | 27.9975, | 6.1628, | −0.4285, | 8.3385, | 18.8402, | −1.8218, | −0.7079}, |
| { | 41.1031, | 17.2010, | −1.4526, | 7.1032, | 16.4545, | −0.3569, | −0.6310}, |
| { | 28.0046, | 40.7565, | −2.4481, | 6.9501, | 13.9963, | 0.7072, | −0.4580}, |
| { | 10.5348, | 55.0553, | 3.4208, | 5.7101, | 13.1141, | 0.7907, | −0.1334}, |
| { | 2.5030, | 45.5030, | 22.3154, | 3.6732, | 12.9492, | 0.8433, | −0.1264}, |
| { | 1.1866, | 14.9397, | 53.5783, | 2.5583, | 12.3168, | 1.1068, | 0.0501}, |
| { | −1.0774, | −15.3823, | 82.3069, | 1.5897, | 12.2404, | 1.6637, | 1.2651}, |
| { | 11.4614, | 4.5027, | 0.3579, | 20.5267, | 37.5634, | −2.2697, | −1.0972}, |
| { | 20.6664, | 17.7441, | −1.6693, | 9.6579, | 39.9610, | −0.6600, | −1.8741}, |
| { | 20.4229, | 34.3328, | −1.7749, | 6.6709, | 38.1725, | 0.3343, | −1.7547}, |
| { | 14.3696, | 45.5821, | 3.1150, | 5.3386, | 36.0673, | 1.8227, | −1.8922}, |
| { | 11.1597, | 43.3899, | 15.6880, | 4.9291, | 34.4168, | 2.4763, | −1.8288}, |
| { | 7.5073, | 29.8688, | 36.0300, | 3.3838, | 32.7324, | 3.3511, | −1.6787}, |
| { | 1.1252, | 5.3091, | 64.5311, | 1.3007, | 29.9587, | 4.7446, | −1.1478}, |
| { | −6.2643, | −18.4907, | 90.0846, | −0.1613, | 26.8349, | 6.0196, | 0.6040}, |
| { | 8.4223, | 7.2646, | 0.6638, | 1.9894, | 55.3283, | 4.8060, | −1.9603}, |
| { | 12.9383, | 22.3251, | −0.0394, | 2.2388, | 51.5756, | 8.5805, | −3.1697}, |
| { | 8.5162, | 37.5355, | 2.5877, | 1.1759, | 51.0982, | 7.9298, | −2.7175}, |
| { | 5.2062, | 41.3964, | 11.6602, | −0.1137, | 50.4806, | 7.8581, | −2.4483}, |
| { | 5.2574, | 32.5941, | 27.7309, | −0.5735, | 49.0366, | 9.0506, | −2.6887}, |
| { | 3.4314, | 16.0017, | 49.6632, | −1.8246, | 47.1171, | 10.7790, | −2.7749}, |
| { | −4.0217, | −5.2024, | 76.0044, | −4.0717, | 43.5359, | 12.8453, | −2.1121}, |
| { | −13.2409, | −20.5590, | 95.5000, | −4.9748, | 37.7050, | 14.3191, | 0.4758}, |
| { | 5.8307, | 7.8890, | 1.5881, | −4.6534, | 41.1366, | 30.0520, | −4.0131}, |
| { | 6.7091, | 21.9539, | 3.1788, | −2.0847, | 40.7303, | 29.6201, | −4.0127}, |
| { | 1.3993, | 33.3342, | 9.0013, | −2.7260, | 42.6357, | 27.3380, | −3.5302}, |
| { | −2.3190, | 33.1250, | 21.4607, | −4.7307, | 44.4430, | 26.1825, | −3.2604}, |
| { | −3.1592, | 21.3877, | 40.2080, | −6.1103, | 45.4332, | 26.3952, | −3.3871}, |
| { | −5.4943, | 3.2025, | 63.1085, | −7.8420, | 44.9942, | 27.9108, | −3.5652}, |
| { | −13.0867, | −12.8706, | 85.4607, | −9.1715, | 41.5610, | 29.2335, | −2.2584}, |
| { | −23.2732, | −16.2955, | 95.5000, | −8.9441, | 35.7045, | 28.3311, | 1.9390}, |
| { | 3.2531, | 8.2110, | 2.6337, | −3.1740, | 12.4356, | 56.9320, | −2.2034}, |
| { | 1.1922, | 19.2552, | 7.0577, | −3.0323, | 17.1274, | 54.0566, | −1.7942}, |
| { | −4.1616, | 25.1113, | 17.0029, | −4.1587, | 21.1738, | 51.3857, | −1.5343}, |
| { | −8.1886, | 20.3568, | 33.2167, | −5.9564, | 24.1463, | 50.0807, | −1.5948}, |
| { | −10.3243, | 6.6824, | 53.8956, | −7.8927, | 26.2344, | 49.6560, | −1.6717}, |
| { | −14.1224, | −9.5450, | 75.7989, | −9.1349, | 27.0487, | 49.6867, | −1.3196}, |
| { | −22.0104, | −19.0862, | 93.2125, | −10.0595, | 25.9328, | 48.0039, | 1.3884}, |
| { | −31.8308, | −13.4795, | 95.5000, | −10.2607, | 24.1776, | 42.0152, | 7.6636}, |
| { | 0.7048, | 8.2666, | 3.7402, | −1.3684, | −4.3734, | 57.7698, | 13.3230}, |
| { | −3.0922, | 14.2249, | 12.1499, | −2.5180, | −1.4093, | 59.9045, | 11.3266}, |

| Listing 2: Scaled floating-point matrix coefficients |

```
{
{   −7.9324,    13.3679,    26.3140,    −4.0452,     2.0446,    58.9460,    11.0428},
{  −13.0517,     4.7211,    45.6578,    −5.9320,     4.5476,    58.7871,    10.5548},
{  −16.5089,    −9.6147,    67.3910,    −7.3357,     6.0904,    58.9578,    10.4931},
{  −21.1140,   −21.3003,    86.4657,    −7.9581,     7.2364,    57.5524,    11.7995},
{  −29.7315,   −20.5666,    95.5000,    −8.6426,     8.8839,    52.7476,    15.7840},
{  −32.5000,   −15.4673,    95.5000,    −8.8670,    10.9281,    43.3388,    22.8943},
{   −1.0985,     4.8800,     6.7502,    −2.0700,    −3.7436,    21.7382,    49.5051},
{   −5.4547,     4.6000,    19.5364,    −3.6958,    −2.1929,    25.5332,    47.1530},
{  −10.4769,    −2.3748,    37.6589,    −5.1188,     0.1064,    25.7724,    46.9440},
{  −16.6359,   −13.3305,    58.9048,    −6.3877,     1.3104,    26.3451,    46.7730},
{  −22.1214,   −24.3259,    78.8750,    −7.0541,     2.2483,    26.4805,    47.1171},
{  −27.2839,   −29.9951,    93.4069,    −7.1357,     3.3735,    25.2438,    48.3791},
{  −32.5000,   −22.8692,    95.5000,    −6.6665,     4.4661,    21.4660,    51.7115},
{  −32.5000,   −18.7931,    95.5000,    −6.8400,     6.6403,    15.4390,    55.7979},
{   −4.2346,    −2.5993,    14.1852,    −3.5706,     6.7665,   −29.5384,    90.8329},
{   −8.2875,    −8.1328,    30.0511,    −5.3763,     8.8731,   −30.6466,    92.5840},
{  −12.8514,   −17.8636,    49.3929,    −6.8032,    10.9841,   −32.5000,    94.4879},
{  −18.9870,   −27.7547,    68.8451,    −7.7866,    11.7679,   −32.5000,    95.2279},
{  −26.3230,   −32.5000,    84.1213,    −8.5936,    12.6097,   −32.1032,    95.5000},
{  −32.2993,   −32.5000,    93.9349,    −8.7781,    12.7449,   −31.0653,    95.5000},
{  −32.5000,   −27.6020,    95.5000,    −7.3441,    11.5031,   −29.7244,    95.5000},
{  −32.5000,   −23.2154,    95.5000,    −7.2956,    12.0271,   −29.2257,    94.7211}
},
{
{   −2.1968,     0.1004,     0.3539,     9.67952,    2.0421,    −0.0217,    −0.4162},
{   30.8083,    −6.3770,     1.5704,   −16.3654,     5.6035,     0.2125,    −0.0407},
{   65.7716,    −5.8810,     2.1869,    −6.5725,     1.8738,     0.9620,     0.1799},
{   43.4257,    29.2011,    −2.4037,    −0.5621,     0.4551,     0.6731,    −0.0264},
{    3.8771,    61.8574,    −0.4798,    −1.7736,     1.2524,     0.0224,    −0.0486},
{   −6.4760,    44.2899,    25.9337,    −2.2419,     1.1767,     0.2744,    −0.2963},
{   −2.1172,     7.3534,    59.2359,    −1.0308,     0.3909,     0.6508,    −0.5995},
{    0.4450,    −9.2880,    72.9380,    −0.3104,     0.4018,     0.4847,    −0.3719},
{    2.2814,    −1.6595,     0.8303,    −0.6859,    19.5244,    −2.5586,    −0.3862},
{   34.3654,    −7.7749,     1.9707,   −20.5168,     9.0606,     0.8009,    −0.1469},
{   65.0807,    −4.1594,     2.2231,    −8.4723,     1.7042,     1.3953,     0.1739},
{   39.0497,    33.0103,    −1.7930,    −1.5502,     0.3134,     0.7217,    −0.0970},
{    1.8389,    60.2716,     3.3243,    −2.1869,     1.2780,    −0.2390,    −0.1821},
{   −6.1498,    38.4472,    31.6912,    −2.7566,     1.8566,    −0.2170,    −0.4397},
{   −2.1189,     4.7236,    62.0509,    −1.5097,     1.0148,     0.3797,    −0.7492},
{    0.1347,    −9.0784,    73.3996,    −0.6292,     0.9652,     0.5414,    −0.6503},
{    4.7708,    −2.7370,     1.2941,   −23.6628,    47.3152,    −5.0264,    −0.0294},
{   39.2687,    −9.7997,     2.7602,   −27.1507,    17.7942,    −0.1763,     0.1694},
{   65.5841,    −2.9777,     2.3034,    −8.7605,     1.8612,     1.5447,     0.2400},
{   34.1170,    37.8482,    −2.1775,    −1.2752,    −0.5128,     1.1031,    −0.1391},
{   −0.9164,    60.0564,     5.8834,    −2.2073,     1.0857,     0.0164,    −0.4238},
{   −6.4138,    33.8230,    36.3992,    −3.1116,     2.0940,     0.1533,    −0.8761},
{   −2.3111,     2.1094,    64.7004,    −2.2100,     1.6063,     0.6443,    −1.1418},
{   −0.5848,    −9.6157,    74.2972,    −1.5669,     1.6813,     0.8859,    −0.9137},
{    7.8787,    −3.9043,     1.7941,   −32.5000,    44.4050,    14.3345,    −3.6202},
{   43.7351,   −10.8637,     3.0533,   −32.5000,    22.6803,     3.3384,    −0.1477},
{   64.7761,    −0.3235,     1.6208,   −10.7319,     4.6278,     0.5176,     0.7420},
{   28.9305,    42.8045,    −2.7845,    −2.1305,     0.4949,     0.0490,     0.1838},
{   −3.3838,    59.7220,     8.3165,    −2.6949,     1.4929,    −0.1588,    −0.4795},
{   −6.3989,    29.7090,    40.6031,    −3.1157,     2.1935,     0.4775,    −1.2402},
{   −2.6484,     0.3422,    66.7576,    −2.4445,     1.9258,     1.1016,    −1.6348},
{   −0.8920,    −9.8309,    74.8418,    −2.1525,     2.0204,     1.4059,    −1.3507},
{    9.7109,    −4.5195,     1.8195,   −31.1697,    15.5293,    47.0198,    −6.6280},
{   47.9818,   −11.8601,     3.0985,   −32.5000,    16.0153,    14.5102,    −1.0200},
{   62.1537,     3.9467,     0.1776,   −14.5743,     7.9555,     0.6646,     0.9922},
{   23.3605,    47.6388,    −3.2341,    −4.8673,     3.1400,    −0.8279,     0.2338},
{   −5.3607,    58.2929,    11.1657,    −3.7189,     2.3081,    −0.1416,    −0.6901},
{   −6.1444,    25.7057,    44.4352,    −2.8363,     1.4608,     1.3185,    −1.7068},
{   −2.6963,    −1.5705,    68.6630,    −3.0551,     1.9216,     1.5626,    −1.8413},
{   −0.9200,   −10.5259,    75.5171,    −3.3235,     2.6622,     1.6389,    −1.5318},
{   12.0845,    −5.5067,     1.9410,   −26.1707,    −2.0966,    48.3245,     8.3376},
{   48.9796,   −10.8735,     2.7302,   −32.5000,     8.9775,    20.0573,     3.3764},
{   58.0615,     8.5364,    −0.8471,   −17.8838,     8.5807,     3.1917,     1.0706},
{   19.2536,    50.1695,    −2.7103,    −8.2866,     5.0188,    −0.1521,    −0.0631},
{   −5.4456,    54.9012,    14.5223,    −4.6997,     2.7330,     0.2451,    −1.0705},
{   −5.6273,    22.2465,    47.4731,    −3.1630,     1.5506,     1.3308,    −1.8279},
{   −2.7924,    −2.5204,    69.6753,    −3.5351,     2.2330,     1.1185,    −1.5464},
{   −1.1372,   −10.8843,    75.7413,    −4.1728,     3.1478,     1.1778,    −0.9436},
{   14.6339,    −5.7893,     1.7655,   −24.5516,     2.1268,    11.6030,    42.9439},
{   47.8380,    −8.2936,     2.1026,   −32.5000,     8.5584,     8.8713,    18.2714},
{   52.0516,    13.0640,    −1.0182,   −19.5075,     7.9191,     3.8212,     3.8259},
{   16.7877,    49.2898,    −0.5590,   −10.2709,     5.3317,     1.3157,    −0.0083},
{   −3.6789,    48.9924,    18.8324,    −5.6105,     3.2473,     0.7488,    −1.1986},
```

-continued

| Listing 2: Scaled floating-point matrix coefficients | | | | | | |
|---|---|---|---|---|---|---|
| { −4.3911, | 19.2415, | 49.4891, | −3.7337, | 2.4999, | 0.9890, | −1.6988}, |
| { −2.7404, | −2.0798, | 69.1070, | −3.5200, | 2.6523, | 0.5972, | −1.2358}, |
| { −1.3902, | −10.3901, | 75.1581, | −4.1359, | 3 1951 | 0.6675, | −0.3499}, |
| { 16.0078, | −4.5481, | 2.0473, | −21.8252, | 8.3076, | −16.2009, | 64.7683}, |
| { 43.3413, | −4.6518, | 2.4209, | −29.4694, | 9.7061, | −5.6098, | 33.8388}, |
| { 44.6773, | 15.2238, | 0.8782, | −20.1771, | 7.8001, | 0.1519, | 10.9830}, |
| { 16.9099, | 42.7876, | 4.4514, | −11.3982, | 5.4606, | 0.9422, | 2.7890}, |
| { 0.1893, | 40.4223, | 23.2961, | −6.7536, | 3.7160, | 0.7881, | 0.2791}, |
| { −2.4871, | 16.9335, | 49.4412, | −4.7456, | 3.2718, | 0.7296, | −0.5728}, |
| { −2.2767, | −0.4328, | 66.3614, | −4.0740, | 3.0356, | 0.2312, | −0.1764}, |
| { −1.2535, | −8.2844, | 72.3398, | −4.1170, | 3.0198, | 0.4261, | 0.6098} |
| }, | | | | | | |
| { | | | | | | |
| { 4.3992, | −2.8863, | 1.3756, | 10.9790, | 14.6687, | −2.5283, | −0.7475}, |
| { 42.0734, | −12.0403, | 3.1172, | −13.3512, | 14.9186, | 2.3791, | −0.1421}, |
| { 59.7700, | 3.2177, | −0.1850, | −2.6795, | −0.9238, | 7.9372, | 1.8287}, |
| { 21.3014, | 48.4983, | −5.5541, | 1.4275, | −4.3764, | 3.9624, | 4.6333}, |
| { −8.1718, | 59.0305, | 8.7863, | −0.8133, | −1.3722, | −0.8905, | 5.5548}, |
| { −6.7537, | 25.3760, | 42.4606, | −1.0577, | −0.1617, | −2.4808, | 4.8854}, |
| { −0.2239, | −4.1261, | 67.2251, | −0.1903, | 0.2405, | −3.0834, | 4.1694}, |
| { 2.3559, | −12.4856, | 73.1449, | 0.5967, | −0.2021, | −2.4103, | 3.4734}, |
| { 18.0141, | −6.3611, | 2.1102, | 1.3718, | 42.0533, | −2.0538, | −0.9202}, |
| { 42.5357, | −4.0046, | 1.0560, | −9.4279, | 13.7635, | 15.1392, | 0.8939}, |
| { 32.1643, | 26.3939, | −2.9528, | −1.8760, | −6.2743, | 13.5495, | 7.8794}, |
| { −1.2716, | 52.5390, | 4.5024, | −0.9524, | −4.5901, | 1.4402, | 11.5968}, |
| { −9.8274, | 34.7546, | 32.1592, | −1.8167, | −0.5442, | −4.3874, | 10.2420}, |
| { −2.6479, | 2.8667, | 60.5219, | −0.6098, | 0.2461, | −5.0691, | 7.6370}, |
| { 1.1471, | −11.7797, | 73.2232, | 0.1732, | 0.5947, | −4.6125, | 5.4453}, |
| { 2.0566, | −13.0611, | 73.8663, | 0.5396, | 0.2608, | −3.1098, | 3.7688}, |
| { 19.0351, | −3.1712, | 1.2033, | −7.0720, | 40.3920, | 18.5828, | −2.2728}, |
| { 28.5357, | 10.3809, | −1.0222, | −1.7124, | −0.5452, | 28.4182, | 7.1312}, |
| { 7.5923, | 38.4767, | 1.5122, | −0.1631, | −7.8623, | 8.7755, | 18.3465}, |
| { −9.8369, | 39.5229, | 21.9090, | −2.1558, | −1.4785, | −4.9282, | 17.7558}, |
| { −6.8992, | 12.3176, | 51.4903, | −1.6529, | 0.9085, | −7.1312, | 12.2387}, |
| { −0.4713, | −8.5216, | 69.8254, | −0.3439, | 0.8313, | −5.8742, | 7.9327}, |
| { 1.7654, | −14.3600, | 75.3766, | 0.1731, | 0.5904, | −4.1564, | 4.8686}, |
| { 2.0363, | −12.5845, | 73.4426, | 0.6668, | 0.0092, | −2.3170, | 3.1812}, |
| { 12.9268, | 3.2874, | −0.3288, | −1.5481, | 7.0809, | 47.4322, | 1.1160}, |
| { 10.9703, | 20.7790, | 0.5182, | 2.7064, | −8.4147, | 21.4856, | 23.2641}, |
| { −5.3250, | 35.3395, | 13.3302, | −0.0087, | −2.8066, | −4.8891, | 28.9791}, |
| { −9.5198, | 21.3915, | 39.8047, | −1.8355, | 1.4065, | −9.7019, | 19.7523}, |
| { −3.7947, | −1.3240, | 63.2617, | −1.1444, | 1.2036, | −6.9719, | 11.0315}, |
| { 0.2506, | −12.1566, | 73.3276, | −0.1463, | 0.5143, | −4.6512, | 6.4788}, |
| { 1.7752, | −14.1500, | 75.4289, | 0.4550, | −0.2773, | −2.5325, | 3.5965}, |
| { 1.7869, | −11.9503, | 72.8235, | 1.1992, | −0.9476, | −0.9460, | 2.5178}, |
| { 6.1554, | 8.2525, | −0.4514, | 2.5789, | −9.3160, | 40.3021, | 22.0250}, |
| { −0.7136, | 22.8565, | 7.0160, | 1.8025, | −3.2585, | −0.4629, | 41.1693}, |
| { −9.5144, | 25.0093, | 27.9960, | −0.9964, | 2.6349, | −13.8773, | 32.2822}, |
| { −6.9138, | 7.1070, | 53.6349, | −1.0241, | 2.5536, | −9.7980, | 17.0979}, |
| { −1.6562, | −7.6729, | 69.0725, | −0.2682, | 0.7098, | −4.8909, | 8.1740}, |
| { 0.5222, | −12.6448, | 74.2619, | 0.3510, | −0.3944, | −2.4027, | 4.2383}, |
| { 1.9068, | −13.6141, | 74.9225, | 0.8757, | −0.9154, | −1.3103, | 2.6402}, |
| { 1.8449, | −11.5070, | 72.0439, | 1.2627, | −1.0639, | −0.4885, | 2.3445}, |
| { 0.6747, | 9.9051, | 2.5723, | 2.0933, | −3.8145, | 7.3142, | 49.6326}, |
| { −6.3039, | 18.8722, | 17.5442, | 0.8416, | 2.2470, | −13.9640, | 47.5059}, |
| { −9.3671, | 13.8640, | 41.6003, | −0.6596, | 3.4237, | −12.4561, | 27.1851}, |
| { −5.2692, | −0.4017, | 61.4788, | −0.3325, | 1.7525, | −6.4102, | 12.4381}, |
| { −0.8309, | −9.5608, | 71.2037, | 0.4406, | −0.1406, | −2.3997, | 5.3846}, |
| { 1.1774, | −12.5971, | 74.2427, | 0.5454, | −0.9573, | −0.8090, | 2.7865}, |
| { 2.3394, | −12.8402, | 74.0450, | 0.9913, | −1.3631, | −0.1997, | 1.8414}, |
| { 2.5514, | −11.0662, | 71.1317, | 1.7143, | −1.3489, | 0.1516, | 1.9859}, |
| { −3.0424, | 8.7984, | 9.4845, | 1.0754, | 1.8494, | −11.7234, | 60.4975}, |
| { −7.7561, | 12.2083, | 29.5832, | 1.7914, | 2.8136, | −13.5451, | 41.4928}, |
| { −7.5161, | 5.4141, | 51.4148, | 1.6756, | 1.2304, | −6.7633, | 19.5256}, |
| { −3.8187, | −3.6838, | 64.8995, | 1.1065, | −0.0768, | −2.1316, | 8.0847}, |
| { −0.2581, | −9.2703, | 71.0097, | 1.1932, | −1.0149, | −0.4508, | 3.6212}, |
| { 2.0548, | −11.9485, | 73.0784, | 1.5395, | −1.8135, | 0.5226, | 1.8823}, |
| { 3.0721, | −11.8436, | 72.3541, | 1.8872, | −1.8638, | 0.6097, | 1.3659}, |
| { 2.8938, | −10.1977, | 69.5692, | 2.3303, | −1.6093, | 0.5340, | 1.9303}, |
| { −4.6246, | 5.5364, | 19.1667, | 1.6692, | 2.4751, | −11.9896, | 53.7583}, |
| { −6.2902, | 5.3155, | 39.0050, | 2.5867, | 1.6265, | −7.7895, | 32.0918}, |
| { −4.6652, | 0.7183, | 55.1039, | 2.6197, | −0.1707, | −2.4150, | 14.8597}, |
| { −2.0649, | −4.0726, | 63.6750, | 2.4420, | −1.4930, | −0.0719, | 7.1889}, |

| Listing 2: Scaled floating-point matrix coefficients |

```
{
    {      0.4522,    -7.5602,    67.8569,     2.5412,    -1.8005,     0.3273,     4.0429},
    {      1.9953,    -9.2640,    69.4635,     2.3717,    -1.8534,     0.7775,     2.4437},
    {      2.6607,    -9.2956,    68.9953,     2.2845,    -1.6478,     0.4937,     2.0685},
    {      2.2846,    -8.3497,    66.8560,     2.8280,    -1.7075,     0.7211,     2.4076}
},
{

{     -2.2915,     0.8575,    -0.4119,    23.4214,     0.0075,     0.3279,    -0.3751},
    {     14.8438,    -1.8652,    -0.5112,    -2.6975,     3.7405,    -0.3414,    -0.2165},
    {     48.6589,    -4.4939,    -0.0978,    -4.0768,     2.3466,     0.0716,    -0.0990},
    {     52.7940,    14.4559,    -3.0941,    -0.2862,     0.1884,     0.6554,    -0.1595},
    {     21.6648,    49.6851,    -6.2182,    -0.4330,    -0.2145,     0.9275,    -0.2613},
    {     -2.1711,    58.3356,     6.2333,    -1.3072,     0.3775,     0.7320,    -0.3103},
    {     -2.0994,    23.7660,    41.4794,    -1.0494,     0.5518,     0.1983,    -0.3326},
    {      5.3906,   -11.2704,    70.1446,     0.0710,     0.1434,     0.2377,    -0.1674},
    {      1.2199,     0.2828,    -0.5792,    36.2818,     7.0603,    -0.5594,    -0.6953},
    {      6.4508,     0.1415,    -1.0250,    11.1864,     1.5415,     0.7783,    -0.6372},
    {     31.1766,    -2.4612,    -0.7227,    -2.5701,     1.8213,     0.2829,    -0.1780},
    {     50.2681,     4.5382,    -1.5976,    -2.8384,     0.9372,     0.4825,    -0.1405},
    {     38.5550,    30.6265,    -4.8132,    -1.4594,     0.2412,     0.6853,    -0.3723},
    {     11.8853,    53.6175,    -1.5139,    -1.5756,     0.5176,     0.5405,    -0.4926},
    {      0.7183,    39.7058,    22.8137,    -1.6698,     0.4608,     0.3736,    -0.5633},
    {      5.0303,     4.8517,    54.2845,    -0.6063,    -0.2716,     0.7596,    -0.6222},
    {      1.6370,     0.5091,    -0.4875,    28.1702,    28.8304,    -3.3612,    -0.3882},
    {      3.6653,     0.5090,    -0.9449,    23.7741,     5.5790,     0.3612,    -0.7283},
    {     19.0233,    -1.5057,    -0.9529,     6.1845,     0.6245,     1.1132,    -0.4272},
    {     42.5718,    -0.6657,    -1.0217,    -1.5444,     0.8146,     0.9406,    -0.3671},
    {     47.6790,    15.1066,    -3.3721,    -1.8472,     0.4121,     0.7637,    -0.5105},
    {     27.5973,    41.2594,    -4.5031,    -2.0615,     0.5265,     0.7750,    -0.6745},
    {      9.2481,    46.1206,     8.7202,    -2.2155,     0.6003,     0.4896,    -0.6016},
    {      6.2865,    21.3874,    36.1839,    -1.5830,     0.1989,     0.5715,    -0.5001},
    {      1.4194,     0.9203,    -0.4440,    10.9826,    45.1806,     3.1602,    -1.5948},
    {      2.7929,     0.9856,    -0.9908,    22.8777,    22.4356,    -2.5328,    -0.4079},
    {     11.1286,    -0.1901,    -1.2112,    14.2364,     6.6786,    -0.7083,    -0.3122},
    {     31.9254,    -1.8639,    -1.0731,     2.9602,     1.8834,     0.5526,    -0.4170},
    {     47.4171,     5.1936,    -2.2506,    -0.8082,     0.3438,     0.7530,    -0.5119},
    {     40.6443,    25.4869,    -4.1371,    -1.5050,    -0.0128,     0.7521,    -0.5677},
    {     21.9941,    41.1745,     1.3335,    -2.0972,     0.1964,     0.6138,    -0.5834},
    {     11.3094,    32.0875,    20.3491,    -1.7343,     0.1393,     0.8355,    -0.5624},
    {      1.0682,     0.9418,    -0.3277,     2.0861,    36.2664,    26.0126,    -4.2942},
    {      2.0072,     1.0787,    -0.9733,    13.1124,    37.9152,     0.9455,    -0.9942},
    {      6.4293,     0.7925,    -1.4844,    15.7535,    19.9948,    -3.1924,    -0.0609},
    {     22.0239,    -1.3460,    -1.2990,     8.4427,     6.7115,    -0.9205,    -0.2459},
    {     41.0390,     0.1297,    -1.4696,     1.8267,     1.5718,     0.5697,    -0.5415},
    {     45.3915,    13.0066,    -3.0747,    -0.6278,     0.0838,     0.4467,    -0.4104},
    {     33.2522,    30.8996,    -1.6294,    -1.3611,    -0.5256,     0.9555,    -0.6499},
    {     18.9708,    33.9372,    10.0505,    -1.6098,    -0.1153,     1.2462,    -0.6269},
    {      1.2947,     0.3319,    -0.2913,     1.9625,    11.6324,    49.3125,    -1.0884},
    {      1.6586,     0.9182,    -0.8726,     6.0536,    33.5494,    20.2546,    -3.6159},
    {      4.2878,     1.2812,    -1.5642,    12.4787,    30.1986,     1.5152,    -1.2551},
    {     15.4189,    -0.7331,    -1.3819,    10.8279,    15.8103,    -1.7431,    -0.3013},
    {     32.4749,    -1.3599,    -1.3113,     5.7346,     5.5594,    -0.4051,    -0.3878},
    {     42.6769,     6.1336,    -2.4385,     1.1777,     1.6822,     0.2566,    -0.3862},
    {     38.9499,    20.6489,    -2.1396,    -0.9490,     0.2175,     0.7684,    -0.4758},
    {     26.6130,    29.1374,     4.9657,    -1.5452,     0.1460,     1.2555,    -0.4296},
    {      0.9113,     0.1992,    -0.5899,     2.8117,    -1.3968,    39.4528,    22.0371},
    {      1.5493,     0.6479,    -0.8820,     4.6591,    16.5787,    37.6632,     0.6704},
    {      3.7437,     1.0601,    -1.3839,     8.9875,    27.8167,    16.0244,    -2.4812},
    {     11.1728,    -0.0938,    -1.4393,    10.8249,    22.0603,     3.1641,    -1.1226},
    {     24.4323,    -1.0812,    -1.3372,     7.9608,    12.0064,     0.0795,    -0.4984},
    {     36.0694,     2.7146,    -1.7372,     3.5779,     5.1821,     0.2152,    -0.3172},
    {     38.2516,    13.1279,    -1.5933,     0.6058,     1.6777,     0.8196,    -0.2862},
    {     30.5647,    22.8097,     2.7970,    -0.6953,     0.6431,     1.3226,    -0.0776},
    {      0.7461,     0.2093,    -0.5046,     1.3128,     1.8436,     4.0590,    55.0670},
    {      2.1940,     0.1194,    -0.7928,     4.2692,     6.0233,    29.8263,    20.1576},
    {      4.3210,     0.5895,    -1.0900,     7.1817,    17.6076,    25.3889,     3.8346},
    {      9.3209,     0.5661,    -1.2570,     9.3118,    21.0232,    11.3201,     0.7455},
    {     18.0146,     0.8494,    -1.3749,     8.6052,    15.7174,     3.7996,     0.3177},
    {     27.2867,     3.2097,    -1.2480,     5.1420,     9.0826,     1.6775,     0.2069},
    {     32.5372,     9.7241,    -0.6143,     2.5057,     4.0137,     1.4774,     0.3126},
    {     30.0346,    17.1657,     2.7780,     0.9841,     1.5614,     1.5822,     0.8266}
}
}
```

Now, adding the fixed offset of 32 to these matrix coefficients, a set of matrices results with all coefficients equal to or greater than −0.5 and therefore rounded to non-negative values. This set is shown in Listing 3.

Listing 3: Scaled floating-point matrix coefficients after addition of constant offset

```
{
  {
    {    42.0028,   36.6783,   32.7191,   26.7600,   43.5493,   32.9614,   35.1568},
    {    70.7883,   38.8720,   33.6349,   24.1269,   36.0568,   35.1293,   35.6942},
    {    76.6869,   46.1069,   34.5884,   32.7541,   30.3134,   33.9638,   36.0021},
    {    63.5073,   60.1619,   34.8726,   33.2444,   30.9584,   31.7694,   36.3886},
    {    48.9721,   70.7326,   38.0764,   32.4121,   31.6832,   31.0872,   36.3166},
    {    42.4321,   65.7430,   50.1403,   32.5748,   31.1243,   31.7553,   35.7588},
    {    39.6308,   51.6113,   67.3806,   33.0372,   31.1563,   31.7580,   35.3926},
    {    37.9263,   43.4581,   75.3847,   32.7825,   32.2899,   32.1184,   35.2618},
    {    55.9340,   40.0661,   32.9766,   26.3467,   43.4664,   38.2637,   36.2246},
    {    69.9596,   48.8514,   33.8146,   29.7491,   27.9824,   38.3644,   37.8588},
    {    65.0128,   56.7876,   35.5763,   33.8870,   27.7702,   33.3258,   38.6804},
    {    58.5988,   59.9354,   39.1057,   33.0590,   30.0300,   31.0342,   38.2353},
    {    55.3106,   60.0932,   43.0008,   32.9814,   30.3341,   30.6412,   37.9071},
    {    51.3079,   60.9384,   46.9788,   33.3444,   29.6717,   31.6493,   37.3015},
    {    45.8131,   62.3660,   50.9704,   33.5217,   29.7293,   31.8731,   36.9926},
    {    42.0155,   59.7279,   55.4488,   33.1707,   31.1192,   31.9861,   36.7836},
    {    59.5915,   42.1589,   34.0388,   29.7280,   36.8532,   42.8935,   37.8351},
    {    67.6512,   52.4019,   35.1298,   34.8918,   22.1321,   37.4673,   40.3040},
    {    61.5677,   58.4716,   37.0857,   34.1097,   27.9372,   31.0999,   40.4177},
    {    57.7950,   59.1340,   40.5506,   33.2101,   30.2412,   30.4051,   39.0585},
    {    56.0327,   58.6020,   43.5219,   33.5404,   29.8566,   31.0826,   38.2732},
    {    53.4130,   60.4081,   44.9321,   33.1609,   29.9887,   31.1400,   38.2938},
    {    49.3353,   64.8377,   44.6182,   33.1063,   30.0427,   31.4646,   38.1088},
    {    45.4774,   63.9147,   47.3506,   33.0850,   31.0161,   31.8115,   37.9031},
    {    58.6624,   43.6284,   34.9965,   31.0132,   33.7118,   43.2265,   40.6462},
    {    65.6736,   53.2437,   36.2570,   35.1257,   25.4248,   30.9155,   43.0960},
    {    61.1831,   57.6534,   37.9796,   33.7627,   29.0042,   29.8580,   40.2933},
    {    58.9429,   57.2983,   41.1814,   33.3317,   29.9972,   31.1739,   38.6988},
    {    57.1598,   57.5641,   43.1514,   33.2783,   30.2923,   31.2006,   38.6362},
    {    53.9337,   60.9195,   43.0296,   32.8127,   30.5129,   31.0347,   38.8119},
    {    50.8157,   64.4219,   42.6572,   32.6471,   30.8120,   30.9735,   38.7612},
    {    47.9964,   63.5224,   44.7683,   33.0088,   31.5170,   31.2755,   38.6408},
    {    56.6657,   45.3729,   35.2720,   30.2477,   34.9831,   39.8171,   44.2754},
    {    64.7529,   53.6284,   36.6242,   33.0106,   33.0004,   24.1686,   43.9766},
    {    62.9496,   55.8950,   38.1775,   33.5648,   30.3704,   29.4424,   39.4320},
    {    61.0469,   55.5492,   40.7324,   33.5384,   29.8716,   31.6082,   38.5209},
    {    58.3667,   57.5078,   41.6670,   33.3757,   30.5016,   31.1435,   39.1430},
    {    53.7765,   62.0024,   41.4265,   33.1203,   30.7498,   30.6618,   39.3643},
    {    50.6251,   64.7072,   41.5067,   32.7119,   30.9379,   30.6709,   39.3685},
    {    48.3625,   63.4785,   43.3262,   32.6620,   31.6063,   30.9777,   39.4733},
    {    54.9895,   46.1379,   35.3029,   29.7288,   35.6046,   38.2415,   46.9943},
    {    64.9294,   52.8952,   36.7970,   31.9938,   35.6509,   26.3852,   40.2604},
    {    64.9759,   53.8719,   38.0543,   33.4770,   30.9787,   30.4655,   37.9994},
    {    62.9992,   54.8615,   39.3719,   33.4888,   30.0300,   31.6917,   38.4399},
    {    59.2989,   58.4972,   39.7041,   33.2045,   30.7014,   30.9122,   39.3992},
    {    53.5143,   63.5566,   39.7261,   32.9896,   31.3232,   29.7676,   40.3821},
    {    49.4455,   66.0390,   40.3158,   32.4364,   31.8731,   29.5528,   40.6138},
    {    47.6047,   64.1752,   42.3125,   32.4573,   32.2353,   29.9100,   40.8820},
    {    53.8214,   45.8955,   35.1036,   30.1043,   34.2343,   38.9349,   49.1625},
    {    64.1976,   52.4826,   36.1177,   32.0188,   34.2116,   34.2840,   35.1558},
    {    65.1540,   53.3743,   37.1209,   32.9796,   31.8727,   31.8926,   36.7363},
    {    63.3637,   55.0838,   37.9296,   33.4598,   31.0200,   31.1234,   38.5696},
    {    59.2309,   59.5113,   37.8571,   33.0086,   31.4050,   30.5873,   39.6471},
    {    53.5555,   64.0281,   38.1658,   32.8836,   31.9437,   29.8651,   40.4967},
    {    49.2735,   65.8525,   39.4129,   32.5347,   32.4606,   29.2473,   41.1814},
    {    46.7865,   63.9197,   41.6953,   32.1982,   33.1406,   29.3167,   41.7363},
    {    51.3797,   45.8282,   34.7939,   31.3862,   33.0566,   37.2852,   53.5205},
    {    61.3772,   51.3989,   35.9186,   32.1888,   32.8925,   37.9598,   36.2968},
    {    63.2043,   52.6918,   36.7014,   32.4618,   32.2964,   33.8875,   37.3346},
    {    61.5139,   54.8610,   37.3158,   33.0038,   31.9198,   32.0345,   38.9761},
    {    58.0532,   58.9491,   37.3353,   33.2999,   31.7859,   31.4686,   39.6902},
    {    52.8956,   62.8790,   37.9547,   33.0588,   32.1084,   31.3200,   40.1370},
    {    48.8235,   63.7877,   39.7340,   32.6458,   32.6387,   30.4839,   41.1087},
    {    46.2202,   62.0585,   41.9298,   32.7420,   32.8570,   30.4983,   41.8151}
  },
  {
    {    38.8646,   30.3341,   31.4750,   66.9477,   32.9035,   33.8963,   31.0704},
    {    71.6092,   21.4119,   32.4296,   42.5069,   39.1754,   33.3690,   31.1156},
    {   100.2714,   23.4443,   31.7748,   35.1396,   39.0865,   33.6010,   31.4654},
    {    74.9440,   63.2384,   24.4159,   31.8637,   38.2999,   33.8869,   31.7937},
    {    31.9085,   98.0919,   26.1331,   29.2549,   37.1879,   34.6302,   31.6455},
```

-continued

| Listing 3: Scaled floating-point matrix coefficients after addition of constant offset | | | | | | |
|---|---|---|---|---|---|---|
| { 22.0903, | 77.4769, | 55.4791, | 28.7761, | 36.2699, | 34.6983, | 31.4417}, |
| { 31.0716, | 36.5146, | 90.0740, | 30.7191, | 34.5053, | 34.9342, | 31.7696}, |
| { 35.2580, | 21.8394, | 99.8966, | 32.5899, | 32.9317, | 35.5087, | 32.7768}, |
| { 47.2594, | 28.9576, | 32.0391, | 73.5908, | 53.6255, | 31.8205, | 30.8412}, |
| { 70.9361, | 23.8239, | 32.0509, | 60.4548, | 49.6429, | 35.6090, | 29.8913}, |
| { 86.3763, | 30.6987, | 29.9403, | 45.5399, | 48.1834, | 37.4220, | 29.7558}, |
| { 64.9243, | 62.8093, | 25.3040, | 34.2709, | 46.2608, | 38.7737, | 30.0976}, |
| { 33.3671, | 85.0181, | 31.9039, | 28.0583, | 42.8152, | 40.4874, | 29.9231}, |
| { 26.4986, | 64.3591, | 59.8095, | 26.9915, | 39.1275, | 41.2110, | 30.1316}, |
| { 33.2894, | 32.9070, | 87.0510, | 29.2965, | 35.4604, | 41.3705, | 30.9115}, |
| { 36.9229, | 22.7365, | 93.4719, | 31.6635, | 33.3262, | 41.2615, | 32.4514}, |
| { 41.0435, | 31.8138, | 32.3850, | 44.8748, | 83.9317, | 32.2663, | 31.6086}, |
| { 54.9275, | 30.5825, | 32.2594, | 50.2505, | 69.5476, | 39.9726, | 29.6667}, |
| { 62.4130, | 37.1828, | 31.0354, | 44.9764, | 61.2676, | 44.6022, | 28.8079}, |
| { 52.9044, | 54.5758, | 30.8032, | 35.7430, | 54.8484, | 47.8584, | 28.6467}, |
| { 37.9865, | 62.9774, | 39.9171, | 28.9491, | 48.4339, | 50.3145, | 28.4825}, |
| { 34.1489, | 48.8304, | 60.4050, | 26.5421, | 42.6650, | 50.9932, | 29.1759}, |
| { 37.5773, | 30.1498, | 78.4870, | 27.5535, | 38.2252, | 49.6308, | 31.1039}, |
| { 39.5997, | 24.4265, | 82.7436, | 29.5397, | 35.5426, | 48.0176, | 33.4502}, |
| { 34.9367, | 33.4835, | 32.7005, | 28.7604, | 74.8950, | 57.5705, | 29.1114}, |
| { 38.6477, | 35.3123, | 32.8002, | 34.4893, | 67.6885, | 59.0074, | 29.0027}, |
| { 40.7410, | 39.3787, | 33.5083, | 35.5124, | 60.5847, | 61.5749, | 28.5151}, |
| { 41.1714, | 43.4589, | 36.7740, | 33.0302, | 53.9031, | 63.7992, | 28.4262}, |
| { 41.1188, | 42.5185, | 44.5519, | 29.6520, | 48.2529, | 64.7670, | 28.6513}, |
| { 41.6837, | 35.9736, | 55.7554, | 27.3899, | 44.0897, | 63.2089, | 30.0825}, |
| { 42.2571, | 29.5924, | 64.8776, | 26.6676, | 40.6368, | 59.9612, | 32.6868}, |
| { 42.4814, | 27.5729, | 68.0751, | 28.1595, | 37.4389, | 56.4319, | 35.7978}, |
| { 32.9026, | 33.5953, | 33.0444, | 30.9932, | 41.5116, | 88.1456, | 29.9841}, |
| { 31.1691, | 35.8726, | 33.5271, | 31.2551, | 44.1019, | 83.6915, | 30.9104}, |
| { 31.0544, | 37.1751, | 35.2411, | 32.0386, | 42.5190, | 82.9106, | 30.6508}, |
| { 34.8100, | 35.1232, | 39.0422, | 32.2570, | 40.3904, | 82.1727, | 30.7090}, |
| { 40.4326, | 31.6341, | 43.8272, | 31.4511, | 38.4136, | 80.9939, | 31.1131}, |
| { 43.9027, | 29.6536, | 48.2221, | 29.6476, | 37.4634, | 77.5492, | 32.9024}, |
| { 44.3106, | 29.8847, | 51.6727, | 28.3921, | 36.6024, | 72.1892, | 35.9150}, |
| { 43.4423, | 29.8961, | 54.6505, | 28.7459, | 35.4980, | 65.6922, | 39.6330}, |
| { 31.9483, | 33.2204, | 33.3728, | 33.6526, | 25.1214, | 84.9645, | 47.7268}, |
| { 30.1887, | 34.2331, | 34.0962, | 33.3871, | 25.3764, | 88.1868, | 43.7427}, |
| { 29.8997, | 34.1717, | 35.5600, | 33.6018, | 24.7417, | 90.3211, | 41.0484}, |
| { 33.0197, | 31.6277, | 38.0520, | 34.0548, | 24.9745, | 89.6985, | 40.1318}, |
| { 38.0611, | 28.5841, | 40.5039, | 33.7548, | 25.7969, | 87.8559, | 40.2345}, |
| { 41.6193, | 28.7071, | 41.3820, | 32.5066, | 26.7863, | 84.9791, | 41.1704}, |
| { 42.8752, | 30.1149, | 42.4534, | 31.0779, | 28.2299, | 79.5806, | 43.3129}, |
| { 42.2445, | 30.5251, | 45.4551, | 30.6435, | 29.9559, | 71.5195, | 46.6535}, |
| { 31.6787, | 32.5970, | 33.3503, | 33.0376, | 25.8619, | 54.0871, | 78.6363}, |
| { 31.4599, | 32.1507, | 34.3650, | 34.7754, | 20.3026, | 68.1090, | 68.4719}, |
| { 31.8175, | 31.7931, | 35.1409, | 35.7090, | 17.3430, | 76.0697, | 62.3252}, |
| { 33.6994, | 30.5043, | 36.0423, | 36.3843, | 16.6750, | 79.2058, | 59.0747}, |
| { 36.7107, | 29.1365, | 36.8183, | 36.2275, | 18.1980, | 78.3893, | 58.2431}, |
| { 39.3048, | 29.2519, | 36.7720, | 35.2587, | 20.0116, | 77.2567, | 57.6073}, |
| { 40.5760, | 30.2150, | 37.1389, | 33.8335, | 22.3972, | 73.8765, | 57.8233}, |
| { 40.2563, | 30.5713, | 39.7055, | 32.4565, | 25.6137, | 68.0204, | 58.7572}, |
| { 32.9341, | 31.1875, | 33.7173, | 32.7108, | 29.3334, | 31.0550, | 98.0262}, |
| { 33.8227, | 30.3910, | 34.2481, | 34.7477, | 23.0735, | 45.4316, | 88.4468}, |
| { 34.4081, | 30.5277, | 34.2442, | 35.7720, | 19.5401, | 54.2578, | 82.1389}, |
| { 35.0798, | 30.5466, | 34.1935, | 36.3126, | 18.2611, | 59.1467, | 77.9521}, |
| { 36.0522, | 30.7927, | 34.0841, | 36.6756, | 18.5392, | 60.3912, | 76.1104}, |
| { 37.9317, | 30.3636, | 34.4376, | 36.3902, | 19.5705, | 61.0989, | 74.1629}, |
| { 38.8306, | 30.5850, | 35.1266, | 35.1214, | 21.7335, | 60.2556, | 72.5729}, |
| { 38.7026, | 30.8376, | 36.9840, | 34.0960, | 23.7070, | 59.0283, | 70.5133} |
| }, | | | | | | |
| { | | | | | | |
| { 39.2231, | 33.6521, | 32.6622, | 57.8871, | 44.1068, | 30.6387, | 31.5474}, |
| { 59.9975, | 38.1628, | 31.5715, | 40.3385, | 50.8402, | 30.1782, | 31.2921}, |
| { 73.1031, | 49.2010, | 30.5474, | 39.1032, | 48.4545, | 31.6431, | 31.3690}, |
| { 60.0046, | 72.7565, | 29.5519, | 38.9501, | 45.9963, | 32.7072, | 31.5420}, |
| { 42.5348, | 87.0553, | 35.4208, | 37.7101, | 45.1141, | 32.7907, | 31.8666}, |
| { 34.5030, | 77.5030, | 54.3154, | 35.6732, | 44.9492, | 32.8433, | 31.8736}, |
| { 33.1866, | 46.9397, | 85.5783, | 34.5583, | 44.3168, | 33.1068, | 32.0501}, |
| { 30.9226, | 16.6177, | 114.3069, | 33.5897, | 44.2404, | 33.6637, | 33.2651}, |
| { 43.4614, | 36.5027, | 32.3579, | 52.5267, | 69.5634, | 29.7303, | 30.9028}, |
| { 52.6664, | 49.7441, | 30.3307, | 41.6579, | 71.9610, | 31.3400, | 30.1259}, |
| { 52.4229, | 66.3328, | 30.2251, | 38.6709, | 70.1725, | 32.3343, | 30.2453}, |
| { 46.3696, | 77.5821, | 35.1150, | 37.3386, | 68.0673, | 33.8227, | 30.1078}, |
| { 43.1597, | 75.3899, | 47.6880, | 36.9291, | 66.4168, | 34.4763, | 30.1712}, |
| { 39.5073, | 61.8688, | 68.0300, | 35.3838, | 64.7324, | 35.3511, | 30.3213}, |
| { 33.1252, | 37.3091, | 96.5311, | 33.3007, | 61.9587, | 36.7446, | 30.8522}, |
| { 25.7357, | 13.5093, | 122.0846, | 31.8387, | 58.8349, | 38.0196, | 32.6040}, |

-continued

| Listing 3: Scaled floating-point matrix coefficients after addition of constant offset |

```
{
  {     40.4223,    39.2646,    32.6638,    33.9894,    87.3283,    36.8060,    30.0397},
  {     44.9383,    54.3251,    31.9606,    34.2388,    83.5756,    40.5805,    28.8303},
  {     40.5162,    69.5355,    34.5877,    33.1759,    83.0982,    39.9298,    29.2825},
  {     37.2062,    73.3964,    43.6602,    31.8863,    82.4806,    39.8581,    29.5517},
  {     37.2574,    64.5941,    59.7309,    31.4265,    81.0366,    41.0506,    29.3113},
  {     35.4314,    48.0017,    81.6632,    30.1754,    79.1171,    42.7790,    29.2251},
  {     27.9783,    26.7976,   108.0044,    27.9283,    75.5359,    44.8453,    29.8879},
  {     18.7591,    11.4410,   127.5000,    27.0252,    69.7050,    46.3191,    32.4758},
  {     37.8307,    39.8890,    33.5881,    27.3466,    73.1366,    62.0520,    27.9869},
  {     38.7091,    53.9539,    35.1788,    29.9153,    72.7303,    61.6201,    27.9873},
  {     33.3993,    65.3342,    41.0013,    29.2740,    74.6357,    59.3380,    28.4698},
  {     29.6810,    65.1250,    53.4607,    27.2693,    76.4430,    58.1825,    28.7396},
  {     28.8408,    53.3877,    72.2080,    25.8897,    77.4332,    58.3952,    28.6129},
  {     26.5057,    35.2025,    95.1085,    24.1580,    76.9942,    59.9108,    28.4348},
  {     18.9133,    19.1294,   117.4607,    22.8285,    73.5610,    61.2335,    29.7416},
  {      8.7268,    15.7045,   127.5000,    23.0559,    67.7045,    60.3311,    33.9390},
  {     35.2531,    40.2110,    34.6337,    28.8260,    44.4356,    88.9320,    29.7966},
  {     33.1922,    51.2552,    39.0577,    28.9677,    49.1274,    86.0566,    30.2058},
  {     27.8384,    57.1113,    49.0029,    27.8413,    53.1738,    83.3857,    30.4657},
  {     23.8114,    52.3568,    65.2167,    26.0436,    56.1463,    82.0807,    30.4052},
  {     21.6757,    38.6824,    85.8956,    24.1073,    58.2344,    81.6560,    30.3283},
  {     17.8776,    22.4550,   107.7989,    22.8651,    59.0487,    81.6867,    30.6804},
  {      9.9896,    12.9138,   125.2125,    21.9405,    57.9328,    80.0039,    33.3884},
  {      0.1692,    18.5205,   127.5000,    21.7393,    56.1776,    74.0152,    39.6636},
  {     32.7048,    40.2666,    35.7402,    30.6316,    27.6266,    89.7698,    45.3230},
  {     28.9078,    46.2249,    44.1499,    29.4820,    30.5907,    91.9045,    43.3266},
  {     24.0676,    45.3679,    58.3140,    27.9548,    34.0446,    90.9460,    43.0428},
  {     18.9483,    36.7211,    77.6578,    26.0680,    36.5476,    90.7871,    42.5548},
  {     15.4911,    22.3853,    99.3910,    24.6643,    38.0904,    90.9578,    42.4931},
  {     10.8860,    10.6997,   118.4657,    24.0419,    39.2364,    89.5524,    43.7995},
  {      2.2685,    11.4334,   127.5000,    23.3574,    40.8839,    84.7476,    47.7840},
  {     -0.5000,    16.5327,   127.5000,    23.1330,    42.9281,    75.3388,    54.8943},
  {     30.9015,    36.8800,    38.7502,    29.9300,    28.2564,    53.7382,    81.5051},
  {     26.5453,    36.6000,    51.5364,    28.3042,    29.8071,    57.5332,    79.1530},
  {     21.5231,    29.6252,    69.6589,    26.8812,    32.1064,    57.7724,    78.9440},
  {     15.3641,    18.6695,    90.9048,    25.6123,    33.3104,    58.3451,    78.7730},
  {      9.8786,     7.6741,   110.8750,    24.9459,    34.2483,    58.4805,    79.1171},
  {      4.7161,     2.0049,   125.4069,    24.8643,    35.3735,    57.2438,    80.3791},
  {     -0.5000,     9.1308,   127.5000,    25.3335,    36.4661,    53.4660,    83.7115},
  {     -0.5000,    13.2069,   127.5000,    25.1600,    38.6403,    47.4390,    87.7979},
  {     27.7654,    29.4007,    46.1852,    28.4294,    38.7665,     2.4616,   122.8329},
  {     23.7125,    23.8672,    62.0511,    26.6237,    40.8731,     1.3534,   124.5840},
  {     19.1486,    14.1364,    81.3929,    25.1968,    42.9841,    -0.5000,   126.4879},
  {     13.0130,     4.2453,   100.8451,    24.2134,    43.7679,    -0.5000,   127.2279},
  {      5.6770,    -0.5000,   116.1213,    23.4064,    44.6097,    -0.1032,   127.5000},
  {     -0.2993,    -0.5000,   125.9349,    23.2219,    44.7449,     0.9347,   127.5000},
  {     -0.5000,     4.3980,   127.5000,    24.6559,    43.5031,     2.2756,   127.5000},
  {     -0.5000,     8.7846,   127.5000,    24.7044,    44.0271,     2.7743,   126.7211}
},
{
  {     29.8032,    32.1004,    32.3539,    41.6795,    34.0421,    31.9783,    31.5838},
  {     62.8083,    25.6230,    33.5704,    15.6346,    37.6035,    32.2125,    31.9593},
  {     97.7716,    26.1190,    34.1869,    25.4275,    33.8738,    32.9620,    32.1799},
  {     75.4257,    61.2011,    29.5963,    31.4379,    32.4551,    32.6731,    31.9736},
  {     35.8771,    93.8574,    31.5202,    30.2264,    33.2524,    32.0224,    31.9514},
  {     25.5240,    76.2899,    57.9337,    29.7581,    33.1767,    32.2744,    31.7037},
  {     29.8828,    39.3534,    91.2359,    30.9692,    32.3909,    32.6508,    31.4005},
  {     32.4450,    22.7120,   104.9380,    31.6896,    32.4018,    32.4847,    31.6281},
  {     34.2814,    30.3405,    32.8303,    31.3141,    51.5244,    29.4414,    31.6138},
  {     66.3654,    24.2251,    33.9707,    11.4832,    41.0606,    32.8009,    31.8531},
  {     97.0807,    27.8406,    34.2231,    23.5277,    33.7042,    33.3953,    32.1739},
  {     71.0497,    65.0103,    30.2070,    30.4498,    32.3134,    32.7217,    31.9030},
  {     33.8389,    92.2716,    35.3243,    29.8131,    33.2780,    31.7610,    31.8179},
  {     25.8502,    70.4472,    63.6912,    29.2434,    33.8566,    31.7830,    31.5603},
  {     29.8811,    36.7236,    94.0509,    30.4903,    33.0148,    32.3797,    31.2508},
  {     32.1347,    22.9216,   105.3996,    31.3708,    32.9652,    32.5414,    31.3497},
  {     36.7708,    29.2630,    33.2941,     8.3372,    79.3152,    26.9736,    31.9706},
  {     71.2687,    22.2003,    34.7602,     4.8493,    49.7942,    31.8237,    32.1694},
  {     97.5841,    29.0223,    34.3034,    23.2395,    33.8612,    33.5447,    32.2400},
  {     66.1170,    69.8482,    29.8225,    30.7248,    31.4872,    33.1031,    31.8609},
  {     31.0836,    92.0564,    37.8834,    29.7927,    33.0857,    32.0164,    31.5762},
  {     25.5862,    65.8230,    68.3992,    28.8884,    34.0940,    32.1533,    31.1239},
  {     29.6889,    34.1094,    96.7004,    29.7900,    33.6063,    32.6443,    30.8582},
  {     31.4152,    22.3843,   106.2972,    30.4331,    33.6813,    32.8859,    31.0863},
  {     39.8787,    28.0957,    33.7941,    -0.5000,    76.4050,    46.3345,    28.3798},
  {     75.7351,    21.1363,    35.0533,    -0.5000,    54.6803,    35.3384,    31.8523},
  {     96.7761,    31.6765,    33.6208,    21.2681,    36.6278,    32.5176,    32.7420},
```

-continued

| Listing 3: Scaled floating-point matrix coefficients after addition of constant offset |

```
{
{     60.9305,    74.8045,    29.2155,    29.8695,    32.4949,    32.0490,    32.1838},
{     28.6162,    91.7220,    40.3165,    29.3051,    33.4929,    31.8412,    31.5205},
{     25.6011,    61.7090,    72.6031,    28.8843,    34.1935,    32.4775,    30.7598},
{     29.3516,    32.3422,    98.7576,    29.5555,    33.9258,    33.1016,    30.3652},
{     31.1080,    22.1691,   106.8418,    29.8475,    34.0204,    33.4059,    30.6493},
{     41.7109,    27.4805,    33.8195,     0.8303,    47.5293,    79.0198,    25.3720},
{     79.9818,    20.1399,    35.0985,    -0.5000,    48.0153,    46.5102,    30.9800},
{     94.1537,    35.9467,    32.1776,    17.4257,    39.9555,    32.6646,    32.9922},
{     55.3605,    79.6388,    28.7659,    27.1327,    35.1400,    31.1721,    32.2338},
{     26.6393,    90.2929,    43.1657,    28.2811,    34.3081,    31.8584,    31.3099},
{     25.8556,    57.7057,    76.4352,    29.1637,    33.4608,    33.3185,    30.2932},
{     29.3037,    30.4295,   100.6630,    28.9449,    33.9216,    33.5626,    30.1587},
{     31.0800,    21.4741,   107.5171,    28.6765,    34.6622,    33.6389,    30.4682},
{     44.0845,    26.4933,    33.9410,     5.8293,    29.9034,    80.3245,    40.3376},
{     80.9796,    21.1265,    34.7302,    -0.5000,    40.9775,    52.0573,    35.3764},
{     90.0615,    40.5364,    31.1529,    14.1162,    40.5807,    35.1917,    33.0706},
{     51.2536,    82.1695,    29.2897,    23.7134,    37.0188,    31.8479,    31.9369},
{     26.5544,    86.9012,    46.5223,    27.3003,    34.7330,    32.2451,    30.9295},
{     26.3727,    54.2465,    79.4731,    28.8370,    33.5506,    33.3308,    30.1721},
{     29.2076,    29.4796,   101.6753,    28.4649,    34.2330,    33.1185,    30.4536},
{     30.8628,    21.1157,   107.7413,    27.8272,    35.1478,    33.1778,    31.0564},
{     46.6339,    26.2107,    33.7655,     7.4484,    34.1268,    43.6030,    74.9439},
{     79.8380,    23.7064,    34.1026,    -0.5000,    40.5584,    40.8713,    50.2714},
{     84.0516,    45.0640,    30.9818,    12.4925,    39.9191,    35.8212,    35.8259},
{     48.7877,    81.2898,    31.4410,    21.7291,    37.3317,    33.3157,    31.9917},
{     28.3211,    80.9924,    50.8324,    26.3895,    35.2473,    32.7488,    30.8014},
{     27.6089,    51.2415,    81.4891,    28.2663,    34.4999,    32.9890,    30.3012},
{     29.2596,    29.9202,   101.1070,    28.4800,    34.6523,    32.5972,    30.7642},
{     30.6098,    21.6099,   107.1581,    27.8641,    35.1951,    32.6675,    31.6501},
{     48.0078,    27.4519,    34.0473,    10.1748,    40.3076,    15.7991,    96.7683},
{     75.3413,    27.3482,    34.4209,     2.5306,    41.7061,    26.3902,    65.8388},
{     76.6773,    47.2238,    32.8782,    11.8229,    39.8001,    32.1519,    42.9830},
{     48.9099,    74.7876,    36.4514,    20.6018,    37.4606,    32.9422,    34.7890},
{     32.1893,    72.4223,    55.2961,    25.2464,    35.7160,    32.7881,    32.2791},
{     29.5129,    48.9335,    81.4412,    27.2544,    35.2718,    32.7296,    31.4272},
{     29.7233,    31.5672,    98.3614,    27.9260,    35.0356,    32.2312,    31.8236},
{     30.7465,    23.7156,   104.3398,    27.8830,    35.0198,    32.4261,    32.6098}
},
{
{     36.3992,    29.1137,    33.3756,    42.9790,    46.6687,    29.4717,    31.2525},
{     74.0734,    19.9597,    35.1172,    18.6488,    46.9186,    34.3791,    31.8579},
{     91.7700,    35.2177,    31.8150,    29.3205,    31.0762,    39.9372,    33.8287},
{     53.3014,    80.4983,    26.4459,    33.4275,    27.6236,    35.9624,    36.6333},
{     23.8282,    91.0305,    40.7863,    31.1867,    30.6278,    31.1095,    37.5548},
{     25.2463,    57.3760,    74.4606,    30.9423,    31.8383,    29.5192,    36.8854},
{     31.7761,    27.8739,    99.2251,    31.8097,    32.2405,    28.9166,    36.1694},
{     34.3559,    19.5144,   105.1449,    32.5967,    31.7979,    29.5897,    35.4734},
{     50.0141,    25.6389,    34.1102,    33.3718,    74.0533,    29.9462,    31.0798},
{     74.5357,    27.9954,    33.0560,    22.5721,    45.7635,    47.1392,    32.8939},
{     64.1643,    58.3939,    29.0472,    30.1240,    25.7257,    45.5495,    39.8794},
{     30.7284,    84.5390,    36.5024,    31.0476,    27.4099,    33.4402,    43.5968},
{     22.1726,    66.7546,    64.1592,    30.1833,    31.4558,    27.6126,    42.2420},
{     29.3521,    34.8667,    92.5219,    31.3902,    32.2461,    26.9309,    39.6370},
{     33.1471,    20.2203,   105.2232,    32.1732,    32.5947,    27.3875,    37.4453},
{     34.0566,    18.9389,   105.8663,    32.5396,    32.2608,    28.8902,    35.7688},
{     51.0351,    28.8288,    33.2033,    24.9280,    72.3920,    50.5828,    29.7272},
{     60.5357,    42.3809,    30.9778,    30.2876,    31.4548,    60.4182,    39.1312},
{     39.5923,    70.4767,    33.5122,    31.8369,    24.1377,    40.7755,    50.3465},
{     22.1631,    71.5229,    53.9090,    29.8442,    30.5215,    27.0718,    49.7558},
{     25.1008,    44.3176,    83.4903,    30.3471,    32.9085,    24.8688,    44.2387},
{     31.5287,    23.4784,   101.8254,    31.6561,    32.8313,    26.1258,    39.9327},
{     33.7654,    17.6400,   107.3766,    32.1731,    32.5904,    27.8436,    36.8686},
{     34.0363,    19.4155,   105.4426,    32.6668,    32.0092,    29.6830,    35.1812},
{     44.9268,    35.2874,    31.6712,    30.4519,    39.0809,    79.4322,    33.1160},
{     42.9703,    52.7790,    32.5182,    34.7064,    23.5853,    53.4856,    55.2641},
{     26.6750,    67.3395,    45.3302,    31.9913,    29.1934,    27.1109,    60.9791},
{     22.4802,    53.3915,    71.8047,    30.1645,    33.4065,    22.2981,    51.7523},
{     28.2053,    30.6760,    95.2617,    30.8556,    33.2036,    25.0281,    43.0315},
{     32.2506,    19.8434,   105.3276,    31.8537,    32.5143,    27.3488,    38.4788},
{     33.7752,    17.8500,   107.4289,    32.4550,    31.7227,    29.4675,    35.5965},
{     33.7869,    20.0497,   104.8235,    33.1992,    31.0524,    31.0540,    34.5178},
{     38.1554,    40.2525,    31.5486,    34.5789,    22.6840,    72.3021,    54.0250},
{     31.2864,    54.8565,    39.0160,    33.8025,    28.7415,    31.5371,    73.1693},
{     22.4856,    57.0093,    59.9960,    31.0036,    34.6349,    18.1227,    64.2822},
{     25.0862,    39.1070,    85.6349,    30.9759,    34.5536,    22.2020,    49.0979},
{     30.3438,    24.3271,   101.0725,    31.7318,    32.7098,    27.1091,    40.1740},
{     32.5222,    19.3552,   106.2619,    32.3510,    31.6056,    29.5973,    36.2383},
```

Listing 3: Scaled floating-point matrix coefficients after addition of constant offset

| | | | | | | |
|---|---|---|---|---|---|---|
| { | 33.9068, | 18.3859, | 106.9225, | 32.8757, | 31.0846, | 30.6897, | 34.6402 }, |
| { | 33.8449, | 20.4930, | 104.0439, | 33.2627, | 30.9361, | 31.5115, | 34.3445 }, |
| { | 32.6747, | 41.9051, | 34.5723, | 34.0933, | 28.1855, | 39.3142, | 81.6326 }, |
| { | 25.6961, | 50.8722, | 49.5442, | 32.8416, | 34.2470, | 18.0360, | 79.5059 }, |
| { | 22.6329, | 45.8640, | 73.6003, | 31.3404, | 35.4237, | 19.5439, | 59.1851 }, |
| { | 26.7308, | 31.5983, | 93.4788, | 31.6675, | 33.7525, | 25.5898, | 44.4381 }, |
| { | 31.1691, | 22.4392, | 103.2037, | 32.4406, | 31.8594, | 29.6003, | 37.3846 }, |
| { | 33.1774, | 19.4029, | 106.2427, | 32.5454, | 31.0427, | 31.1910, | 34.7865 }, |
| { | 34.3394, | 19.1598, | 106.0450, | 32.9913, | 30.6369, | 31.8003, | 33.8414 }, |
| { | 34.5514, | 20.9338, | 103.1317, | 33.7143, | 30.6511, | 32.1516, | 33.9859 }, |
| { | 28.9576, | 40.7984, | 41.4845, | 33.0754, | 33.8494, | 20.2766, | 92.4975 }, |
| { | 24.2439, | 44.2083, | 61.5832, | 33.7914, | 34.8136, | 18.4549, | 73.4928 }, |
| { | 24.4839, | 37.4141, | 83.4148, | 33.6756, | 33.2304, | 25.2367, | 51.5256 }, |
| { | 28.1813, | 28.3162, | 96.8995, | 33.1065, | 31.9232, | 29.8684, | 40.0847 }, |
| { | 31.7419, | 22.7297, | 103.0097, | 33.1932, | 30.9851, | 31.5492, | 35.6212 }, |
| { | 34.0548, | 20.0515, | 105.0784, | 33.5395, | 30.1865, | 32.5226, | 33.8823 }, |
| { | 35.0721, | 20.1564, | 104.3541, | 33.8872, | 30.1362, | 32.6097, | 33.3659 }, |
| { | 34.8938, | 21.8023, | 101.5692, | 34.3303, | 30.3907, | 32.5340, | 33.9303 }, |
| { | 27.3754, | 37.5364, | 51.1667, | 33.6692, | 34.4751, | 20.0104, | 85.7583 }, |
| { | 25.7098, | 37.3155, | 71.0050, | 34.5867, | 33.6265, | 24.2105, | 64.0918 }, |
| { | 27.3348, | 32.7183, | 87.1039, | 34.6197, | 31.8293, | 29.5850, | 46.8597 }, |
| { | 29.9351, | 27.9274, | 95.6750, | 34.4420, | 30.5070, | 31.9281, | 39.1889 }, |
| { | 32.4522, | 24.4398, | 99.8569, | 34.5412, | 30.1995, | 32.3273, | 36.0429 }, |
| { | 33.9953, | 22.7360, | 101.4635, | 34.3717, | 30.1466, | 32.7775, | 34.4437 }, |
| { | 34.6607, | 22.7044, | 100.9953, | 34.2845, | 30.3522, | 32.4937, | 34.0685 }, |
| { | 34.2846, | 23.6503, | 98.8560, | 34.8280, | 30.2925, | 32.7211, | 34.4076 } |
| }, | | | | | | |
| { | | | | | | |
| { | 29.7085, | 32.8575, | 31.5881, | 55.4214, | 32.0075, | 32.3279, | 31.6249 }, |
| { | 46.8438, | 30.1348, | 31.4888, | 29.3025, | 35.7405, | 31.6586, | 31.7835 }, |
| { | 80.6589, | 27.5061, | 31.9022, | 27.9232, | 34.3466, | 32.0716, | 31.9010 }, |
| { | 84.7940, | 46.4559, | 28.9059, | 31.7138, | 32.1884, | 32.6554, | 31.8405 }, |
| { | 53.6648, | 81.6851, | 25.7818, | 31.5670, | 31.7855, | 32.9275, | 31.7387 }, |
| { | 29.8289, | 90.3356, | 38.2333, | 30.6928, | 32.3775, | 32.7320, | 31.6897 }, |
| { | 29.9006, | 55.7660, | 73.4794, | 30.9506, | 32.5518, | 32.1983, | 31.6674 }, |
| { | 37.3906, | 20.7296, | 102.1446, | 32.0710, | 32.1434, | 32.2377, | 31.8326 }, |
| { | 33.2199, | 32.2828, | 31.4208, | 68.2818, | 39.0603, | 31.4406, | 31.3047 }, |
| { | 38.4508, | 32.1415, | 30.9750, | 43.1864, | 33.5415, | 32.7783, | 31.3628 }, |
| { | 63.1766, | 29.5388, | 31.2773, | 29.4299, | 33.8213, | 32.2829, | 31.8220 }, |
| { | 82.2681, | 36.5382, | 30.4024, | 29.1616, | 32.9372, | 32.4825, | 31.8595 }, |
| { | 70.5550, | 62.6265, | 27.1868, | 30.5406, | 32.2412, | 32.6853, | 31.6277 }, |
| { | 43.8853, | 85.6175, | 30.4861, | 30.4244, | 32.5176, | 32.5405, | 31.5074 }, |
| { | 32.7183, | 71.7058, | 54.8137, | 30.3302, | 32.4608, | 32.3736, | 31.4367 }, |
| { | 37.0303, | 36.8517, | 86.2845, | 31.3937, | 31.7284, | 32.7596, | 31.3778 }, |
| { | 33.6370, | 32.5091, | 31.5125, | 60.1702, | 60.8304, | 28.6388, | 31.6118 }, |
| { | 35.6653, | 32.5090, | 31.0551, | 55.7741, | 37.5790, | 32.3612, | 31.2717 }, |
| { | 51.0233, | 30.4943, | 31.0471, | 38.1845, | 32.6245, | 33.1132, | 31.5728 }, |
| { | 74.5718, | 31.3343, | 30.9783, | 30.4556, | 32.8146, | 32.9406, | 31.6329 }, |
| { | 79.6790, | 47.1066, | 28.6279, | 30.1528, | 32.4121, | 32.7637, | 31.4895 }, |
| { | 59.5973, | 73.2594, | 27.4969, | 29.9385, | 32.5265, | 32.7750, | 31.3255 }, |
| { | 41.2481, | 78.1206, | 40.7202, | 29.7845, | 32.6003, | 32.4896, | 31.3984 }, |
| { | 38.2865, | 53.3874, | 68.1839, | 30.4170, | 32.1989, | 32.5715, | 31.4999 }, |
| { | 33.4194, | 32.9203, | 31.5560, | 42.9826, | 77.1806, | 35.1602, | 30.4052 }, |
| { | 34.7929, | 32.9856, | 31.0092, | 54.8777, | 54.4356, | 29.4672, | 31.5921 }, |
| { | 43.1286, | 31.8099, | 30.7888, | 46.2364, | 38.6786, | 31.2917, | 31.6878 }, |
| { | 63.9254, | 30.1361, | 30.9269, | 34.9602, | 33.8834, | 32.5526, | 31.5830 }, |
| { | 79.4171, | 37.1936, | 29.7494, | 31.1918, | 32.3438, | 32.7530, | 31.4881 }, |
| { | 72.6443, | 57.4869, | 27.8629, | 30.4950, | 31.9872, | 32.7521, | 31.4323 }, |
| { | 53.9941, | 73.1745, | 33.3335, | 29.9028, | 32.1964, | 32.6138, | 31.4166 }, |
| { | 43.3094, | 64.0875, | 52.3491, | 30.2657, | 32.1393, | 32.8355, | 31.4376 }, |
| { | 33.0682, | 32.9418, | 31.6723, | 34.0861, | 68.2664, | 58.0126, | 27.7058 }, |
| { | 34.0072, | 33.0787, | 31.0267, | 45.1124, | 69.9152, | 32.9455, | 31.0058 }, |
| { | 38.4293, | 32.7925, | 30.5156, | 47.7535, | 51.9948, | 28.8076, | 31.9391 }, |
| { | 54.0239, | 30.6540, | 30.7010, | 40.4427, | 38.7115, | 31.0795, | 31.7541 }, |
| { | 73.0390, | 32.1297, | 30.5304, | 33.8267, | 33.5718, | 32.5697, | 31.4585 }, |
| { | 77.3915, | 45.0066, | 28.9253, | 31.3722, | 32.0838, | 32.4467, | 31.5896 }, |
| { | 65.2522, | 62.8996, | 30.3706, | 30.6389, | 31.4744, | 32.9555, | 31.3501 }, |
| { | 50.9708, | 65.9372, | 42.0505, | 30.3902, | 31.8847, | 33.2462, | 31.3731 }, |
| { | 33.2947, | 32.3319, | 31.7087, | 33.9625, | 43.6324, | 81.3125, | 30.9116 }, |
| { | 33.6586, | 32.9182, | 31.1274, | 38.0536, | 65.5494, | 52.2546, | 28.3841 }, |
| { | 36.2878, | 33.2812, | 30.4358, | 44.4787, | 62.1986, | 33.5152, | 30.7449 }, |
| { | 47.4189, | 31.2669, | 30.6181, | 42.8279, | 47.8103, | 30.2569, | 31.6987 }, |
| { | 64.4749, | 30.6401, | 30.6887, | 37.7346, | 37.5594, | 31.5949, | 31.6122 }, |
| { | 74.6769, | 38.1336, | 29.5615, | 33.1777, | 33.6822, | 32.2566, | 31.6138 }, |
| { | 70.9499, | 52.6489, | 29.8604, | 31.0510, | 32.2175, | 32.7684, | 31.5242 }, |
| { | 58.6130, | 61.1374, | 36.9657, | 30.4548, | 32.1460, | 33.2555, | 31.5704 }, |
| { | 32.9113, | 32.1992, | 31.4101, | 34.8117, | 30.6032, | 71.4528, | 54.0371 }, |

-continued

| Listing 3: Scaled floating-point matrix coefficients after addition of constant offset | | | | | | |
|---|---|---|---|---|---|---|
| { 33.5493, | 32.6479, | 31.1180, | 36.6591, | 48.5787, | 69.6632, | 32.6704}, |
| { 35.7437, | 33.0601, | 30.6161, | 40.9875, | 59.8167, | 48.0244, | 29.5188}, |
| { 43.1728, | 31.9062, | 30.5607, | 42.8249, | 54.0603, | 35.1641, | 30.8774}, |
| { 56.4323, | 30.9188, | 30.6628, | 39.9608, | 44.0064, | 32.0795, | 31.5016}, |
| { 68.0694, | 34.7146, | 30.2628, | 35.5779, | 37.1821, | 32.2152, | 31.6828}, |
| { 70.2516, | 45.1279, | 30.4067, | 32.6058, | 33.6777, | 32.8196, | 31.7138}, |
| { 62.5647, | 54.8097, | 34.7970, | 31.3047, | 32.6431, | 33.3226, | 31.9224}, |
| { 32.7461, | 32.2093, | 31.4954, | 33.3128, | 33.8436, | 36.0590, | 87.0670}, |
| { 34.1940, | 32.1194, | 31.2072, | 36.2692, | 38.0233, | 61.8263, | 52.1576}, |
| { 36.3210, | 32.5895, | 30.9100, | 39.1817, | 49.6076, | 57.3889, | 35.8346}, |
| { 41.3209, | 32.5661, | 30.7430, | 41.3118, | 53.0232, | 43.3201, | 32.7455}, |
| { 50.0146, | 32.8494, | 30.6251, | 40.6052, | 47.7174, | 35.7996, | 32.3177}, |
| { 59.2867, | 35.2097, | 30.7520, | 37.1420, | 41.0826, | 33.6775, | 32.2069}, |
| { 64.5372, | 41.7241, | 31.3857, | 34.5057, | 36.0137, | 33.4774, | 32.3126}, |
| { 62.0346, | 49.1657, | 34.7780, | 32.9841, | 33.5614, | 33.5822, | 32.8266} |
| } | | | | | | |
| } | | | | | | |

Finally, the above matrix coefficients are rounded to integer precision, i.e. the intermediate values are quantized 330 onto the fixed point representation 190. Since the minimum coefficient of the above set is −0.5, the resulting integer coefficients are non-negative and therefore can be represented by unsigned integer numbers. The maximum coefficient of the above matrix set is 127.5. These coefficients would normally be rounded to 128 but are rounded to 127 here introducing the same absolute rounding error. Thus, the resulting integer coefficients shown in Listing 4 are from the unsigned 7-bit range. In addition, since minimum rounded coefficient is 0 and maximum rounded coefficient is 127, the resulting integer coefficients fully exploit this range.

| Listing 4: Unsigned 7-bit integer coefficients | | | | | | |
|---|---|---|---|---|---|---|
| { { | | | | | | |
| { 42, | 37, | 33, | 27, | 44, | 33, | 35}, |
| { 71, | 39, | 34, | 24, | 36, | 35, | 36}, |
| { 77, | 46, | 35, | 33, | 30, | 34, | 36}, |
| { 64, | 60, | 35, | 33, | 31, | 32, | 36}, |
| { 49, | 71, | 38, | 32, | 32, | 31, | 36}, |
| { 42, | 66, | 50, | 33, | 31, | 32, | 36}, |
| { 40, | 52, | 67, | 33, | 31, | 32, | 35}, |
| { 38, | 43, | 75, | 33, | 32, | 32, | 35}, |
| { 56, | 40, | 33, | 26, | 43, | 38, | 36}, |
| { 70, | 49, | 34, | 30, | 28, | 38, | 38}, |
| { 65, | 57, | 36, | 34, | 28, | 33, | 39}, |
| { 59, | 60, | 39, | 33, | 30, | 31, | 38}, |
| { 55, | 60, | 43, | 33, | 30, | 31, | 38}, |
| { 51, | 61, | 47, | 33, | 30, | 32, | 37}, |
| { 46, | 62, | 51, | 34, | 30, | 32, | 37}, |
| { 42, | 60, | 55, | 33, | 31, | 32, | 37}, |
| { 60, | 42, | 34, | 30, | 37, | 43, | 38}, |
| { 68, | 52, | 35, | 35, | 22, | 37, | 40}, |
| { 62, | 58, | 37, | 34, | 28, | 31, | 40}, |
| { 58, | 59, | 41, | 33, | 30, | 30, | 39}, |
| { 56, | 59, | 44, | 34, | 30, | 31, | 38}, |
| { 53, | 60, | 45, | 33, | 30, | 31, | 38}, |
| { 49, | 65, | 45, | 33, | 30, | 31, | 38}, |
| { 45, | 64, | 47, | 33, | 31, | 32, | 38}, |
| { 59, | 44, | 35, | 31, | 34, | 43, | 41}, |
| { 66, | 53, | 36, | 35, | 25, | 31, | 43}, |
| { 61, | 58, | 38, | 34, | 29, | 30, | 40}, |
| { 59, | 57, | 41, | 33, | 30, | 31, | 39}, |
| { 57, | 58, | 43, | 33, | 30, | 31, | 39}, |
| { 54, | 61, | 43, | 33, | 31, | 31, | 39}, |
| { 51, | 64, | 43, | 33, | 31, | 31, | 39}, |
| { 48, | 64, | 45, | 33, | 32, | 31, | 39}, |
| { 57, | 45, | 35, | 30, | 35, | 40, | 44}, |
| { 65, | 54, | 37, | 33, | 33, | 24, | 44}, |

-continued

| Listing 4: Unsigned 7-bit integer coefficients | | | | | | |
|---|---|---|---|---|---|---|
| { 63, | 56, | 38, | 34, | 30, | 29, | 39}, |
| { 61, | 56, | 41, | 34, | 30, | 32, | 39}, |
| { 58, | 58, | 42, | 33, | 31, | 31, | 39}, |
| { 54, | 62, | 41, | 33, | 31, | 31, | 39}, |
| { 51, | 65, | 42, | 33, | 31, | 31, | 39}, |
| { 48, | 63, | 43, | 33, | 32, | 31, | 39}, |
| { 55, | 46, | 35, | 30, | 36, | 38, | 47}, |
| { 65, | 53, | 37, | 32, | 36, | 26, | 40}, |
| { 65, | 54, | 38, | 33, | 31, | 30, | 38}, |
| { 63, | 55, | 39, | 33, | 30, | 32, | 38}, |
| { 59, | 58, | 40, | 33, | 31, | 31, | 39}, |
| { 54, | 64, | 40, | 33, | 31, | 30, | 40}, |
| { 49, | 66, | 40, | 32, | 32, | 30, | 41}, |
| { 48, | 64, | 42, | 32, | 32, | 30, | 41}, |
| { 54, | 46, | 35, | 30, | 34, | 39, | 49}, |
| { 64, | 52, | 36, | 32, | 34, | 34, | 35}, |
| { 65, | 53, | 37, | 33, | 32, | 32, | 37}, |
| { 63, | 55, | 38, | 33, | 31, | 31, | 39}, |
| { 59, | 60, | 38, | 33, | 31, | 31, | 40}, |
| { 54, | 64, | 38, | 33, | 32, | 30, | 40}, |
| { 49, | 66, | 39, | 33, | 32, | 29, | 41}, |
| { 47, | 64, | 42, | 32, | 33, | 29, | 42}, |
| { 51, | 46, | 35, | 31, | 33, | 37, | 54}, |
| { 61, | 51, | 36, | 32, | 33, | 38, | 36}, |
| { 63, | 53, | 37, | 32, | 32, | 34, | 37}, |
| { 62, | 55, | 37, | 33, | 32, | 32, | 39}, |
| { 58, | 59, | 37, | 33, | 32, | 31, | 40}, |
| { 53, | 63, | 38, | 33, | 32, | 31, | 40}, |
| { 49, | 64, | 40, | 33, | 33, | 30, | 41}, |
| { 46, | 62, | 42, | 33, | 33, | 30, | 42} |
| }, | | | | | | |
| { | | | | | | |
| { 39, | 30, | 31, | 67, | 33, | 34, | 31}, |
| { 72, | 21, | 32, | 43, | 39, | 33, | 31}, |
| { 100, | 23, | 32 | 35, | 39, | 34, | 31}, |
| { 75, | 63, | 24, | 32, | 38, | 34, | 32}, |
| { 32, | 98, | 26, | 29, | 37, | 35, | 32}, |
| { 22, | 77, | 55, | 29, | 36, | 35, | 31}, |
| { 31, | 37, | 90, | 31, | 35, | 35, | 32}, |
| { 35, | 22, | 100, | 33, | 33, | 36, | 33}, |
| { 47, | 29, | 32, | 74, | 54, | 32, | 31}, |
| { 71, | 24, | 32, | 60, | 50, | 36, | 30}, |
| { 86, | 31, | 30, | 46, | 48, | 37, | 30}, |
| { 65, | 63, | 25, | 34, | 46, | 39, | 30}, |
| { 33, | 85, | 32, | 28, | 43, | 40, | 30}, |
| { 26, | 64, | 60, | 27, | 39, | 41, | 30}, |
| { 33, | 33, | 87, | 29, | 35, | 41, | 31}, |
| { 37, | 23, | 93, | 32, | 33, | 41, | 32}, |
| { 41, | 32, | 32, | 45, | 84, | 32, | 32}, |
| { 55, | 31, | 32, | 50, | 70, | 40, | 30}, |
| { 62, | 37, | 31, | 45, | 61, | 45, | 29}, |
| { 53, | 55, | 31, | 36, | 55, | 48, | 29}, |
| { 38, | 63, | 40, | 29, | 48, | 50, | 28}, |

Listing 4: Unsigned 7-bit integer coefficients

```
{   34,   49,   60,   27,   43,   51,   29},
{   38,   30,   78,   28,   38,   50,   31},
{   40,   24,   83,   30,   36,   48,   33},
{   35   33,   33,   29,   75,   58,   29},
{   39,   35,   33,   34,   68,   59,   29},
{   41,   39,   34,   36,   61,   62,   29},
{   41,   43,   37,   33,   54,   64,   28},
{   41,   43,   45,   30,   48,   65,   29},
{   42,   36,   56,   27,   44,   63,   30},
{   42,   30,   65,   27,   41,   60,   33},
{   42,   28,   68,   28,   37,   56,   36},
{   33,   34,   33,   31,   42,   88,   30},
{   31,   36,   34,   31,   44,   84,   31},
{   31,   37,   35,   32,   43,   83,   31},
{   35,   35,   39,   32,   40,   82,   31},
{   40,   32,   44,   31,   38,   81,   31},
{   44,   30,   48,   30,   37,   78,   33},
{   44,   30,   52,   28,   37,   72,   36},
{   43,   30,   55,   29,   35,   66,   40},
{   32,   33,   33,   34,   25,   85,   48},
{   30,   34,   34,   33,   25,   88,   44};
{   30,   34,   36,   34,   25,   90,   41},
{   33,   32,   38,   34,   25,   90,   40},
{   38,   29,   41,   34,   26,   88,   40},
{   42,   29,   41,   33,   27,   85,   41},
{   43,   30,   42,   31,   28,   80,   43},
{   42,   31,   45,   31,   30,   72,   47},
{   32,   33,   33,   33,   26,   54,   79},
{   31,   32,   34,   35,   20,   68,   68},
{   32,   32,   35,   36,   17,   76,   62},
{   34,   31,   36,   36,   17,   79,   59},
{   37,   29,   37,   36,   18,   78,   58},
{   39,   29,   37,   35,   20,   77,   58},
{   41,   30,   37,   34,   22,   74,   58},
{   40,   31,   40,   32,   26,   68,   59},
{   33,   31,   34,   33,   29,   31,   98},
{   34,   30,   34,   35,   23,   45,   88},
{   34,   31,   34,   36,   20,   54,   82},
{   35,   31,   34,   36,   18,   59,   78},
{   36,   31,   34,   37,   19,   60,   76},
{   38,   30,   34,   36,   20,   61,   74},
{   39,   31,   35,   35,   22,   60,   73},
{   39,   31,   37,   34,   24,   59,   71}
},
{
{   39,   34,   33,   58,   44,   31,   32},
{   60,   38,   32,   40,   51,   30,   31},
{   73,   49,   31,   39,   48,   32,   31},
{   60,   73,   30,   39,   46,   33,   32},
{   43,   87,   35,   38,   45,   33,   32},
{   35,   78,   54,   36,   45,   33,   32},
{   33,   47,   86,   35,   44,   33,   32},
{   31,   17,  114,   34,   44,   34,   33},
{   43,   37,   32,   53,   70,   30,   31},
{   53,   50,   30,   42,   72,   31,   30},
{   52,   66,   30,   39,   70,   32,   30},
{   46,   78,   35,   37,   68,   34,   30},
{   43,   75,   48,   37,   66,   34,   30},
{   40,   62,   68,   35,   65,   35,   30},
{   33,   37,   97,   33,   62,   37,   31},
{   26,   14,  122,   32,   59,   38,   33},
{   40,   39,   33,   34,   87,   37,   30},
{   45,   54,   32,   34,   84,   41,   29},
{   41,   70,   35,   33,   83,   40,   29},
{   37,   73,   44,   32,   82,   40,   30},
{   37,   65,   60,   31,   81,   41,   29},
{   35,   48,   82,   30,   79,   43,   29},
{   28,   27,  108,   28,   76,   45,   30},
{   19,   11,  127,   27,   70,   46,   32},
{   38,   40,   34,   27,   73,   62,   28},
{   39,   54,   35,   30,   73,   62,   28},
{   33,   65,   41,   29,   75,   59,   28},
{   30,   65,   53,   27,   76,   58,   29},
{   29,   53,   72,   26,   77,   58,   29},
{   27,   35,   95,   24,   77,   60,   28},
{   19,   19,  117,   23,   74,   61,   30},
{    9,   16,  127,   23,   68,   60,   34},
```

Listing 4: Unsigned 7-bit integer coefficients

```
{   35,   40,   35,   29,   44,   89,   30},
{   33,   51,   39,   29,   49,   86,   30},
{   28,   57,   49,   28,   53,   83,   30},
{   24,   52,   65,   26,   56,   82,   30},
{   22,   39,   86,   24,   58,   82,   30},
{   18,   22,  108,   23,   59,   82,   31},
{   10,   13,  125,   22,   58,   80,   33},
{    0,   19,  127,   22,   56,   74,   40},
{   33,   40,   36,   31,   28,   90,   45},
{   29,   46,   44,   29,   31,   92,   43},
{   24,   45,   58,   28,   34,   91,   43},
{   19,   37,   78,   26,   37,   91,   43},
{   15,   22,   99,   25,   38,   91,   42},
{   11,   11,  118,   24,   39,   90,   44},
{    2,   11,  127,   23,   41,   85,   48},
{    0,   17,  127,   23,   43,   75,   55},
{   31,   37,   39,   30,   28,   54,   82},
{   27,   37,   52,   28,   30,   58,   79},
{   22,   30,   70,   27,   32,   58,   79},
{   15,   19,   91,   26,   33,   58,   79},
{   10,    8,  111,   25,   34,   58,   79},
{    5,    2,  125,   25,   35,   57,   80},
{    0,    9,  127,   25,   36,   53,   84},
{    0,   13,  127,   25,   39,   47,   88},
{   28,   29,   46,   28,   39,    2,  123},
{   24,   24,   62,   27,   41,    1,  125},
{   19,   14,   81,   25,   43,    0,  126},
{   13,    4,  101,   24,   44,    0,  127},
{    6,    0,  116,   23,   45,    0,  127},
{    0,    0,  126,   23,   45,    1,  127},
{    0,    4,  127,   25,   44,    2,  127},
{    0,    9,  127,   25,   44,    3,  127}
},
{
{   30,   32,   32,   42,   34,   32,   32},
{   63,   26,   34,   16,   38,   32,   32},
{   98,   26,   34,   25,   34,   33,   32},
{   75,   61,   30,   31,   32,   33,   32},
{   36,   94,   32,   30,   33,   32,   32},
{   26,   76,   58,   30,   33,   32,   32},
{   30,   39,   91,   31,   32,   33,   31},
{   32,   23,  105,   32,   32,   32    32},
{   34,   30,   33,   31,   52,   29,   32},
{   66,   24,   34,   11,   41,   33,   32},
{   97,   28,   34,   24,   34,   33,   32},
{   71,   65,   30,   30,   32,   33,   32},
{   34,   92,   35,   30,   33,   32,   32},
{   26,   70,   64,   29,   34,   32,   32},
{   30,   37,   94,   30,   33,   32,   31},
{   32,   23,  105,   31,   33,   33,   31},
{   37,   29,   33,    8,   79,   27,   32},
{   71,   22,   35,    5,   50,   32,   32},
{   98,   29,   34,   23,   34,   34,   32},
{   66,   70,   30,   31,   31,   33,   32},
{   31,   92,   38,   30,   33,   32,   32},
{   26,   66,   68,   29,   34,   32,   31},
{   30,   34,   97,   30,   34,   33,   31},
{   31,   22,  106,   30,   34,   33,   31},
{   40,   28,   34,    0,   76,   46,   28},
{   76,   21,   35,    0,   55,   35,   32},
{   97,   32,   34,   21,   37,   33,   33},
{   61,   75,   29,   30,   32,   32,   32},
{   29,   92,   40,   29,   33,   32,   32},
{   26,   62,   73,   29,   34,   32,   31},
{   29,   32,   99,   30,   34,   33,   30},
{   31,   22,  107,   30,   34,   33,   31},
{   42,   27,   34,    1,   48,   79,   25},
{   80,   20,   35,    0,   48,   47,   31},
{   94,   36,   32,   17,   40,   33,   33},
{   55,   80,   29,   27,   35,   31,   32},
{   27,   90,   43,   28,   34,   32,   31},
{   26,   58,   76,   29,   33,   33,   30},
{   29,   30,  101,   29,   34,   34,   30},
{   31,   21,  108,   29,   35,   34,   30},
{   44,   26,   34,    6,   30,   80,   40},
{   81,   21,   35,    0,   41,   52,   35},
{   90,   41,   31,   14,   41,   35,   33},
```

Listing 4: Unsigned 7-bit integer coefficients

```
{      51,    82,    29,    24,    37,    32,    32},
{      27,    87,    47,    27,    35,    32,    31},      5
{      26,    54,    79,    29,    34,    33,    30},
{      29,    29,   102,    28,    34,    33,    30},
{      31,    21,   108,    28,    35,    33,    31},
{      47,    26,    34,     7,    34,    44,    75},
{      80,    24,    34,     0,    41,    41,    50},
{      84,    45,    31,    12,    40,    36,    36},     10
{      49,    81,    31,    22,    37,    33,    32},
{      28,    81,    51,    26,    35,    33,    31},
{      28,    51,    81,    28,    34,    33,    30},
{      29,    30,   101,    28,    35,    33,    31},
{      31,    22,   107,    28,    35,    33,    32},
{      48,    27,    34,    10,    40,    16,    97},     15
{      75,    27,    34,     3,    42,    26,    66},
{      77,    47,    33,    12,    40,    32,    43},
{      49,    75,    36,    21,    37,    33,    35},
{      32,    72,    55,    25,    36,    33,    32},
{      30,    49,    81,    27,    35,    33,    31},
{      30,    32,    98,    28,    35,    32,    32},     20
{      31,    24,   104,    28,    35,    32,    33}
},
{
{      36,    29,    33,    43,    47,    29,    31},
{      74,    20,    35,    19,    47,    34,    32},
{      92,    35,    32,    29,    31,    40,    34},
{      53,    80,    26,    33,    28,    36,    37},     25
{      24,    91,    41,    31,    31,    31,    38},
{      25,    57,    74,    31,    32,    30,    37},
{      32,    28,    99,    32,    32,    29,    36},
{      34,    20,   105,    33,    32,    30,    35},
{      50,    26,    34,    33,    74,    30,    31},
{      75,    28,    33,    23,    46,    47,    33},     30
{      64,    58,    29,    30,    26,    46,    40},
{      31,    85,    37,    31,    27,    33,    44},
{      22,    67,    64,    30,    31,    28,    42},
{      29,    35,    93,    31,    32,    27,    40},
{      33,    20,   105,    32,    33,    27,    37},
{      34,    19,   106,    33,    32,    29,    36},     35
{      51,    29,    33,    25,    72,    51,    30},
{      61,    42,    31,    30,    31,    60,    39},
{      40,    70,    34,    32,    24,    41,    50},
{      22,    72,    54,    30,    31,    27,    50},
{      25,    44,    83,    30,    33,    25,    44},
{      32,    23,   102,    32,    33,    26,    40},     40
{      34,    18,   107,    32,    33,    28,    37},
{      34,    19,   105,    33,    32,    30,    35},
{      45,    35,    32,    30,    39,    79,    33},
{      43,    53,    33,    35,    24,    53,    55},
{      27,    67,    45,    32,    29,    27,    61},
{      22,    53,    72,    30,    33,    22,    52},     45
{      28,    31,    95,    31,    33,    25,    43},
{      32,    20,   105,    32,    33,    27,    38},
{      34,    18,   107,    32,    32,    29,    36},
{      34,    20,   105,    33,    31,    31,    35},
{      38,    40,    32,    35,    23,    72,    54},
{      31,    55,    39,    34,    29,    32,    73},
{      22,    57,    60,    31,    35,    18,    64},     50
{      25,    39,    86,    31,    35,    22,    49},
{      30,    24,   101,    32,    33,    27,    40},
{      33,    19,   106,    32,    32,    30,    36},
{      34,    18,   107,    33,    31,    31,    35},
{      34,    20,   104,    33,    31,    32,    34},
{      33,    42,    35,    34,    28,    39,    82},     55
{      26,    51,    50,    33,    34,    18,    80},
{      23,    46,    74,    31,    35,    20,    59},
{      27,    32,    93,    32,    34,    26,    44},
{      31,    22,   103,    32,    32,    30,    37},
{      33,    19,   106,    33,    31,    31,    35},
{      34,    19,   106,    33,    31,    32,    34},     60
{      35,    21,   103,    34,    31,    32,    34},
{      29,    41,    41,    33,    34,    20,    92},
{      24,    44,    62,    34,    35,    18,    73},
{      24,    37,    83,    34,    33,    25,    52},
{      28,    28,    97,    33,    32,    30,    40},
{      32,    23,   103,    33,    31,    32,    36},     65
{      34,    20,   105,    34,    30,    33,    34},
```

```
{      35,    20,   104,    34,    30,    33,    33},
{      35,    22,   102,    34,    30,    33,    34},
{      27,    38,    51,    34,    34,    20,    86},
{      26,    37,    71,    35,    34,    24,    64},
{      27,    33,    87,    35,    32,    30,    47},
{      30,    28,    96,    34,    31,    32,    39},
{      32,    24,   100,    35,    30,    32,    36},
{      34,    23,   101,    34,    30,    33,    34},
{      35,    23,   101,    34,    30,    32,    34},
{      34,    24,    99,    35,    30,    33,    34}
},
{
{      30,    33,    32,    55,    32,    32,    32},
{      47,    30,    31,    29,    36,    32,    32},
{      81,    28,    32,    28,    34,    32,    32},
{      85,    46,    29,    32,    32,    33,    32},
{      54,    82,    26,    32,    32,    33,    32},
{      30,    90,    38,    31,    32,    33,    32},
{      30,    56,    73,    31,    33,    32,    32},
{      37,    21,   102,    32,    32,    32,    32},
{      33,    32,    31,    68,    39,    31,    31},
{      38,    32,    31,    43,    34,    33,    31},
{      63,    30,    31,    29,    34,    32,    32},
{      82,    37,    30,    29,    33,    32,    32},
{      71,    63,    27,    31,    32,    33,    32},
{      44,    86,    30,    30,    33,    33,    32},
{      33,    72,    55,    30,    32,    32,    31},
{      37,    37,    86,    31,    32,    33,    31},
{      34,    33,    32,    60,    61,    29,    32},
{      36,    33,    31,    56,    38,    32,    31},
{      51,    30,    31,    38,    33,    33,    32},
{      75,    31,    31,    30,    33,    33,    32},
{      80,    47,    29,    30,    32,    33,    31},
{      60,    73,    27,    30,    33,    33,    31},
{      41,    78,    41,    30,    33,    32,    31},
{      38,    53,    68,    30,    32,    33,    31},
{      33,    33,    32,    43,    77,    35,    30},
{      35,    33,    31,    55,    54,    29,    32},
{      43,    32,    31,    46,    39,    31,    32},
{      64,    30,    31,    35,    34,    33,    32},
{      79,    37,    30,    31,    32,    33,    31},
{      73,    57,    28,    30,    32,    33,    31},
{      54,    73,    33,    30,    32,    33,    31},
{      43,    64,    52,    30,    32,    33,    31},
{      33,    33,    32,    34,    68,    58,    28},
{      34,    33,    31,    45,    70,    33,    31},
{      38,    33,    31,    48,    52,    29,    32},
{      54,    31,    31,    40,    39,    31,    32},
{      73,    32,    31,    34,    34,    33,    31},
{      77,    45,    29,    31,    32,    32,    32},
{      65,    63,    30,    31,    31,    33,    31},
{      51,    66,    42,    30,    32,    33,    31},
{      33,    32,    32,    34,    44,    81,    31},
{      34,    33,    31,    38,    66,    52,    28},
{      36,    33,    30,    44,    62,    34,    31},
{      47,    31,    31,    43,    48,    30,    32},
{      64,    31,    31,    38,    38,    32,    32},
{      75,    38,    30,    33,    34,    32,    32},
{      71,    53,    30,    31,    32,    33,    32},
{      59,    61,    37,    30,    32,    33,    32},
{      33,    32,    31,    35,    31,    71,    54},
{      34,    33,    31,    37,    49,    70,    33},
{      36,    33,    31,    41,    60,    48,    30},
{      43,    32,    31,    43,    54,    35,    31},
{      56,    31,    31,    40,    44,    32,    32},
{      68,    35,    30,    36,    37,    32,    32},
{      70,    45,    30,    33,    34,    33,    32},
{      63,    55,    35,    31,    33,    33,    32},
{      33,    32,    31,    33,    34,    36,    87},
{      34,    32,    31,    36,    38,    62,    52},
{      36,    33,    31,    39,    50,    57,    36},
{      41,    33,    31,    41,    53,    43,    33},
{      50,    33,    31,    41,    48,    36,    32},
{      59,    35,    31,    37,    41,    34,    32},
```

-continued

| Listing 4: Unsigned 7-bit integer coefficients | | | | | | |
|---|---|---|---|---|---|---|
| { | 65, | 42, | 31, | 35, | 36, | 33, | 32}, |
| { | 62, | 49, | 35, | 33, | 34, | 34, | 33} |
| } | | | | | | |
| } | | | | | | |

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCES

[1] B. Bross et al., Versatile Video Coding (Draft 7), Document JVET-P2001, Geneva, October 2019

The invention claimed is:

1. An apparatus comprising at least one processor for decoding a block of a picture using intra-prediction, the at least one processor configured to:

decode, from a data stream, a mode index, the mode index indicating a matrix-based intra-prediction mode out of a plurality of matrix-based intra-prediction modes based on a size of the block, wherein there are 6, 8, or 16 matrix-based intra-prediction modes in the plurality of matrix-based intra-prediction modes based on the size of the block;

derive an input vector based on downsampling reference samples neighboring the block;

determine a matrix based on the size of the block and the mode index;

compute a respective output for each component of a matrix-vector product between the input vector and the determined matrix, the respective output computed by performing, a right shift by a number of bits which is independent of the matrix-based intra-prediction mode indicated by the mode index; and for each component of the matrix-vector product, use the respective output to predict a respective sample of the block.

2. The apparatus of claim 1, wherein the number of bits is 6.

3. The apparatus of claim 1, wherein each matrix-based intra-prediction mode of the plurality applies a respective matrix that has all entries represented with respective fixed point representations of 7 bits.

4. The apparatus of claim 1, wherein the plurality of matrix-based intra-prediction modes has associated therewith 6, 8, or 16 different matrices based on the size of the block.

5. The apparatus of claim 1, wherein the reference samples neighboring the block comprise samples at a top of the block and samples left of the block.

6. The apparatus of claim 5, wherein the samples neighboring the block that are at the top of the block are downsampled to form a first vector, the samples neighboring the block that are left of the block are downsampled to form a second vector, and the input vector is derived based on a concatenation of the first vector and the second vector.

7. The apparatus of claim 1, wherein the at least one processor is configured to decode the picture in 10-bit resolution.

8. An apparatus comprising at least one processor for encoding a block of a picture using intra-prediction, the apparatus configured to:

encode, into a data stream, a mode index, the mode index indicating a matrix-based intra-prediction mode out of a plurality of matrix-based intra-prediction modes based on a size of the block, wherein there are 6, 8, or 16 matrix-based intra-prediction modes in the plurality of matrix-based intra-prediction modes based on the size of the block;

derive an input vector based on downsampling reference samples neighboring the block;

determine a matrix based on the size of the block and the mode index;

compute a respective output for each component of a matrix-vector product between the input vector and the determined matrix, the respective output computed by performing a right shift by a number of bits which is independent of the matrix-based intra-prediction mode indicated by the mode index; and for each component of the matrix-vector product, use the respective output to predict a respective sample of the block.

9. The apparatus of claim 8, wherein the number of bits is 6.

10. The apparatus of claim 8, wherein each matrix-based intra-prediction mode of the plurality applies a respective matrix that has all entries represented with respective fixed point representations of 7 bits.

11. The apparatus of claim 9, wherein the plurality of matrix-based intra-prediction modes has associated therewith 6, 8, or 16 different matrices based on the size of the block.

12. The apparatus of claim 8, wherein the reference samples neighboring the block comprise samples at a top of the block and samples left of the block.

13. The apparatus of claim 12, wherein the samples neighboring the block that are at the top of the block are downsampled to form a first vector, the samples neighboring the block that are left of the block are downsampled to form a second vector, and the input vector is derived based on a concatenation of the first vector and the second vector.

14. The apparatus of claim 8, wherein the at least one processor is configured to encode the picture in 10-bit resolution.

15. A method of decoding a block of a picture using intra-prediction, the method comprising:

decoding, from a data stream, a mode index, the mode index indicating a matrix-based intra-prediction mode out of a plurality of matrix-based intra-prediction modes based on a size of the block, wherein there are 6, 8, or 16 matrix-based intra-prediction modes in the plurality of matrix-based intra-prediction modes based on the size of the block;

deriving an input vector based on downsampling reference samples neighboring the block;

determining a matrix based on the size of the block and the mode index;

computing a respective output for each component of a matrix-vector product between the input vector and the determined matrix, the respective output computed by performing a right shift by a number of bits which is independent of the matrix-based intra-prediction mode indicated by the mode index; and for each component of the matrix-vector product, use the respective output to predict a respective sample of the block.

16. The method of claim 15, wherein the number of bits is 6.

17. The method of claim 15, wherein each matrix-based intra-prediction mode of the plurality applies a respective matrix that has all entries represented with respective fixed point representations of 7 bits.

* * * * *